(12) United States Patent
Cui et al.

(10) Patent No.: US 9,966,598 B2
(45) Date of Patent: May 8, 2018

(54) HIGH CAPACITY PRELITHIATION REAGENTS AND LITHIUM-RICH ANODE MATERIALS

(71) Applicant: The Board of Trustees of the Leland Stanford Junior University, Stanford, CA (US)

(72) Inventors: Yi Cui, Stanford, CA (US); Jie Zhao, Stanford, CA (US); Zhenda Lu, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 103 days.

(21) Appl. No.: 14/869,800

(22) Filed: Sep. 29, 2015

(65) Prior Publication Data

US 2016/0093884 A1 Mar. 31, 2016

Related U.S. Application Data

(60) Provisional application No. 62/057,957, filed on Sep. 30, 2014.

(51) Int. Cl.
| | |
|---|---|
| *H01M 4/38* | (2006.01) |
| *H01M 10/0525* | (2010.01) |
| *H01M 4/36* | (2006.01) |
| *H01M 10/052* | (2010.01) |
| *H01M 4/02* | (2006.01) |

(52) U.S. Cl.
CPC ............ *H01M 4/364* (2013.01); *H01M 4/38* (2013.01); *H01M 4/386* (2013.01); *H01M 4/387* (2013.01); *H01M 10/052* (2013.01); *H01M 10/0525* (2013.01); *H01M 2004/027* (2013.01); *H01M 2220/10* (2013.01); *H01M 2220/20* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 8,158,282 B2 | 4/2012 | Zhamu et al. | |
| 8,236,452 B2 | 8/2012 | Zhamu et al. | |
| 8,241,793 B2 | 8/2012 | Zhamu et al. | |
| 2002/0182488 A1* | 12/2002 | Cho ................... | H01M 4/0492 429/137 |
| 2006/0057463 A1* | 3/2006 | Gao ..................... | C01B 33/02 429/231.95 |
| 2006/0093871 A1 | 5/2006 | Howard et al. | |
| 2006/0093872 A1 | 5/2006 | Howard et al. | |
| 2007/0154805 A1 | 7/2007 | Zaghib et al. | |
| 2008/0261116 A1 | 10/2008 | Burton et al. | |
| 2009/0035663 A1* | 2/2009 | Yakovleva ............ | B22F 1/0062 429/231.95 |
| 2010/0143798 A1* | 6/2010 | Zhamu .................. | H01M 4/133 429/212 |
| 2010/0173198 A1* | 7/2010 | Zhamu .................. | H01M 4/134 429/222 |
| 2011/0165462 A1 | 7/2011 | Zhamu et al. | |
| 2011/0177388 A1* | 7/2011 | Bae ..................... | H01M 4/0438 429/209 |
| 2012/0328952 A1 | 12/2012 | Yushin et al. | |
| 2013/0045427 A1 | 2/2013 | Zhamu et al. | |
| 2013/0059174 A1* | 3/2013 | Zhamu .................. | H01M 4/583 429/50 |
| 2013/0260254 A1 | 10/2013 | Kren et al. | |
| 2014/0227432 A1 | 8/2014 | Liu et al. | |

FOREIGN PATENT DOCUMENTS

JP       2003036842 A * 2/2003 .......... H01M 4/0492

OTHER PUBLICATIONS

Pereira et al. Particle size and multiphase effects on cycling stability using tin-based materials. Solid State Ionics 167 (2004) 29-40.*
Forney, M.W. et al. (2013) "Prelithiation of Silicon-Carbon Nanotube Anodes for Lithium Ion Batteries by Stabilized Lithium Metal Powder (SLMP)," Nano Lett. 13:4158-4163.
Jarvis, C.R. et al. (2006) "A prelithiated carbon anode for lithium-ion battery applications," J Power Sources 162:800-802.
Wang, L. et al. (2013) "SBR-PVDF based binder for the application of SLMP in graphite anodes," RSC Adv. 3:15022-15027.
Wang, Z. et al. (2014) "Application of Stabilized Lithium Metal Powder (SLMP) in graphite anode—A high efficient prelithiation method for lithium-ion batteries," J Power Sources 260:57-61.
Xiang, B. et al. (2013) "Electromechanical Probing of Li/$Li_2CO_3$ Core/Shell Particles in a TEM," J Electrochem Soc. 160(3):A415-A419.
Zhao, J. et al. (2014) "Dry-air-stable lithium silicide-lithium oxide core-shell nanoparticles as high-capacity prelithiation reagents," Nat Commun. 5:5088, 1-8.

* cited by examiner

*Primary Examiner* — Tanisha Diggs
(74) *Attorney, Agent, or Firm* — Foley & Lardner LLP; Cliff Z. Liu

(57) ABSTRACT

Described here is a method for making an anode of a rechargeable battery, comprising incorporating a composition comprising $Li_xM$ into the anode, wherein M is a Group 14 element. Also described here is an anode comprising a composition comprising $Li_xM$, wherein M is a Group 14 element, and a rechargeable battery comprising the anode.

7 Claims, 36 Drawing Sheets

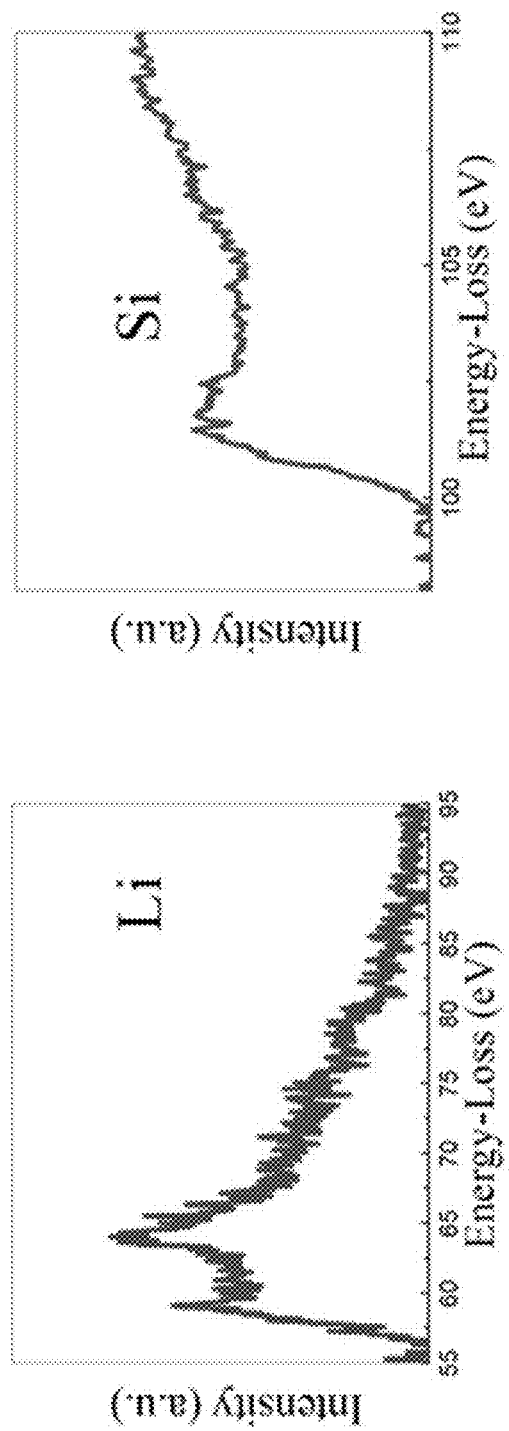
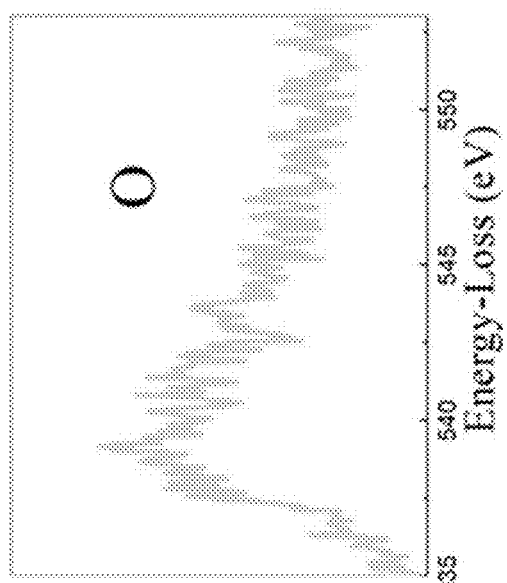
FIG. 6A
FIG. 6B
FIG. 6C

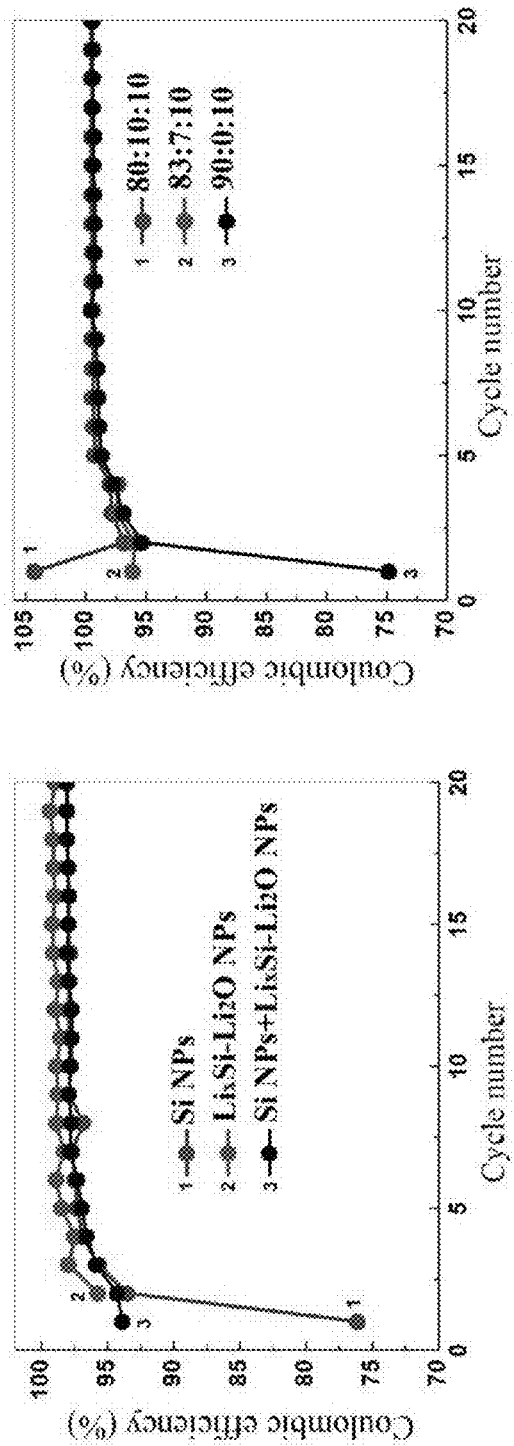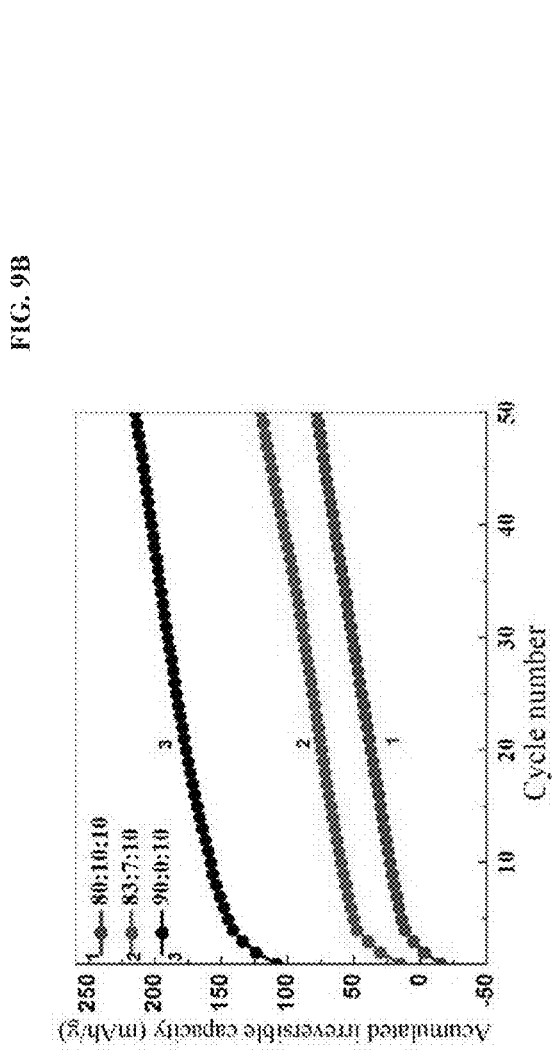
FIG. 9A
FIG. 9B
FIG. 9C

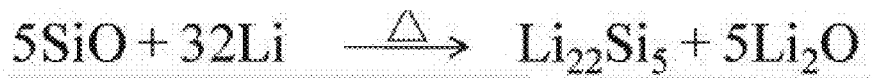
$$5SiO + 32Li \xrightarrow{\Delta} Li_{22}Si_5 + 5Li_2O$$
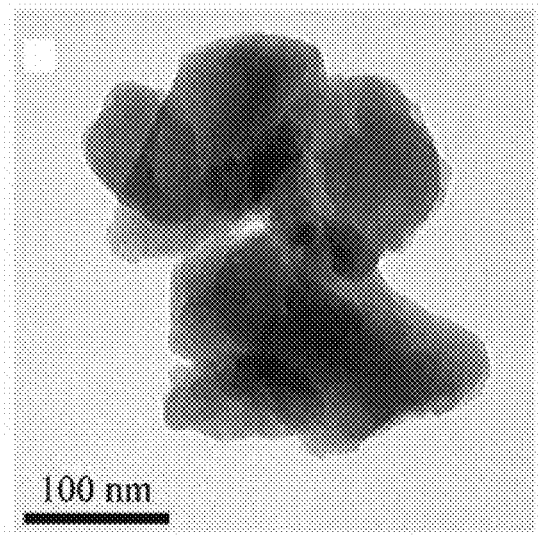
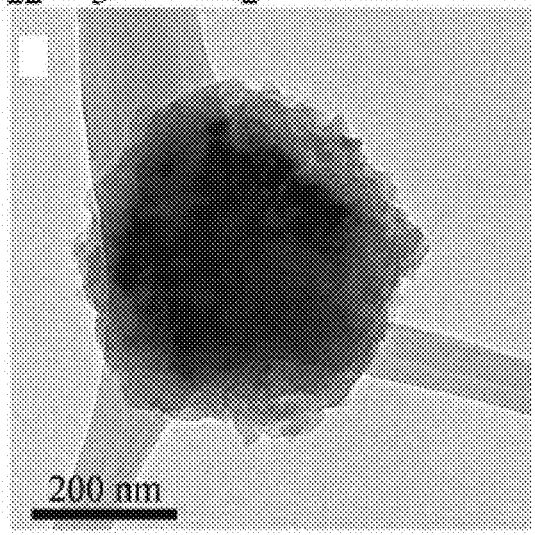
FIG. 16A　　　　　　　　FIG. 16B
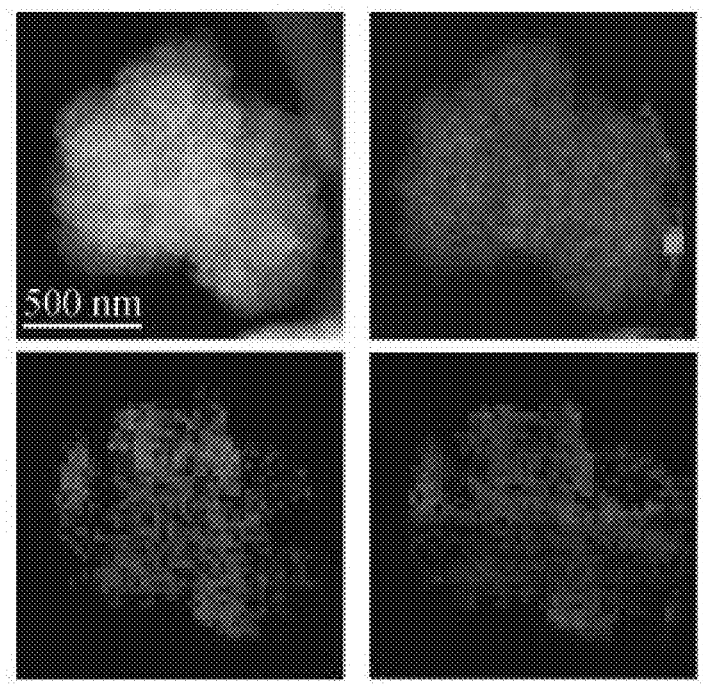
FIG. 16C

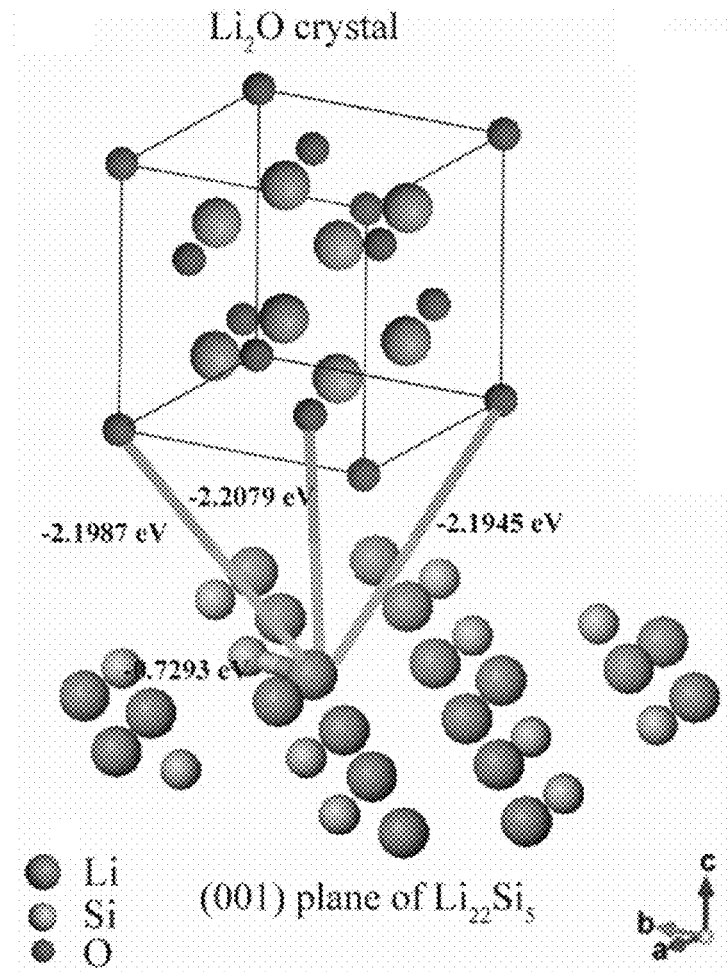
FIG. 19A
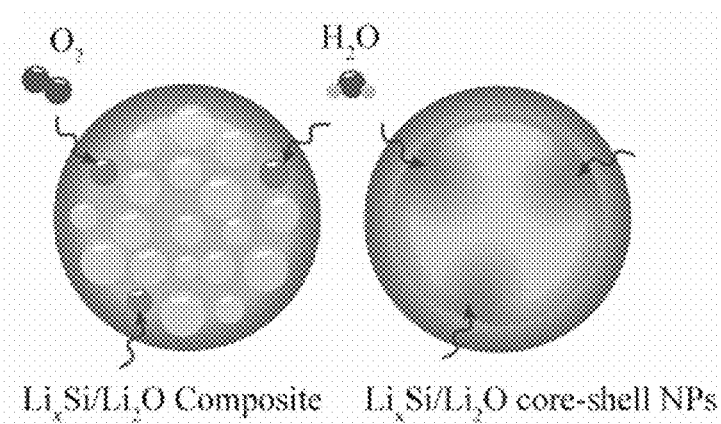
FIG. 19B
| Bonds | Binding energy (eV) |
|---|---|
| (½ ½ 0) O-Li | -2.2079 |
| (0 0 0) O-Li | -2.1945 |
| (1 1 0) O-Li | -2.1987 |
| Si-Li | -0.7293 |
FIG. 19C

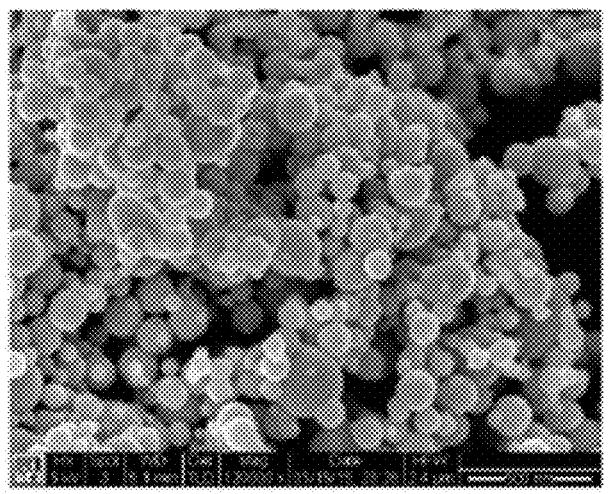
FIG. 31A
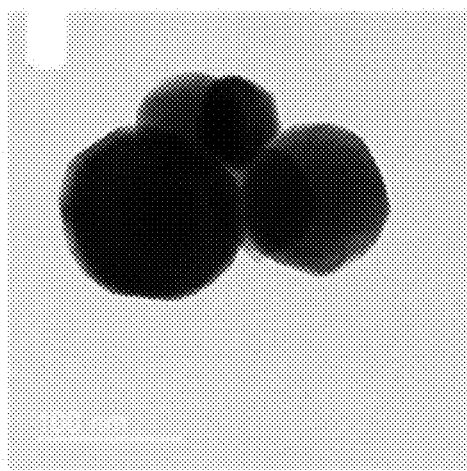
FIG. 31B
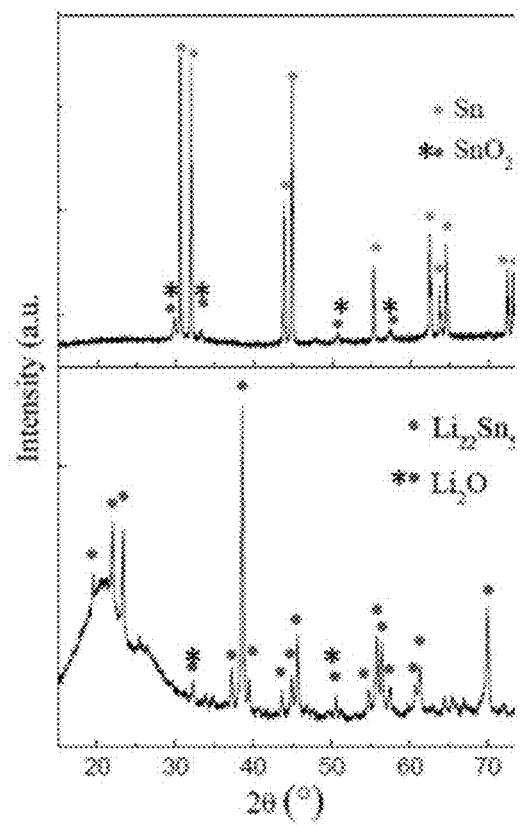
FIG. 31C
FIG. 31F

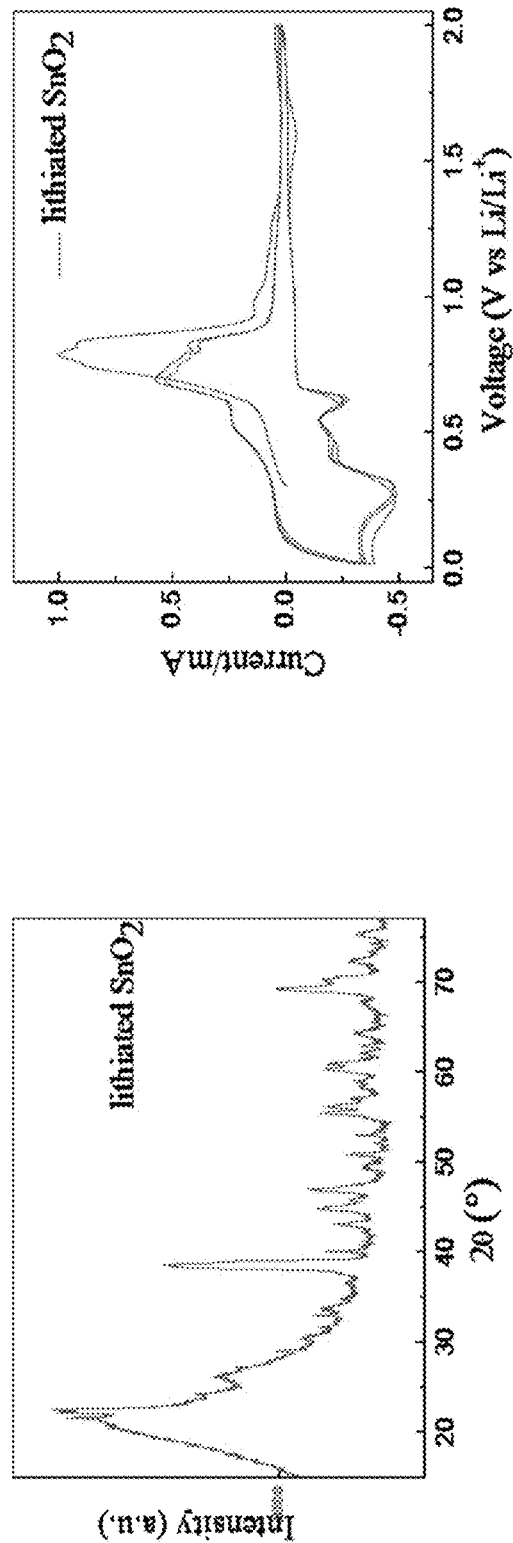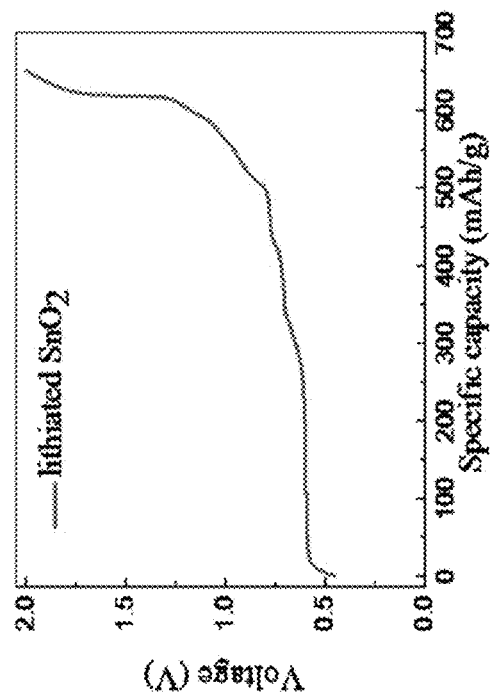
FIG. 34A
FIG. 34B
FIG. 34C

HIGH CAPACITY PRELITHIATION REAGENTS AND LITHIUM-RICH ANODE MATERIALS

CROSS-REFERENCE TO RELATED APPLICATIONS

This application claims the benefit of U.S. Provisional Patent Application No. 62/057,957 filed Sep. 30, 2014, the content of which is incorporated herein by reference in its entirety.

FEDERALLY SPONSORED RESEARCH OR DEVELOPMENT

This invention was made with Government support under Contract No. DE-AC02-76SF00515, awarded by U.S. Department of Energy. The Government has certain rights in the invention.

BACKGROUND

Rechargeable lithium-ion batteries are widely used for consumer electronics and exhibit great potential for electrical vehicle and grid-scale energy storage. The first charging process, in which lithium ions and electrons move from cathode to anode, is important for lithium-ion battery operation. When the potential of the anode is below ~1 V versus Li metal, the organic electrolyte is reduced on the anode surface to form a layer of solid electrolyte interphase (SEI) that is composed of a complex composition of inorganic and organic lithium compounds. In addition, some lithium may be trapped in the electrode upon lithiation. As a result, the first charging process irreversibly consumes a fraction of the lithium ions, giving rise to a net loss of storage capacity. Such first cycle irreversible capacity loss is usually compensated by additional loading of cathode materials in current lithium-ion batteries. However, lithium metal oxide cathodes have much lower specific capacity (mostly less than ~200 mAh/g) than anodes. Excessive loading of cathode material causes appreciable reduction of battery specific energy and energy density. It is therefore attractive to develop an alternative method that suppresses this loss and consequently increases the $1^{st}$ cycle Coulombic efficiency.

Addressing first cycle capacity loss is important for the successful commercialization of graphite anodes. With graphite anodes, 5-20% of the lithium from the cathode is typically consumed to form the SEI, corresponding to an appreciable amount of inactivated cathode material. In the past two decades, the $1^{st}$ cycle Coulombic efficiency of graphite anodes has increased from <80% to 90-95% through optimization of material quality, electrolyte, and additives. Further improvement is likely to result from pre-compensation or prelithiation of the electrodes.

Besides graphite anodes, prelithiation presents exciting opportunities for next generation high capacity anode materials such as Si, Ge, Sn, $SiO_x$, $GeO_x$, $SnO_2$, $TiO_2$ and P, which have a large first cycle capacity loss. For example, Si is a particularly attractive anode material, due to its high specific capacity of ~4200 mAh/g, excellent material abundance, and well-developed industrial infrastructure for manufacturing. In the past several years, there has been exciting progress in addressing the issues associated with large volume change (>300%) during lithium insertion and extraction by designing nanostructured Si including nanowires and core-shell nanowires, hollow particles and tubes, porous materials, Si/C nanocomposites and by using improved binders. One of the remaining issues for Si anodes is the large capacity loss in the first cycle. The $1^{st}$ cycle Coulombic efficiency is typically very low, in the range of 50 to 80%, in spite of a few reports with higher values of ~85%.

The $1^{st}$ cycle Coulombic efficiency can be improved by prelithiation. Anode prelithiation has been previously achieved by inducing electrical shorting between anode materials and lithium metal foil. It involves the fabrication of a temporary battery, a process which is difficult to scale up. In addition, prelithiation of thick electrode with Li foil is time consuming, as it involves the diffusion of Li ions across the entire anode. Another approach is to use stabilized lithium metal powder (SLMP) to pre-compensate the first cycle irreversible capacity loss of different anode materials, such as graphite and Si-CNT composite. However, SLMP faces many practical challenges yet to be addressed, including large particle size and difficulty to scale up. It is therefore highly desirable to develop alternative microparticles or nanoparticles for prelithiation.

SUMMARY

One aspect of some embodiments of the disclosure relates to a method for making an anode of a rechargeable battery, comprising incorporating a composition comprising $Li_xM$ into the anode, wherein M is a Group 14 element. x indicates the atomic ratio of Li to M and can be, for example, about 5:1 or less, about 4:1 or less, about 3:1 or less, or about 2:1 or less, and down to about 1:1, about 1:3, or about 1:6. In some embodiments, x is between about 5:1 to about 4:1 or between about 4:1 to about 3:1.

The Group 14 element can be selected from, for example, graphite (C), silicon (Si), germanium (Ge), tin (Sn), lead (Pb), and flerovium (Fl). In some embodiments, the composition comprises $Li_xC$. In some embodiments, the composition comprises $Li_xSi$. In some embodiments, the composition comprises $Li_xGe$. In some embodiments, the composition comprises $Li_xSn$.

In some embodiments, the composition comprises nanoparticles or microparticles that comprise $Li_xM$. In some embodiments, the composition comprises nanoparticles or microparticles that comprise $Li_xSi$, $Li_xGe$, and/or $Li_xSn$. In some embodiments, the composition comprises nanostructures that comprise $Li_xM$, such as nanoparticles, having at least one dimension in the range of about 1 nm to about 1 µm, such as about 500 nm or less, about 400 nm or less, about 300 nm or less, or about 200 nm or less, and down to about 100 nm, and down to about 50 nm, down to about 20 nm, down to about 10 nm, or less. In some embodiments, the composition comprises microstructures that comprise $Li_xM$, such as microparticles, having at least one dimension in the range of about 1 µm to about 1 mm, such as about 500 µm or less, about 100 µm or less, about 50 µm or less, or about 10 µm or less, down to about 5 µm, down to about 2 µm, or less.

In some embodiments, the composition comprises crystalline $Li_xSi$, and, in other embodiments, the composition comprises amorphous $Li_xSi$. In some embodiments, the composition comprises crystalline $Li_xGe$, and, in other embodiments, the composition comprises amorphous $Li_xGe$. In some embodiments, the composition comprises crystalline $Li_xSn$, and, in other embodiments, the composition comprises amorphous $Li_xSn$.

In some embodiments, the nanoparticles or microparticles comprise (a) a matrix comprising a lithium compound and (b) a plurality of $Li_xM$ domains embedded in the matrix. The matrix can comprise, for example, an oxide, a fluoride, a sulfide, or a nitride of lithium. In some embodiments, the matrix comprises $Li_2O$ and/or LiF. In some embodiments, the nanoparticles or microparticles comprise at least 3, or at least 5, or at least 10, or at least 20, or at least 50, or at least 100 $Li_xM$ domains embedded in the matrix. In some embodiments, the embedded $Li_xM$ domains have an average size of about 1 nm to about 200 nm, such as about 100 nm or less, about 70 nm or less, about 50 nm or less, or about 30 nm or less, and down to about 20 nm, and down to about 10 nm, down to about 5 nm, down to about 2 nm, or less.

In some embodiments, the nanoparticles or microparticles comprise (a) a matrix comprising $Li_2O$ and/or LiF and (b) a plurality of $Li_xSi$ domains embedded in the matrix. In some embodiments, the nanoparticles or microparticles comprise (a) a matrix comprising $Li_2O$ and/or LiF and (b) a plurality of $Li_xGe$ domains embedded in the matrix. In some embodiments, the nanoparticles or microparticles comprise (a) a matrix comprising $Li_2O$ and/or LiF and (b) a plurality of $Li_xSn$ domains embedded in the matrix. In some embodiments, the nanoparticles or microparticles comprise (a) a matrix comprising $Li_2O$ and/or LiF and (b) $Li_xSi$ and $Li_xSn$ domains embedded in the matrix. In some embodiments, the nanoparticles or microparticles comprise (a) a matrix comprising $Li_2O$ and/or LiF and (b) $Li_xSi$ and $Li_xGe$ domains embedded in the matrix. In some embodiments, the nanoparticles or microparticles comprise (a) a matrix comprising $Li_2O$ and/or LiF and (b) $Li_xGe$ and $Li_xSn$ domains embedded in the matrix. In some embodiments, the nanoparticles or microparticles comprise a composite of $Li_xSi$ and at least one metal (e.g., Fe, Ni, Co, and other metals).

In some embodiments, the nanoparticles or microparticles comprise (a) a protective coating comprising $Li_2O$ and/or LiF and (b) a $Li_xM$ core encapsulated by the protective coating. In some embodiments, the nanoparticles or microparticles comprise (a) a protective coating comprising $Li_2O$ and/or LiF and (b) a $Li_xSi$ core encapsulated by the protective coating. In some embodiments, the nanoparticles or microparticles comprise (a) a protective coating comprising $Li_2O$ and/or LiF and (b) a $Li_xGe$ core encapsulated by the protective coating. In some embodiments, the nanoparticles or microparticles comprise (a) a protective coating comprising $Li_2O$ and/or LiF and (b) a $Li_xSn$ core encapsulated by the protective coating.

In some embodiments, the nanoparticles or microparticles comprise a core-shell nanostructure, wherein the core comprises $Li_xM$ and the shell comprises the protective coating. In some embodiments, the protective coating is a passivation layer. In some embodiments, the protective coating comprises an oxide, such as $Li_2O$, $SiO_2$, $TiO_2$, or another metal oxide. In some embodiments, the protective coating comprises a sulfide, or a fluoride, or a nitride, or a carbonate, or inorganic lithium salts. In some embodiments, the protective coating comprises an organic lithium compound. In some embodiments, the protective coating comprises a mixture of inorganic and organic lithium compounds. Different surfactants can be used to modify the surface of $Li_xM$. Surfactants, such as —OH, —SH, —$NH_2$, —$PH_2$, —F, —Cl, —Br, and —I terminated long hydrocarbon chains, can be reduced on the surface of $Li_xM$ to form a dense coating. This kind of coating, a mixture of inorganic and organic lithium compounds, can improve the dry air and moisture stability of $Li_xM$. In some embodiments, the protective coating comprises polymers, such as polydimethylsiloxane (PDMS). In some embodiments, the protective coating comprises graphene, graphene oxide, reduced graphene oxide, graphitic carbon, amorphous carbon and other carbon materials. In some embodiments, the protective coating comprises metallic materials. In some embodiments, the protective coating has a thickness of about 200 nm or less, or about 100 nm or less, or about 50 nm or less, or about 20 nm or less, or about 10 nm or less, or about 5 nm or less.

In some embodiments, the nanoparticles or microparticles can further comprise a thin layer formed by solvent decomposition during slurry processing, which could be due to the reducing power of $Li_xM$.

In some embodiments, the $Li_xM$-containing nanoparticles or microparticles are capable of retaining at least 50%, or at least 60%, or at least 70%, or at least 80%, or at least 90% of its capacity after exposure to dry air (dew point=−50° C.) for 1 day. In some embodiments, the $Li_xM$-containing nanoparticles or microparticles are capable of retaining at least 50%, or at least 60%, or at least 70%, or at least 80%, or at least 90% of its capacity after exposure to dry air (dew point=−50° C.) for 3 days. In some embodiments, the $Li_xM$-containing nanoparticles or microparticles are capable of retaining at least 50%, or at least 60%, or at least 70%, or at least 80%, or at least 90% of its capacity after exposure to dry air (dew point=−50° C.) for 5 days.

In some embodiments, the $Li_xM$-containing nanoparticles or microparticles are capable of retaining at least 50%, or at least 60%, or at least 70%, or at least 80%, or at least 90% of its capacity after exposure to ambient air for 1 hour. In some embodiments, the $Li_xM$-containing nanoparticles or microparticles are capable of retaining at least 50%, or at least 60%, or at least 70%, or at least 80%, or at least 90% of its capacity after exposure to ambient air for 3 hours. In some embodiments, the $Li_xM$-containing nanoparticles or microparticles are capable of retaining at least 50%, or at least 60%, or at least 70%, or at least 80%, or at least 90% of its capacity after exposure to ambient air for 6 hours. In some embodiments, the $Li_xM$-containing nanoparticles or microparticles are capable of retaining at least 50%, or at least 60%, or at least 70%, or at least 80%, or at least 90% of its capacity after exposure to ambient air for 12 hours.

In some embodiments, the $Li_xM$-containing nanoparticles or microparticles are capable of retaining at least 50%, or at least 60%, or at least 70%, or at least 80%, or at least 90% of its capacity after exposure to air of 20% relative humidity (RH) for 1 hour. In some embodiments, the $Li_xM$-containing nanoparticles or microparticles are capable of retaining at least 50%, or at least 60%, or at least 70%, or at least 80%, or at least 90% of its capacity after exposure to air of 20% RH for 3 hours. In some embodiments, the $Li_xM$-containing nanoparticles or microparticles are capable of retaining at least 50%, or at least 60%, or at least 70%, or at least 80%, or at least 90% of its capacity after exposure to air of 20% RH for 6 hours. In some embodiments, the $Li_xM$-containing nanoparticles or microparticles are capable of retaining at least 50%, or at least 60%, or at least 70%, or at least 80%, or at least 90% of its capacity after exposure to air of 20% RH for 12 hours.

In some embodiments, the $Li_xM$-containing nanoparticles or microparticles are capable of retaining at least 50%, or at least 60%, or at least 70%, or at least 80%, or at least 90% of its capacity after exposure to air of 10% RH for 1 hour. In some embodiments, the $Li_xM$-containing nanoparticles or microparticles are capable of retaining at least 50%, or at least 60%, or at least 70%, or at least 80%, or at least 90% of its capacity after exposure to air of 10% RH for 3 hours. In some embodiments, the $Li_xM$-containing nanoparticles or microparticles are capable of retaining at least 50%, or at least 60%, or at least 70%, or at least 80%, or at least 90% of its capacity after exposure to air of 10% RH for 6 hours. In some embodiments, the $Li_xM$-containing nanoparticles or microparticles are capable of retaining at least 50%, or at least 60%, or at least 70%, or at least 80%, or at least 90% of its capacity after exposure to air of 10% RH for 12 hours.

In some embodiments, the composition comprising $Li_xM$ is incorporated as the anode material. In some embodiments, the composition comprising $Li_xM$ is incorporated as a prelithiation reagent to prelithiate an anode material.

In some embodiments, the anode material comprises carbon. In some embodiments, the anode material comprises graphite. In some embodiments, the anode material comprises Si. In some embodiments, the anode material comprises SiO. In some embodiments, the anode material comprises Ge. In some embodiments, the anode material comprises Sn. In some embodiments, the anode material comprises $TiO_2$ or $SnO_2$. In some embodiments, the anode material comprises P.

In some embodiments, the weight ratio between the prelithiation reagent and the anode material is about 1:2 or less, or about 1:3 or less, or about 1:4 or less, or about 1:5 or less, or about 1:8 or less, or about 1:10 or less, or about 1:15 or more, or about 1:20 or more, or about 1:30 or more.

In some embodiments, the method comprises mixing the prelithiation reagent and the anode material in at least one binder and one solvent to form a slurry, wherein the solvent has a dielectric constant of about 20 or less. In some embodiments, the solvent has a dielectric constant of about 15 or less. In some embodiments, the solvent has a dielectric constant of about 10 or less. In some embodiments, the solvent has a dielectric constant of about 8 or less. In some embodiments, the solvent comprises an ether, an aromatic hydrocarbon, or both. In some embodiments, the solvent is selected from one or more of polar aprotic organic solvents. In some embodiments, the solvent is selected from one or more of non-polar organic solvents. In some embodiments, the solvent comprises 1,3-dioxolane (DOL), dimethyl ether (DME), tetrahydrofuran (THF), and/or other ethers. In some embodiments, the solvent comprises toluene, hexane, benzene and/or other hydrocarbons. In some embodiments, the binder for the slurry process comprises polyvinylidene fluoride (PVDF), and/or poly(styrene-co-butadiene).

In some embodiments, the mixing of the prelithiation reagent and the anode material in slurry and/or the coating of the slurry is processed in an ambient environment. In some embodiments, the mixing of the prelithiation reagent and the anode material in slurry and/or the coating of the slurry is processed in a low-humidity environment. In some embodiments, the prelithiation reagent is processed at a relative humidity of about 20% or less, or about 10% or less, or about 5% or less, or about 1% or less.

In some embodiments, the prelithiation reagent improves the first cycle Coulombic efficiency of the anode by at least about 2%, or at least about 5%, or at least about 10%, or at least about 15%, or at least about 20%. In some embodiments, the first cycle Coulombic efficiency of the anode after prelithiation is at least about 80%, or at least about 85%, or at least about 90%, or at least about 95%, or at least about 98%, or at least about 99%.

In some embodiments, the method comprises reacting nanoparticles or microparticles of a Group 14 element or compound thereof with Li to obtain the composition comprising $Li_xM$. In some embodiments, the method comprises reacting nanoparticles or microparticles of a Group 14 element or compound thereof with Li to obtain the nanoparticles or microparticles comprising $Li_xM$. In some embodiments, the method comprises reacting nanoparticles or microparticles of a Group 14 element or compound with Li metal foil under mechanical stirring at an elevated temperature (e.g., about 180-300° C., or higher). In some embodiments, the method comprises exposing the nanoparticles or microparticles comprising $Li_xM$ to some amounts of oxygen to form a passivation layer on the nanoparticles or microparticles, which can prevent $Li_xM$ from further oxidization in dry air.

In some embodiments, the method comprises reacting nanoparticles or microparticles of Si with Li to obtain a composition comprising $Li_xSi$, such as nanoparticles or microparticles having $Li_xSi$—$Li_2O$ core-shell structure.

In some embodiments, the method comprises reacting nanoparticles or microparticles of SiO with Li to obtain a composition comprising $Li_xSi$, such as $Li_xSi$—$Li_2O$ composites each comprising a $Li_2O$ matrix embedded with $Li_xSi$ domains.

In some embodiments, the method comprises reacting nanoparticles or microparticles of $SiO_2$ with Li to obtain a composition comprising $Li_xSi$, such as $Li_xSi$—$Li_2O$ composites each comprising a $Li_2O$ matrix embedded with $Li_xSi$ domains.

In some embodiments, the method comprises reacting nanoparticles or microparticles of Ge with Li to obtain a composition comprising $Li_xGe$, such as nanoparticles or microparticles having $Li_xGe$—$Li_2O$ core-shell structure.

In some embodiments, the method comprises reacting nanoparticles or microparticles of $GeO_2$ with Li to obtain a composition comprising $Li_xGe$, such as $Li_xGe$—$Li_2O$ composites each comprising a $Li_2O$ matrix embedded with $Li_xGe$ domains.

In some embodiments, the method comprises reacting nanoparticles or microparticles of Sn with Li to obtain a composition comprising $Li_xSn$, such as nanoparticles or microparticles having $Li_xSn$—$Li_2O$ core-shell structure.

In some embodiments, the method comprises reacting nanoparticles or microparticles of $SnO_2$ with Li to obtain a composition comprising $Li_xSn$, such as $Li_xSn$—$Li_2O$ composites each comprising a $Li_2O$ matrix embedded with $Li_xSn$ domains.

In some embodiments, the method comprises reacting nanoparticles or microparticles of $SnF_2$ or $SnF_4$ with Li to obtain a composition comprising $Li_xSn$, such as $Li_xSn$—LiF composites each comprising a LiF matrix embedded with $Li_xSn$ domains.

In some embodiments, the method comprises reacting nanoparticles or microparticles of metal silicide (e.g., $FeSi_2$, $NiSi_2$, $CoSi_2$, and other transition metal silicide) with Li to obtain a composition comprising metal-$Li_xSi$ (e.g., Fe—$Li_xSi$ composites, Ni—$Li_xSi$ composites, Co—$Li_xSi$ composites, and other metal-$Li_xSi$ composites).

In some embodiments, the method comprises reacting a combination of two or more Group 14 element(s) and/or compound(s) thereof with Li. In one embodiment, the method comprises reacting SiO—$SnF_4$ composites with Li to obtain $Li_xSi$— $Li_xSn$—$Li_2O$—LiF composites.

Another aspect of some embodiments of the disclosure relates to an anode comprising the composition comprising $Li_xM$. In some embodiments, the composition comprising $Li_xM$ is incorporated as the anode material. In some embodiments, the composition comprising $Li_xM$ is incorporated as a prelithiation reagent to prelithiate an anode material present in the anode. In some embodiments, the anode further comprises a binder and/or a conductive material.

Another aspect of some embodiments of the disclosure relates to a rechargeable battery comprising the anode comprising $Li_xM$.

A further aspect of some embodiments of the disclosure relates to a method for making an anode of a rechargeable battery, comprising prelithiating an anode material with a prelithiation reagent comprising $Li_xM$, such as $Li_xSi$, wherein the prelithiation reagent improves first cycle Coulombic efficiency of the anode.

In some embodiments, the prelithiation reagent comprises nanostructures, such as nanoparticles, having at least one dimension in the range of about 1 nm to about 1000 nm, such as about 500 nm or less, about 400 nm or less, about 300 nm or less, or about 200 nm or less, and down to about 50 nm, down to about 20 nm, down to about 10 nm, or less. In some embodiments, the prelithiation reagent comprises microstructures, such as microparticles, having at least one dimension in the range of about 1 µm to about 1 mm, such as about 500 µm or less, about 100 µm or less, about 50 µm or less, or about 10 µm or less, down to about 5 µm, down to about 2 µm, or less.

In some embodiments, the prelithiation reagent comprises a nanostructure comprising $Li_xM$, where x indicates the atomic ratio of Li to M and can be, for example, about 5:1 or less, about 4:1 or less, about 3:1 or less, or about 2:1 or less, and down to about 1:1, about 1:3, or about 1:6, or less.

In some embodiments, the prelithiation reagent comprises particles having at least one dimension of about 1000 nm or less. In some embodiments, the prelithiation reagent comprises particles having at least one dimension of about 500 nm or less. In some embodiments, the prelithiation reagent comprises particles having at least one dimension of about 200 nm or less.

Particles of the prelithiation reagent can have any of a variety of shapes, such as spheroidal, tetrahedral, tripodal, disk-shaped, pyramid-shaped, box-shaped, cube-shaped, cylindrical, tubular, wire-shaped, branch-shaped, and a number of other geometric and non-geometric shapes. Particles of the prelithiation reagent can be an aggregation of a number of small particles that are about 2 or more, about 5 or more, about 10 or more, about 100 or more, or about 1000 or more. Particles of the prelithiation reagent can have aspect ratios that are about 3 or more, or less than about 3.

In some embodiments, the prelithiation reagent comprises $Li_{21}M_5$ (i.e., where x=21:5). In some embodiments, the prelithiation reagent comprises $Li_{22}M_5$ (i.e., where x=22:5). In some embodiments, the prelithiation reagent comprises $Li_{15}M_4$ (i.e., where x=15:4). In some embodiments, the prelithiation reagent comprises $Li_{13}M_4$ (i.e., where x=13:4). In some embodiments, the prelithiation reagent comprises $Li_7M_3$ (i.e., where x=7:3). In some embodiments, the prelithiation reagent comprises $Li_{12}M_7$ (i.e., where x=12:7). In some embodiments, the prelithiation reagent comprises LiM (i.e., where x=1). In some embodiments, the prelithiation reagent comprises $Li_7M_2$ (i.e., where x=7:2). In some embodiments, the prelithiation reagent comprises $Li_{13}M_5$ (i.e., where x=13:5). In some embodiments, the prelithiation reagent comprises $Li_5M_2$ (i.e., where x=5:2). In some embodiments, the prelithiation reagent comprises $Li_2M_5$ (i.e., where x=2:5). In some embodiments, the prelithiation reagent comprises $LiM_6$ (i.e., where x=1:6). In some embodiments, the prelithiation reagent comprises $Li_{11}M_6$ (i.e., where x=11:6). In some embodiments, the prelithiation reagent comprises $Li_9M_4$ (i.e., where x=9:4). In some embodiments, the prelithiation reagents comprises crystalline $Li_xM$ compounds, and, in other embodiments, the prelithiation reagent comprises amorphous $Li_xM$ compounds.

In some embodiments, the anode material comprises carbon. In some embodiments, the anode material comprises graphite. In some embodiments, the anode material comprises Si. In some embodiments, the anode material comprises SiO, or $SiO_2$. In some embodiments, the anode material comprises Ge. In some embodiments, the anode material comprises Sn. In some embodiments, the anode material comprises $TiO_2$ or $SnO_2$. In some embodiments, the anode material comprises P.

In some embodiments, the weight ratio between the prelithiation reagent and the anode material is about 1:2 or less. In some embodiments, the weight ratio between the prelithiation reagent and the anode material is about 1:3 or less. In some embodiments, the weight ratio between the prelithiation reagent and the anode material is about 1:4 or less. In some embodiments, the weight ratio between the prelithiation reagent and the anode material is about 1:5 or less. In some embodiments, the weight ratio between the prelithiation reagent and the anode material is about 1:8 or less. In some embodiments, the weight ratio between the prelithiation reagent and the anode material is about 1:10 or less. In some embodiments, the weight ratio between the prelithiation reagent and the anode material is about 1:15 or more. In some embodiments, the weight ratio between the prelithiation reagent and the anode material is about 1:20 or more. In some embodiments, the weight ratio between the prelithiation reagent and the anode material is about 1:30 or more.

In some embodiments, the method comprises reacting Si nanoparticles or microparticles with Li metal to obtain $Li_xSi$ nanoparticles or microparticles. In some embodiments, the method comprises reacting Si nanoparticles with Li metal foil under mechanical stirring at an elevated temperature (e.g., about 180-300° C., or higher). In some embodiments, the method comprises exposing the $Li_xSi$ nanoparticles or microparticles obtained to some amounts of oxygen to form a passivation layer on the $Li_xSi$ nanoparticles or microparticles, which can prevent $Li_xSi$ from further oxidization in dry air.

In some embodiments, the mixing of the prelithiation reagent and the anode material in slurry and/or the coating of the slurry is processed in a low-humidity environment. In some embodiments, the prelithiation reagent is processed at a relative humidity of about 30% or less. In some embodiments, the prelithiation reagent is processed at a relative humidity of about 20% or less. In some embodiments, the prelithiation reagent is processed at a relative humidity of about 10% or less. In some embodiments, the prelithiation reagent is processed at a relative humidity of about 5% or less. In some embodiments, the prelithiation reagent is processed at a relative humidity of about 1% or less.

In some embodiments, the prelithiation reagent improves the first cycle Coulombic efficiency of the anode by at least about 2%. In some embodiments, the prelithiation reagent improves the first cycle Coulombic efficiency of the anode by at least about 5%. In some embodiments, the prelithiation reagent improves the first cycle Coulombic efficiency of the anode by at least about 10%. In some embodiments, the prelithiation reagent improves the first cycle Coulombic efficiency of the anode by at least about 15%. In some embodiments, the prelithiation reagent improves the first cycle Coulombic efficiency of the anode by at least about 20%. In some embodiments, the prelithiation reagent improves the first cycle Coulombic efficiency of the anode by at least about 30%. In some embodiments, the prelithiation reagent improves the first cycle Coulombic efficiency of the anode by at least about 50%.

In some embodiments, the first cycle Coulombic efficiency of the anode after prelithiation is at least about 80%. In some embodiments, the first cycle Coulombic efficiency of the anode after prelithiation is at least about 85%. In some embodiments, the first cycle Coulombic efficiency of the anode after prelithiation is at least about 90%. In some embodiments, the first cycle Coulombic efficiency of the anode after prelithiation is at least about 95%. In some embodiments, the first cycle Coulombic efficiency of the anode after prelithiation is at least about 100%.

A further aspect of some embodiments of the disclosure relates to a composition comprising an anode material mixed with a prelithiation reagent comprising $Li_xM$, as described herein. In some embodiments, the composition further comprises a solvent having a dielectric constant of about 20 or less, as described herein. In some embodiments, the composition is a mixture comprising the anode material, the prelithiation reagent, the solvent, and other optional components such as a binder and a carbon additive. In some embodiments, the composition is a slurry comprising the anode material, the prelithiation reagent, the solvent, and other optional components such as a binder and a carbon additive. In some embodiments, the composition is an anode obtained by coating the slurry and drying the coated slurry.

A further aspect of some embodiments of the disclosure relates to a rechargeable battery comprising an anode, wherein the anode comprises or is obtained from the composition described herein, and wherein the prelithiation reagent improves first cycle Coulombic efficiency of the anode.

These and other features, together with the organization and manner of operation thereof, will become apparent from the following detailed description when taken in conjunction with the accompanying drawings.

BRIEF DESCRIPTION OF THE DRAWINGS

(FIG. 2A) TEM image of $Li_xSi$—$Li_2O$ NPs. (FIG. 2B) Magnified TEM image reveals the core-shell nanostructure. (FIG. 2C) STEM image of $Li_xSi$—$Li_2O$ NPs, and (FIG. 2D) the corresponding EELS map of O distribution. (FIG. 2E) STEM image of $Li_xSi$—$Li_2O$ NPs. Corresponding EELS maps of (FIG. 2F) Li distribution and (FIG. 2G) Si distribution. (FIG. 2H) XRD pattern reveals the core-shell nanoparticles composed of crystalline $Li_{21}Si_5$ and $Li_2O$.

(FIG. 3A) First cycle delithiation capacity of $Li_xSi$—$Li_2O$ NPs, using different solvents to form the slurry. (FIG. 3B) Galvanostatic discharge/charge profiles of $Li_xSi$—$Li_2O$ NPs in $1^{st}$ and $2^{nd}$ cycles. (FIG. 3C) First cycle voltage profiles of Si NPs/$Li_xSi$—$Li_2O$ and Si NPs show that the incorporation of $Li_xSi$—$Li_2O$ additive compensates the $1^{st}$ cycle capacity loss of Si NPs. (FIG. 3D) Cycling performance of $Li_xSi$—$Li_2O$ NPs, Si NPs/$Li_xSi$—$Li_2O$ and the control Si NPs at C/20 ($1C=4.2$ A $g^{-1}$ Si, the capacity is based on the total mass of Si in the electrodes). The top line is the Coulombic efficiency of Si NPs/$Li_xSi$—$Li_2O$ composite. (FIG. 3E) First cycle voltage profiles of mesocarbon microbeads (MCMB)/$Li_xSi$—$Li_2O$ (81:9 by weight) show $Li_xSi$—$Li_2O$ NPs improve the $1^{st}$ cycle Coulombic efficiency of MCMB. The table shows that the $1^{st}$ cycle Coulombic efficiency is tuned by the amount of $Li_xSi$—$Li_2O$ additives. (FIG. 3F) Cycling performance of MCMB/$Li_xSi$—$Li_2O$ composites with different weight ratios at C/20 for first three cycles and C/5 for the following cycles ($1C=0.372$ A $g^{-1}$ C, the capacity is based on the mass of the total active materials, including MCMB and Si in $Li_xSi$—$Li_2O$ NPs). The top line is the Coulombic efficiency of MCMB/$Li_xSi$—$Li_2O$ composite (80:10 by weight).

(FIG. 4A) TEM image of $Li_xSi$—$Li_2O$ NPs after 3 days of exposure to dry air. (FIG. 4B) XRD patterns of $Li_xSi$—$Li_2O$ NPs without exposure to dry air, exposed to dry air for 3 days, and under ambient conditions. (FIG. 4C) The capacity retention of $Li_xSi$—$Li_2O$ NPs exposed to dry air with varying durations. The inset shows the trend of capacity decay. (FIG. 4D) The capacity retention of $Li_xSi$—$Li_2O$ NPs exposed to air at different humidity levels.

(FIG. 5B) TEM image of the $Li_xSi$—$Li_2O$ NPs, stirred in DOL for 6 h; (FIG. 5C) XRD patterns of $Li_xSi$—$Li_2O$ NPs in DOL for 6 h and $Li_xSi$—$Li_2O$ NPs 6 h exposure in dry air.

FIGS. 6A-6C show electron energy loss (EELS) spectra of the $Li_xSi$—$Li_2O$ NPs showing the presence of (FIG. 6A) Li, (FIG. 6B) Si, and (FIG. 6C) O.

(FIG. 8B) cyclic voltammetry (CV) measurements of Si/$Li_xSi$—$Li_2O$ NPs and Si NPs at a scan rate of 0.1 mV $s^{-1}$ over the potential window of 0.01 to 1.5 V versus Li/$Li^+$; and (FIG. 8C) CV of MCMB/$Li_xSi$—$Li_2O$ composites and MCMB graphite at a scan rate of 0.1 mV $s^{-1}$ over the potential window of 0.01 to 2.0 V versus Li/$Li^+$.

FIGS. 9A-9C show (FIG. 9A) Coulombic efficiency versus cycle number of $Li_xSi$—$Li_2O$ NPs, $Li_xSi$—$Li_2O$ NPs added Si NPs, and Si NPs; (FIG. 9B) Coulombic efficiency and (FIG. 9C) accumulated irreversible capacity versus cycle number of MCMB/$Li_xSi$—$Li_2O$ composites with different weight ratios, with MCMB:$Li_xSi$—$Li_2O$=80:10 shown in (1), MCMB:$Li_xSi$—$Li_2O$=83:7 shown in (2), and a control graphite cell shown in (3).

(FIG. 10B) cycling performance of graphite flakes/$Li_xSi$—$Li_2O$ and graphite flakes control cell. The top line is the Coulombic efficiency of graphite flakes/$Li_xSi$—$Li_2O$ composite.

(FIG. 11B) the $1^{st}$ cycle voltage profile of $LiFePO_4$ half-cell.

(FIG. 12B) cycling performance of full cell with and without $Li_xSi$—$Li_2O$ nanoparticles. The top line is the Coulombic efficiency of full cell with $Li_xSi$—$Li_2O$ nanoparticles.

(FIG. 13B) first cycle voltage profiles of MCMB added with $Li_xSi$—$Li_2O$ NPs exposed to dry air for varying time (MCMB: $Li_xSi$—$Li_2O$=80:10 by weight).

FIGS. 16A-16F show characterizations of SiO and $SiO_2$ NPs before and after thermal lithiation. TEM images of (FIG. 16A) ball-milled SiO NPs and (FIG. 16B) lithiated SiO NPs. (FIG. 16C) STEM image of lithiated SiO NPs and the corresponding EELS maps of Li, Si and O distributions. TEM images of (FIG. 16D) sol-gel synthesized $SiO_2$ NPs and (FIG. 16E) lithiated $SiO_2$ NPs. (FIG. 16F) XRD patterns of lithiated SiO NPs and $SiO_2$ NPs.

FIGS. 17A-17F show electrochemical characteristics. (FIG. 17A) First cycle delithiation capacity of lithiated SiO NPs (line 2) and $SiO_2$ NPs (line 1). Galvanostatic lithiation/delithiation profile of $SiO_2$ NPs in $1^{st}$ cycle (line 3). The capacity is based on the mass of SiO or $SiO_2$ in the anode. (FIG. 17B) Cyclic voltammetry measurement of lithiated $SiO_2$ NPs at a scan rate of 0.1 mV s$^{-1}$ over the potential window from 0.01 to 2 V versus Li/Li$^+$. (FIG. 17C) First cycle voltage profiles of SiO NPs/lithiated SiO composite (55:10 by weight, line 2) and SiO control cell (line 1) show lithiated SiO NPs improve the $1^{st}$ cycle Coulombic efficiency of SiO. (FIG. 17D) First cycle voltage profiles of graphite/lithiated $SiO_2$ composite (84:6 by weight, line 2) and graphite control cell (line 1). (FIG. 17E) Cycling performance of graphite/lithiated $SiO_2$ composite (84:6 by weight, line 1), graphite/lithiated SiO composite (84:6 by weight, line 2) and graphite control cell (line 3) at C/20 for first three cycles and C/5 for the following cycles (1C=0.372 A/g C, the capacity is based on the mass of the active materials, including graphite, SiO and $SiO_2$ in $Li_xSi/Li_2O$ composites). The top line is the Coulombic efficiency of graphite/lithiated $SiO_2$ composite. (FIG. 17F) Cycling performance of lithiated SiO NPs and SiO control cell at C/50 for first two cycles and C/2 for the following cycles (1 C=2.67 A/g and the capacity is based on the mass of SiO NPs). The top line is the Coulombic efficiency of lithiated SiO NPs.

(FIG. 18A) The remaining capacities of lithiated SiO NPs exposed to dry air with varying duration. The inset shows the trend of capacity decay. (FIG. 18B) Capacity retention of $Li_xSi/Li_2O$ composites (line 3), $Li_xSi/Li_2O$ core-shell NPs (line 1) and fluorinated molecular modified $Li_xSi$ NPs (line 2) after 6 h storage in the air with different humidity levels. (FIG. 18C) The remaining capacities of lithiated SiO NPs in ambient air (35% RH-40% RH) with different durations. (FIG. 18D) XRD patterns of lithiated SiO NPs exposed to ambient air for 6 h (upper) and to humid air (10% RH) for 6 h (lower).

FIGS. 19A-19C show DFT simulation and reasons for improved stability. (FIG. 19A) DFT simulation is performed by cleaving along (001) plane of $Li_{22}Si_5$ and calculating the binding energy between O at different positions in $Li_2O$ with Li at (001) plane of $Li_{22}Si_5$. (FIG. 19B) Schematic diagram shows the difference between $Li_xSi/Li_2O$ composites and $Li_xSi/Li_2O$ core-shell NPs. (FIG. 19C) The table shows the binding energy of different bonds.

(FIG. 29B) TEM image of lithiated SiO NPs exposed to ambient air for 6 h.

FIGS. 31A-31F show characterizations of tin NPs before and after thermal lithiation. (FIG. 31A) SEM image, (FIG. 31B) TEM image and (c) XRD pattern of tin NPs. (FIG. 31D) SEM image, (FIG. 31E) TEM image and (FIG. 31F) XRD pattern of $Li_xSn$ alloy.

(FIG. 32B) First cycle voltage profiles of tin NPs/lithiated tin composite (6:2 by weight, line 2) and tin control cell (line 1) show lithiated tin NPs improve the $1^{st}$ cycle Coulombic efficiency of tin. (FIG. 32C) First cycle voltage profiles of graphite/lithiated tin (75:15 by weight, line 2) and graphite control cell (line 1). (FIG. 32D) Cycling performance of graphite/lithiated tin composite (line 1) and graphite control cell (line 2) at C/20 for first three cycles and C/5 for the following cycles.

(FIG. 33A) The remaining capacities of lithiated tin NPs exposed to dry air with varying duration. The inset shows the trend of capacity decay. (FIG. 33B) Capacity retention of lithiated tin NPs after 6 h storage in the air with different humidity levels. (FIG. 33C) The remaining capacities of lithiated tin NPs in ambient air (35% RH-40% RH) with different durations. (FIG. 33D) XRD patterns of lithiated tin NPs in ambient air (35% RH-40% RH) with different durations.

FIGS. 34A-34C show (FIG. 34A) XRD pattern (FIG. 34B) Cyclic voltammetry measurement and (FIG. 34C) delithiation capacity of lithiated $SnO_2$.

DETAILED DESCRIPTION

Introduction.

Silicon is a high-performance anode material for next generation lithium ion batteries, with an order of magnitude higher capacity than traditional graphite anode. In recent years, challenges of Si anode materials associated with large volume change (300%) during lithium insertion and extraction are largely addressed by well-designed nanostructures. However, the common issue associated with these anode materials is the increased solid electrolyte interphase (SEI) formation on high-surface-area nanostructures during the first cycle. The process consumes an appreciable amount of lithium, resulting in irreversible loss of capacity and low Coulombic efficiency (50-80%), while a value of at least 90% is desired for real applications. Such capacity loss is usually compensated by additional loading of cathode materials in commercial lithium ion batteries. However, the lithium metal oxide cathodes have lower specific capacity than the anodes. The excessive loading of cathode material causes appreciable reduction of battery energy density. It is therefore desirable to suppress such loss so as to increase the 1st cycle Coulombic efficiency.

$Li_xSi/Li_2O$ Core-Shell Nanoparticles

Overcoming the first cycle Coulombic loss is important for lithium ion batteries, which results mostly from the formation of SEI and lithium trapping at the anodes. It is discovered that $Li_xSi$—$Li_2O$ core-shell nanoparticles afford an excellent prelithiation reagent with high specific capacity to compensate the first cycle loss. A facile and scalable synthesis method of these nanoparticles has been developed by direct reaction of Si nanoparticles with lithium metal. $Li_xSi$—$Li_2O$ core-shell nanoparticles are compatible with conventional slurry process and exhibit high capacity under the dry air conditions with the protection of $Li_2O$ passivation shell, indicating these nanoparticles are compatible with the industrial battery fabrication process. Both Si and graphite anodes are successfully prelithiated with these nanoparticles to achieve high 1st cycle Coulombic efficiencies of 94% to 100%.

$Li_xSi$—$Li_2O$ core-shell NPs can be mixed with various anode materials to increase the 1st cycle Coulombic efficiency. It suppresses the undesired consumption of Li from cathode materials during SEI formation. The approach is generally applicable to various anode materials involving complex nanostructures, and thus a breakthrough for practical implementation of high-performance nanomaterials in lithium ion batteries.

Figure 1:
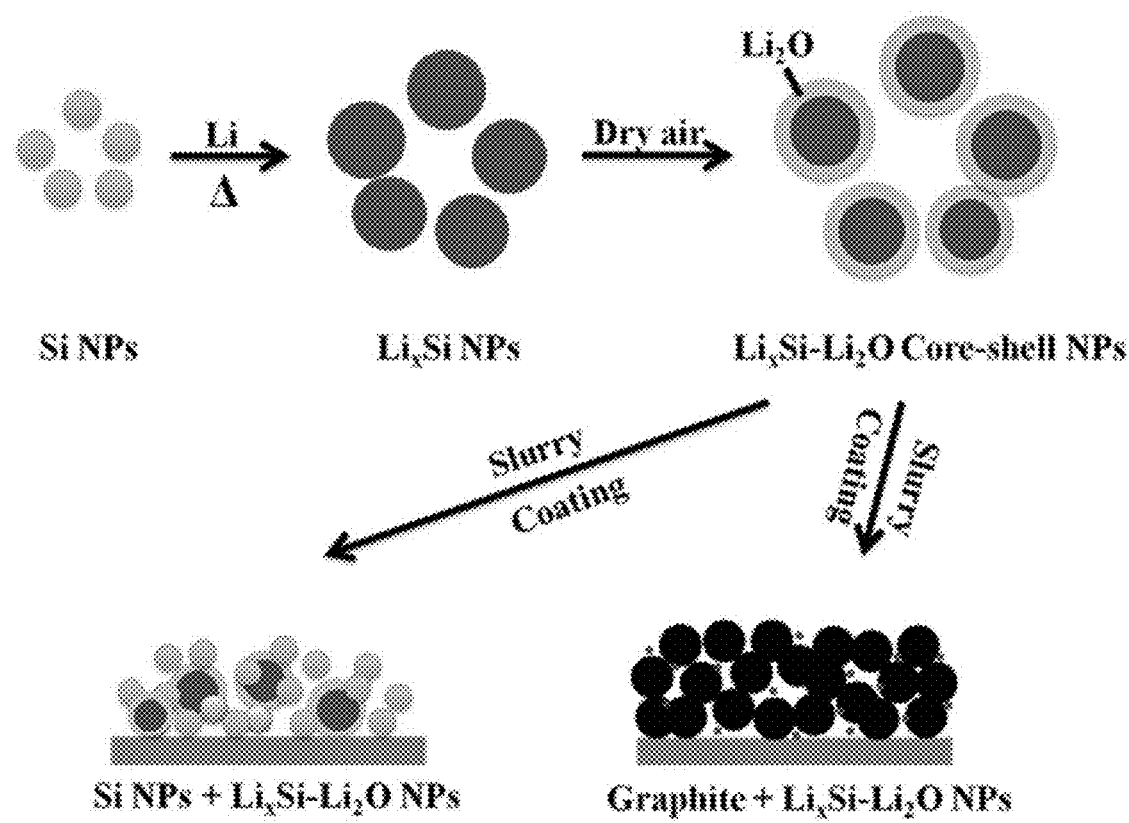
FIG. 1 shows schematic diagrams showing Si NPs reacting with melted Li to form $Li_xSi$ NPs. A dense passivation layer is formed on the $Li_xSi$ NPs after exposure to trace amounts of oxygen, preventing the $Li_xSi$ alloy from further oxidation in dry air. As-synthesized $Li_xSi$—$Li_2O$ core-shell NPs, compatible with the existing battery manufacturing environment, can be mixed with various anode materials during slurry processing and serve as an excellent prelithiation reagent.

Described here are chemically synthesized core-shell nanoparticles of $Li_xSi$—$Li_2O$ (see, e.g., FIG. 1) as an excellent prelithiation reagent, which can be mixed with various anode materials during slurry processing. $Li_xSi$ nanoparticles exhibit multiple attractive properties for prelithiation: 1) Fully lithiated $Li_xSi$ alloy has a sufficiently low potential of around 10 mV versus $Li/Li^+$ to prelithiate all types of anodes including graphite, Si, Ge and Sn. 2) $Li_xSi$ has very high specific capacity (about 4200 mAh/g of Si, about 2000 mAh/g of $Li_{4.4}Si$) for pre-storing lithium, so a small percentage of material is used for prelithiation. 3) Nanoscale $Li_xSi$-$Li_2O$ particles (about 100~200 nm) are helpful for distributing pre-stored Li uniformly across the anodes. Furthermore, using nanoscale $Li_xSi$—$Li_2O$ particles as prelithiation reagent is less likely to disturb the whole structure of the electrode. 4) Nanoscale $Li_xSi$ particles provide a localized lithium source to realize fast prelithiation of anode materials, compared to the process of inducing electrical shorting between anode materials and lithium metal foil. 5) $Li_xSi$ can benefit from the mature manufacturing infrastructure of the Si industry for scale up and low-cost manufacturing.

Another challenge associated with anode prelithiation is the high chemical reactivity of prelithiation reagents, which make them difficult to survive multiple processing steps (exposure to air and solvents, slurry mixing, coating and baking) during battery electrode fabrication. A protective coating is therefore desired. However, this coating should be activated later to ensure quick lithium ion diffusion for prelithiation, as $Li_xSi$ is a reactive prelithiation reagent.

Thus, also described here is how to protect and de-protect $Li_xSi$ using a $Li_xSi$—$Li_2O$ core-shell nanostructure. It is found that: 1) The core-shell nanoparticles rapidly react with solvents containing active protons such as water and alcohol. The slow reaction with oxygen, however, allows the formation of a dense $Li_2O$ shell that protects the $Li_xSi$ core in dry air environments over the long term. This is desirable since these nanoparticles are compatible with the low humidity environment of a dry room, commonly used in battery manufacturing. 2) For solvents without active protons, it is found that $Li_xSi$ can survive in low polarity solvents such as ether and toluene during slurry processing. Highly polar solvents such as N-methyl-2-pyrrolidinone (NMP) and organic carbonate can weaken the protection of the $Li_2O$ shell and react with the $Li_xSi$ core, making them poor candidates for solvents in slurry processing. At the end of the battery assembly process, carbonate electrolyte is injected, directly resulting in the activation of the facile lithium diffusion into anode materials. This is believed to be the first example of prelithiation of anode materials with stabilized $Li_xSi$ nanoparticles.

Synthesis and Characterizations of $Li_xSi$—$Li_2O$ Nanoparticles.

Figure 2A:
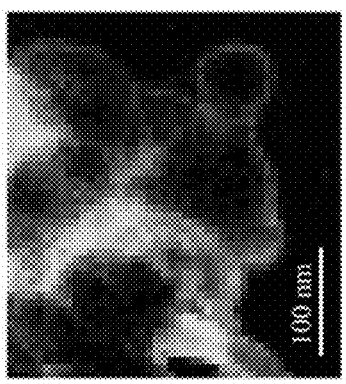
FIGS. 2A-2H show characterization of $Li_xSi$—$Li_2O$ core-shell NPs.
Figure 2B:
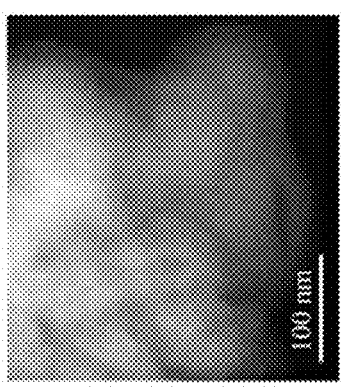
Figure 5A:
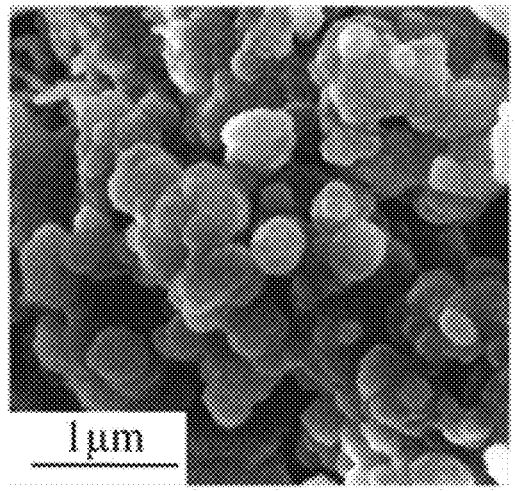
FIGS. 5A-5C show (FIG. 5A) SEM image of the $Li_xSi$—$Li_2O$ NPs.

$Li_xSi$ nanoparticles were synthesized by mechanical stirring of a stoichiometric mixture (1:4.4) of Si nanoparticles (~50 nm in diameter) and Li metal foil at 200° C. for 6 hours in a glove box (Ar-atmosphere, $H_2O$ level <0.1 ppm and $O_2$ level <3 ppm). In the process, the color of the powder changes from brown to black, indicating the formation of the $Li_xSi$ alloy. Due to trace oxygen in the glove box, a dense $Li_2O$ passivation layer will form outside the $Li_xSi$ NPs, resulting in the formation of $Li_xSi$—$Li_2O$ core-shell NPs and preventing $Li_xSi$ from further oxidizing. The $Li_2O$ passivation layer was evidenced by experimental characterization. Transmission electron microscopy (TEM) images were taken immediately after exposure of the samples to the electron beam to minimize the impact of the electron beam on the nanoparticles. TEM image (FIG. 2A) and SEM image (FIG. 5A) show that the size of the $Li_xSi$ NPs ranges from 100 to 200 nm, which is larger than the size of Si nanoparticles (50 nm) due to volume expansion and some aggregation of particles during the alloying process. The magnified TEM image (FIG. 2B) shows a thin passivation layer (~10 nm thick) on the surface of the $Li_xSi$ NPs.

Figure 2C:
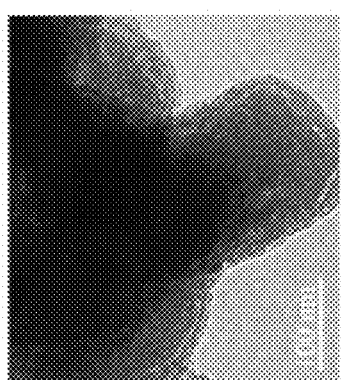
Figure 2D:
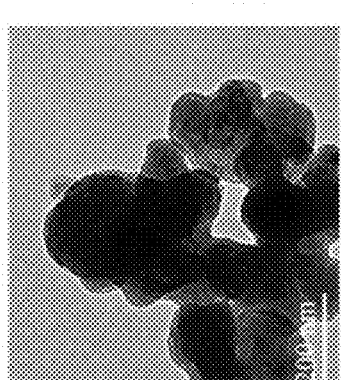
Figure 2H:
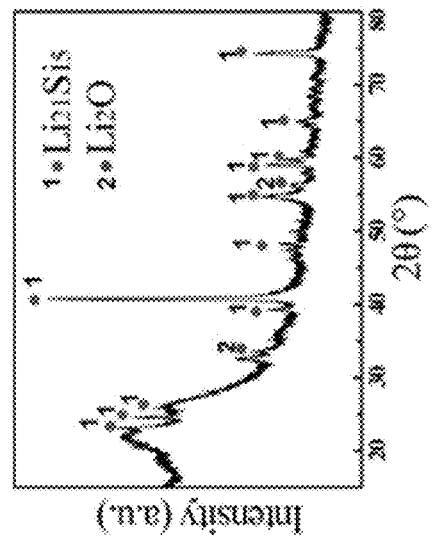
Figure 2E:
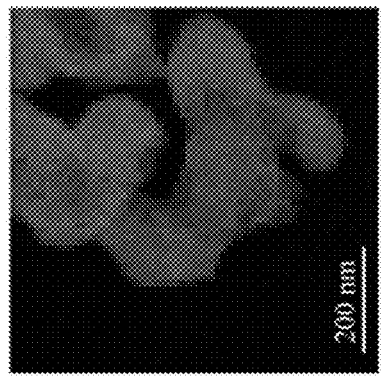
Figure 2F:
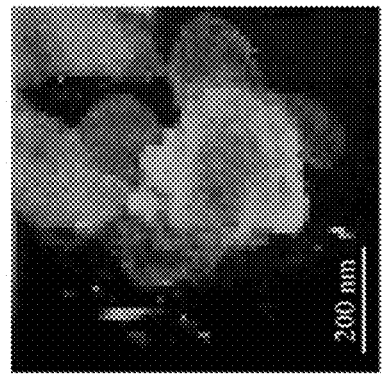
Figure 2G:
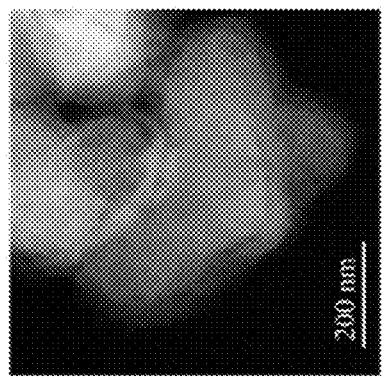

Compositional analysis of the $Li_xSi$ NPs was acquired by electron energy loss spectroscopy (EELS) in the TEM. EELS is ideal for Li mapping, since the shallow Li K-edge has a high ionization cross-section, which is about 10-100 times greater than that of other light elements like oxygen. Oxygen mapping is therefore performed with longer exposure time per step. Compared with the scanning transmission electron microscopy (STEM) image in FIG. 2C, the corresponding EELS oxygen map (FIG. 2D) reveals that oxygen is concentrated in the passivation layer of the core-shell NPs. To avoid possible beam damage through consecutive scans, a different region is selected for Li and Si mapping. STEM image (FIG. 2E) and corresponding EELS elemental mapping reveals the spatial distribution of Li (FIG. 2F) and Si (FIG. 2G), respectively. According to the elemental maps, Li is distributed throughout the entire nanoparticle, whereas Si is distributed in the internal part of the nanoparticle. Both images and elemental maps demonstrate that the nanoparticles form a core-shell structure, composed of a core of $Li_xSi$ and a shell of $Li_2O$. Furthermore, X-ray diffraction of the product (FIG. 2H) reveals the crystalline nature of the core-shell nanoparticles formed by $Li_{21}Si_5$ and $Li_2O$. The broad background comes from the Kapton tape used to protect the samples from moisture in the air. $Li_{21}Si_5$, a variation of the $Li_{22}Si_5$ phase with ordered vacancies, is the most thermally stable phase among the crystalline lithium silicides.

Electrochemical Performance.

Figure 3A:
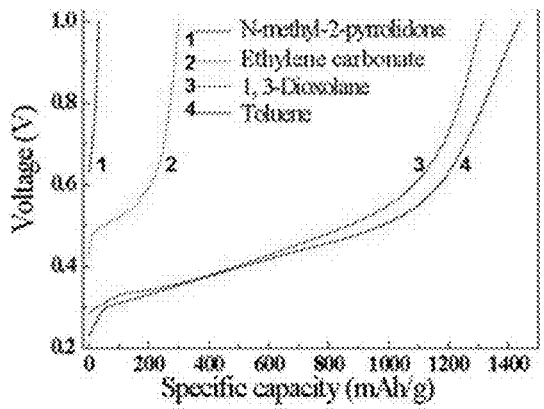
FIGS. 3A-3F show electrochemical characteristics.
Figure 7:
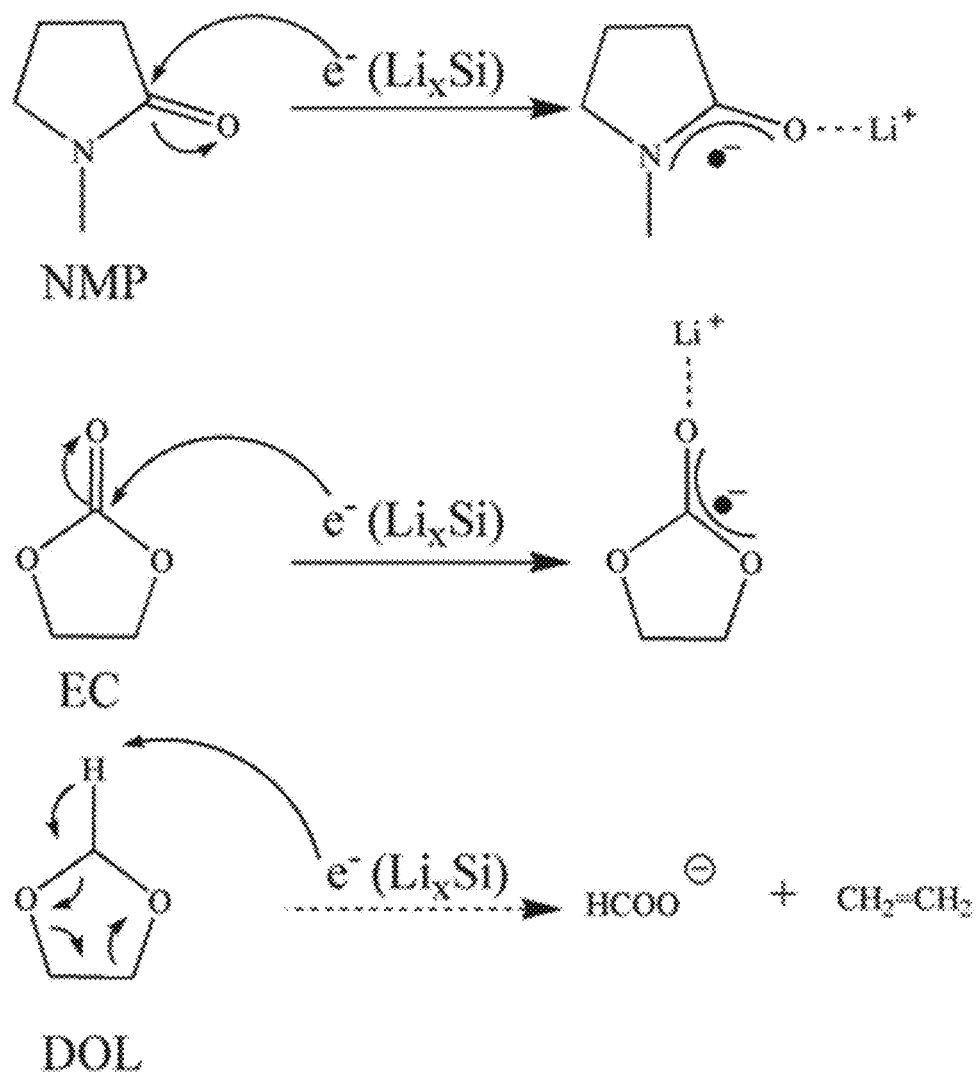
FIG. 7 shows reaction mechanisms with different solvents.
Figure 8A:
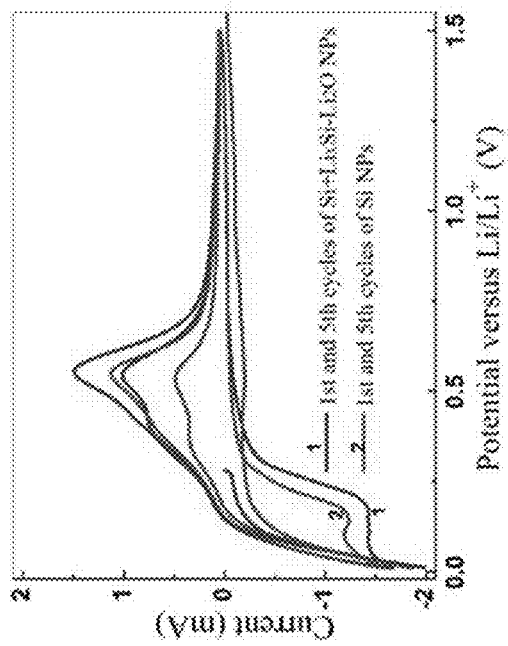
FIGS. 8A-8C show (FIG. 8A) specific capacity of the $Li_xSi$—$Li_2O$ NPs cycled at various rates from C/20 to 1C in the potential window of 0.01 to 1 V versus Li/$Li^+$. $1C=4.2$ A $g^{-1}$ Si.
Figure 8B:
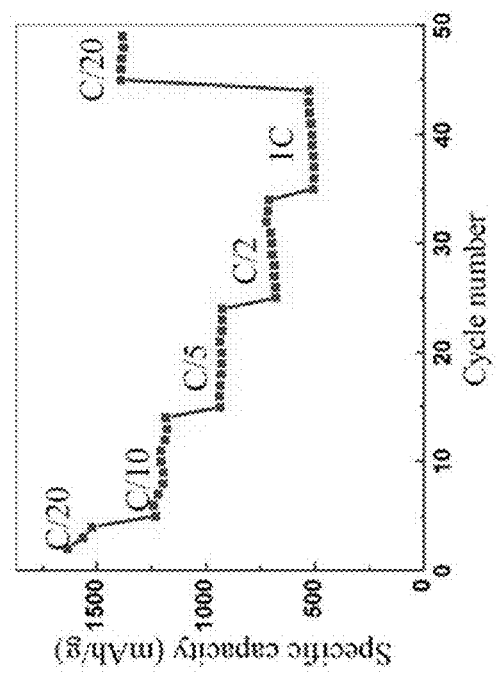
Figure 8C:
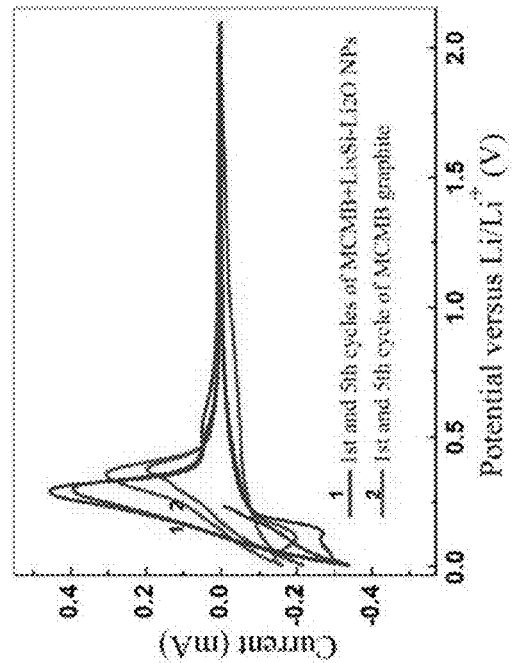

To study the electrochemical properties of the $Li_xSi$—$Li_2O$ NPs, half cells were fabricated with Li metal as a counter electrode. 1.0 M $LiPF_6$ in a mixture of 1:1 w/w ethylene carbonate/diethyl carbonate, 10 vol % fluoroethylene carbonate, and 1 vol % vinylene carbonate was used as the electrolyte. To find a proper solvent for the slurry process, $Li_xSi$—$Li_2O$ NPs were mixed with carbon black (Super P) and PVDF (65:20:15 by weight) in different solvents to form a slurry, which was then drop cast on copper foil and dried under vacuum. The entire battery electrode preparation process from the slurry formation to drop casting and drying were performed in a dry air glove box (dew point=−50° C.). The capacities of the resulting electrodes were studied by delithiating the samples to 1 V directly. FIG. 3A shows that there is almost no Li capacity extracted from the $Li_xSi$—$Li_2O$ NPs processed with N-methyl-2-pyrrolidinone (NMP) solvent. With ethylene carbonate (EC) solvent, the $Li_xSi$—$Li_2O$ NPs show a small Li extraction capacity of ~300 mAh/g, indicating that most of the stored Li is not active. Excitingly, $Li_xSi$—$Li_2O$ NPs are compatible with 1,3-dioxolane (DOL) and toluene (FIG. 3A), showing high extraction capacities of 1200-1400 mAh/g, which is sufficient to qualify it as a prelithiation reagent. Among these solvents, it appears that the difference lies in polarity (Dielectric constant: NMP 32.2, EC 89.8, DOL 7.1, toluene 2.4). The more polar solvents (e.g., NMP and EC) are more reactive than the less polar solvents (e.g., DOL and toluene). The detailed reaction mechanism is shown in FIG. 7. Because PVDF binder does not dissolve in toluene to form an uniform slurry, DOL is selected in the following experiments.

Figure 3B:
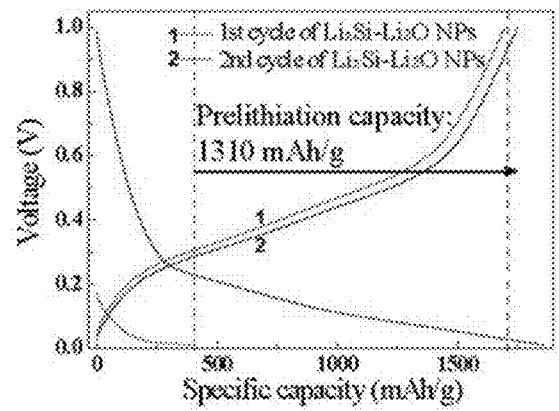
Figure 5B:
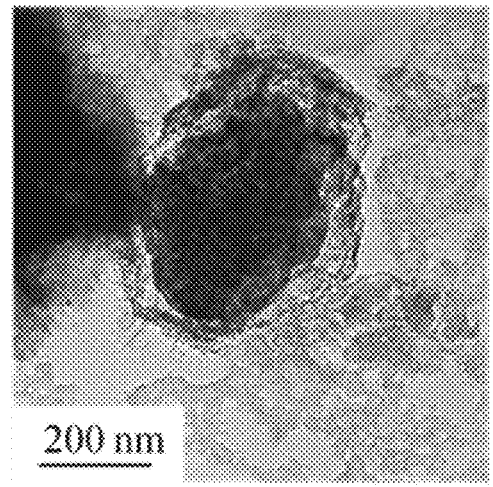
Figure 5C:
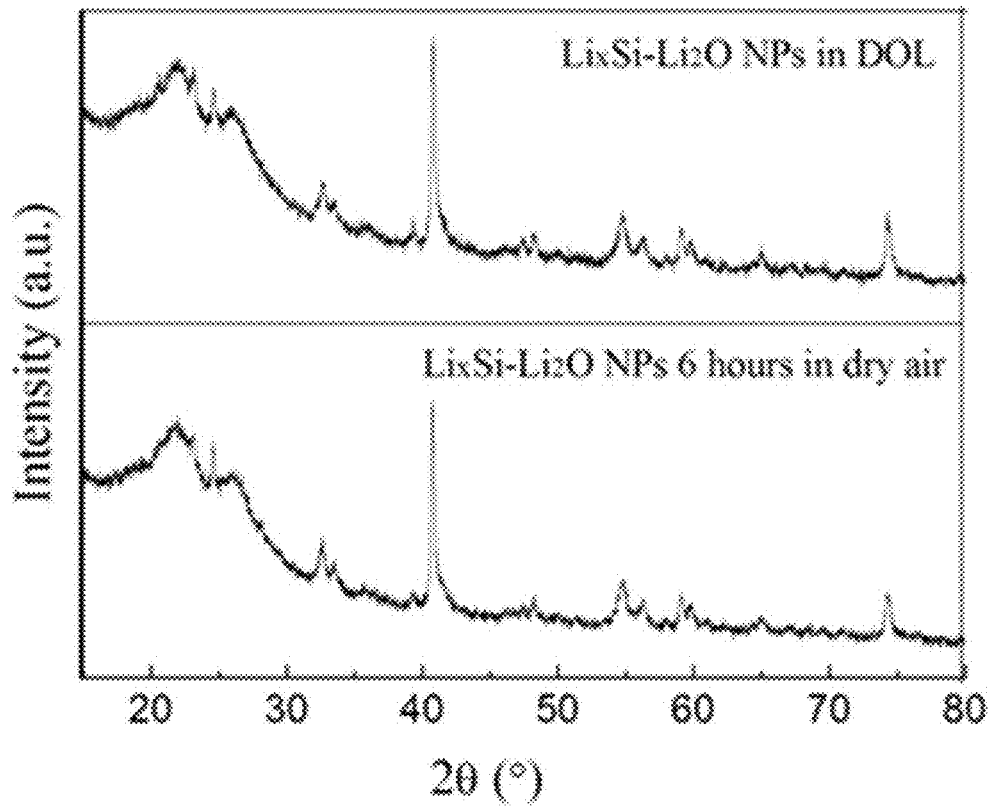

To evaluate the electrochemical behavior of the $Li_xSi$—$Li_2O$ NPs, normal deep galvanostatic lithiation/delithiation was used. FIG. 3B shows the voltage profiles of the $1^{st}$ and $2^{nd}$ cycles. $Li_xSi$—$Li_2O$ NPs were first lithiated to 0.01 V, and then delithiated to 1 V at a rate of C/20 (The specific capacity is calculated based on the mass of Si in the electrode. 1C=4.2 A $g^{-1}$ Si). The open circuit voltage (OCV) of $Li_xSi$—$Li_2O$ NPs was less than 0.2 V, which is significantly lower than that of crystalline Si NPs. The capacity preloaded into Si NPs is 1310 mAh/g, determined by subtracting the first lithiation capacity from the delithiation capacity. After the $1^{st}$ cycle, the voltage profile is similar to normal Si anodes. But the $2^{nd}$ cycle Coulombic efficiency of the $Li_xSi$—$Li_2O$ NPs is 96%, still higher than that of Si NPs (93%) (FIG. 9A). During the slurry process, DOL will likely decompose on the surface of the $Li_xSi$—$Li_2O$ core-shell NPs to form a thin coating due to the strong reducing power of $Li_xSi$ (FIG. 5B). The reaction consumes part of the Li stored in the $Li_xSi$—$Li_2O$ NPs, and a significant amount of electrochemically active Li is preserved as the prelithiation reagent.

Figure 3C:
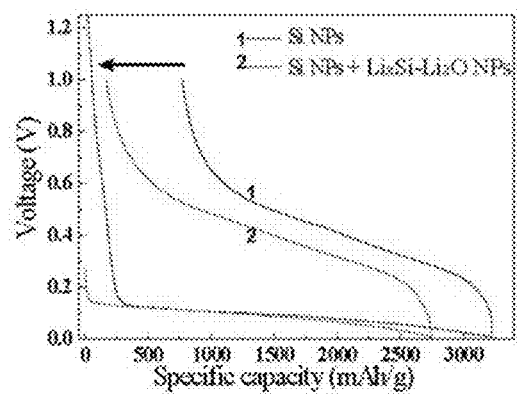
Figure 3D:
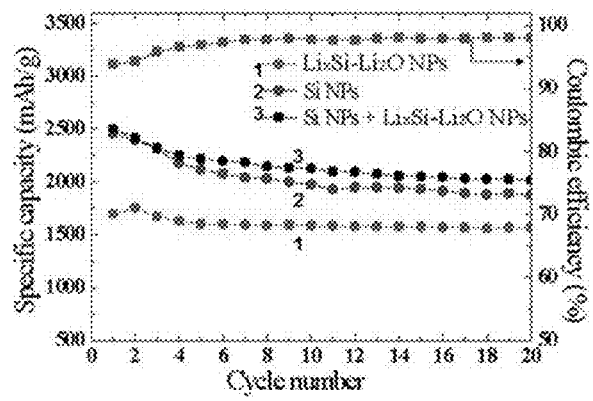

FIG. 3C demonstrates that $Li_xSi$—$Li_2O$ NPs can be used as a prelithiation reagent to improve the $1^{st}$ cycle Coulombic efficiency of normal Si NP anodes. The anodes were made by forming a slurry of Si NPs, $Li_xSi$—$Li_2O$ NPs, carbon black and PVDF binder with a mass ratio of 50:15:20:15. The dimensions of the $Li_xSi$—$Li_2O$ NPs are similar to that of Si NPs, so the $Li_xSi$-$Li_2O$ NPs were more uniformly distributed in the electrode compared with a large-size prelithiation reagent. After a coin cell was fabricated, it took 6 h for the anode to reach equilibrium. The first cycle voltage profile reveals an OCV of 0.20V, much lower than that of the control cell, which indicates partial prelithiation of the Si NPs. The capacity of the $Li_xSi$—$Li_2O$ NPs compensates the irreversible capacity loss of the Si NPs in the first cycle. Therefore, the $1^{st}$ cycle Coulombic efficiency increased from 76% to 94%. In addition, the lithiation capacity due to SEI formation decreases, due to the pre-formation of SEI during the prelithiation process. The electrochemical cycling performance was evaluated using deep lithiation/delithiation cycling from 1 to 0.01 V. The $Li_xSi$—$Li_2O$ NPs exhibited improved cycling performance over Si NPs at C/20 as displayed in FIG. 3D. By using $Li_xSi$—$Li_2O$ NPs as anode material, enough void space formed during the delithiation can be pre-built into the electrode structure to accommodate the volume expansion during the subsequent lithiation process. Accordingly, the introduction of $Li_xSi$—$Li_2O$ NPs into Si NP anodes did not affect the cycling performance of Si NPs (The specific capacity was based on the total mass of Si in the electrode. 1C=4.2 A $g^{-1}$ Si).

Figure 3E:
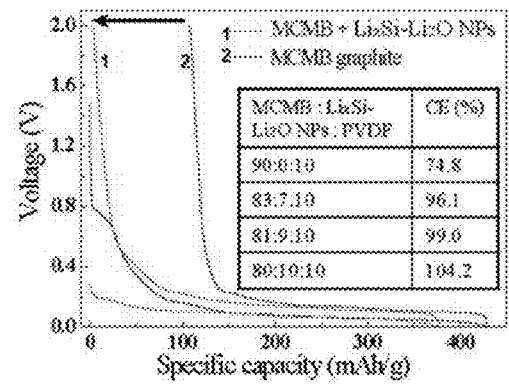
Figure 3F:
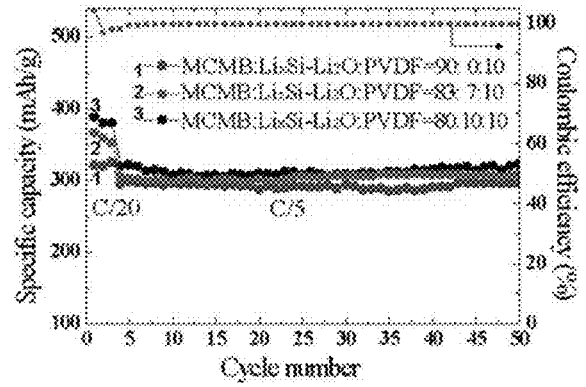
Figure 10A:
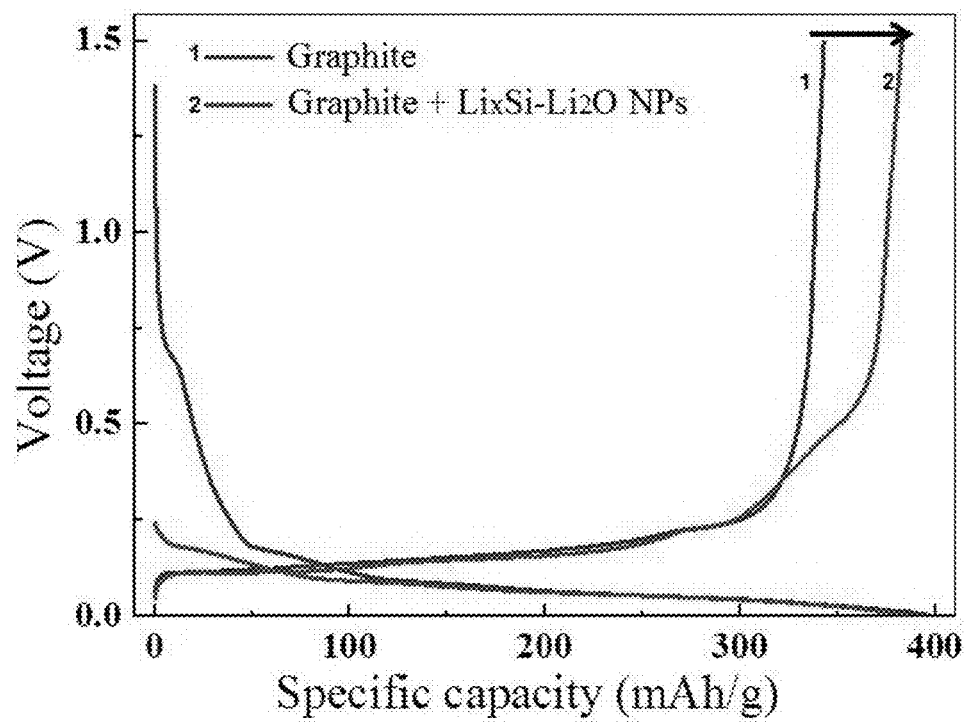
FIGS. 10A-10B show (FIG. 10A) first cycle voltage profiles of graphite flakes/$Li_xSi$—$Li_2O$ (83:7 by weight) and graphite flakes control cell.
Figure 10B:
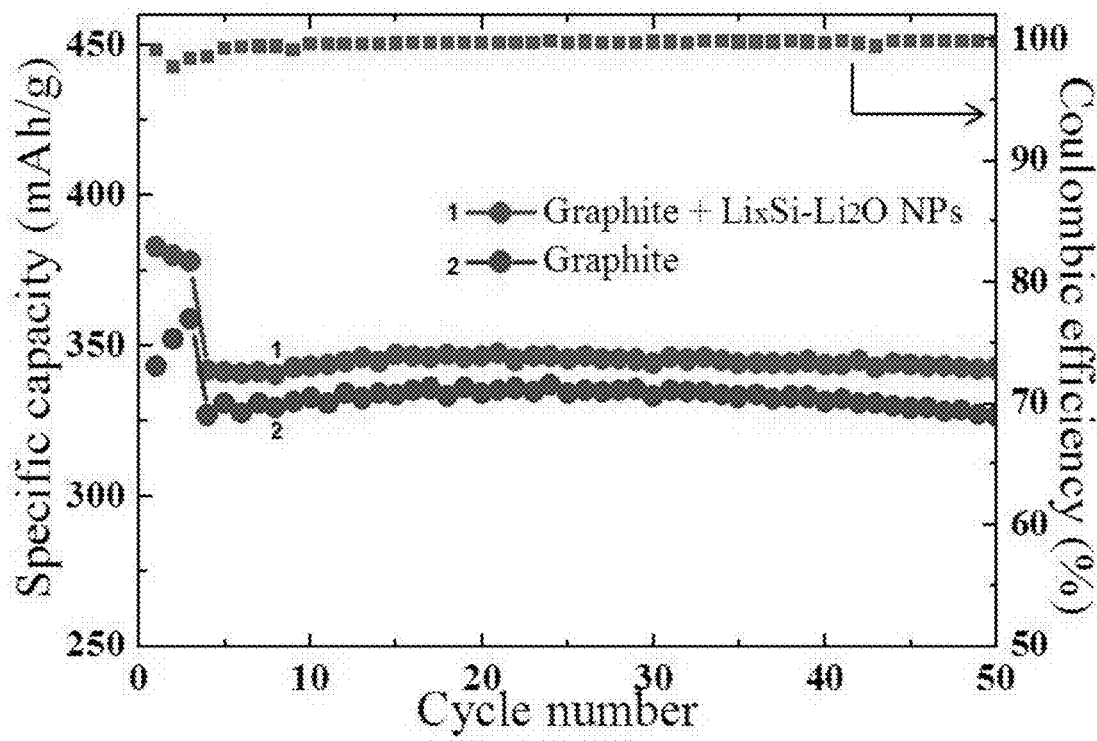
Figure 11A:
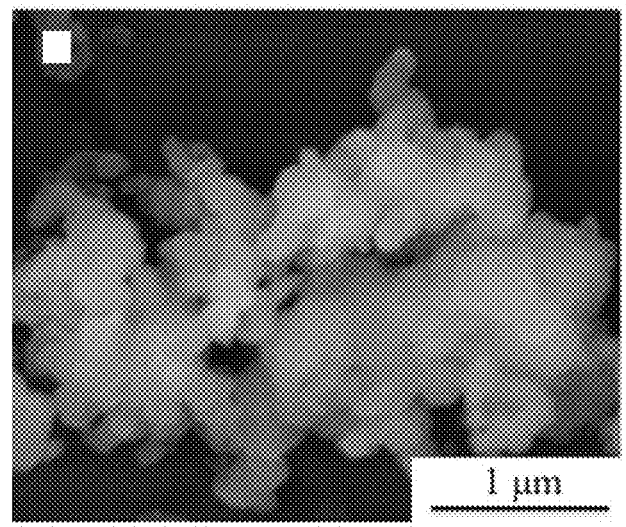
FIGS. 11A-11B show (FIG. 11A) SEM image of $LiFePO_4$ from MTI.
Figure 11B:
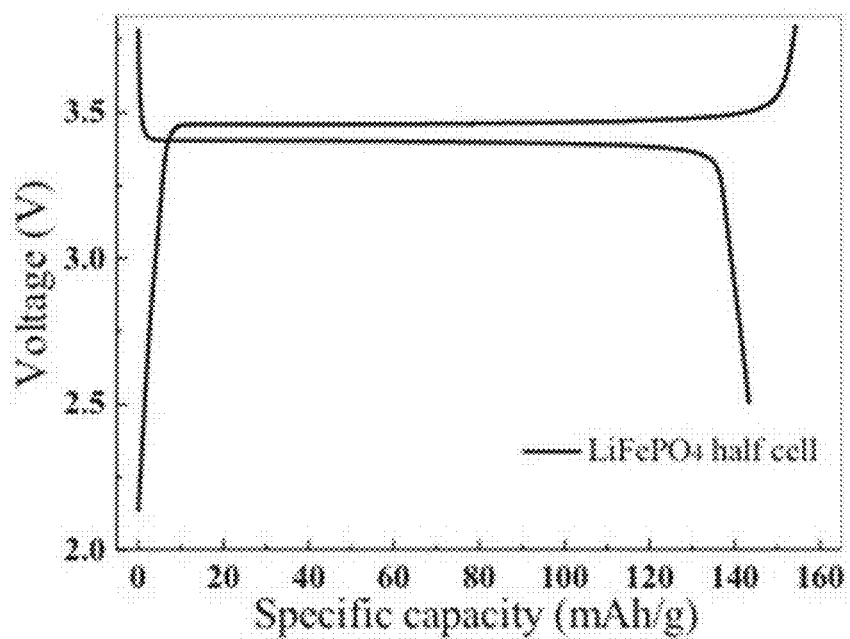
Figure 12A:
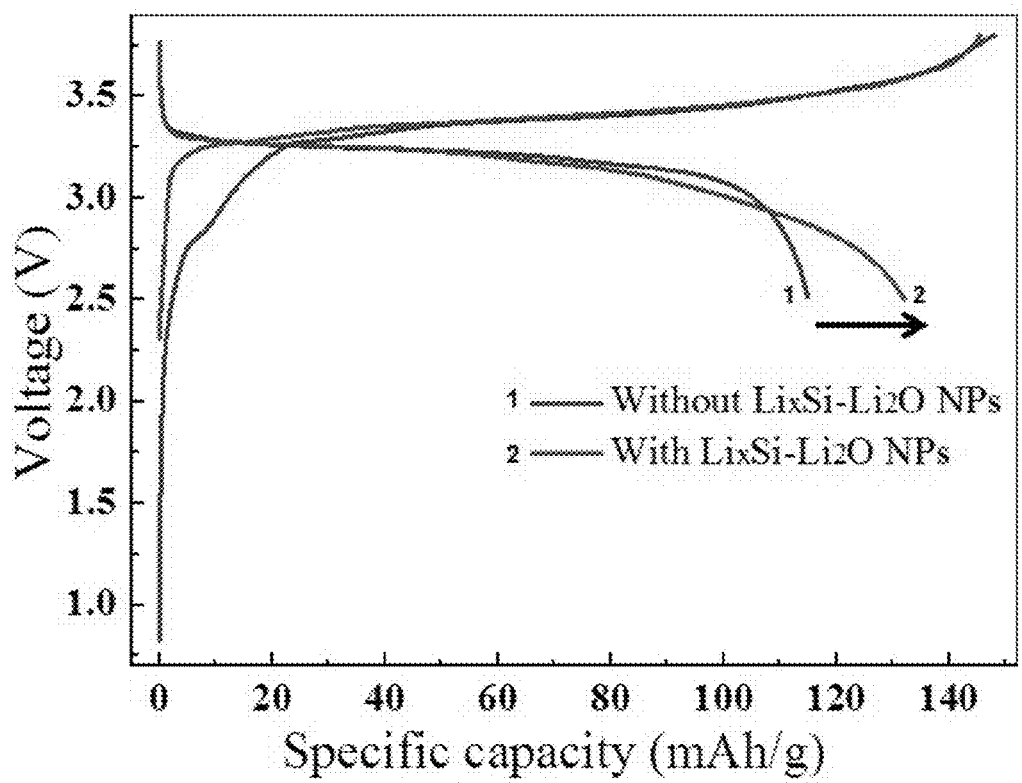
FIGS. 12A-12B show (FIG. 12A) first cycle voltage profiles of graphite/$LiFePO_4$ full cell with and without $Li_xSi$—$Li_2O$ nanoparticles.
Figure 12B:
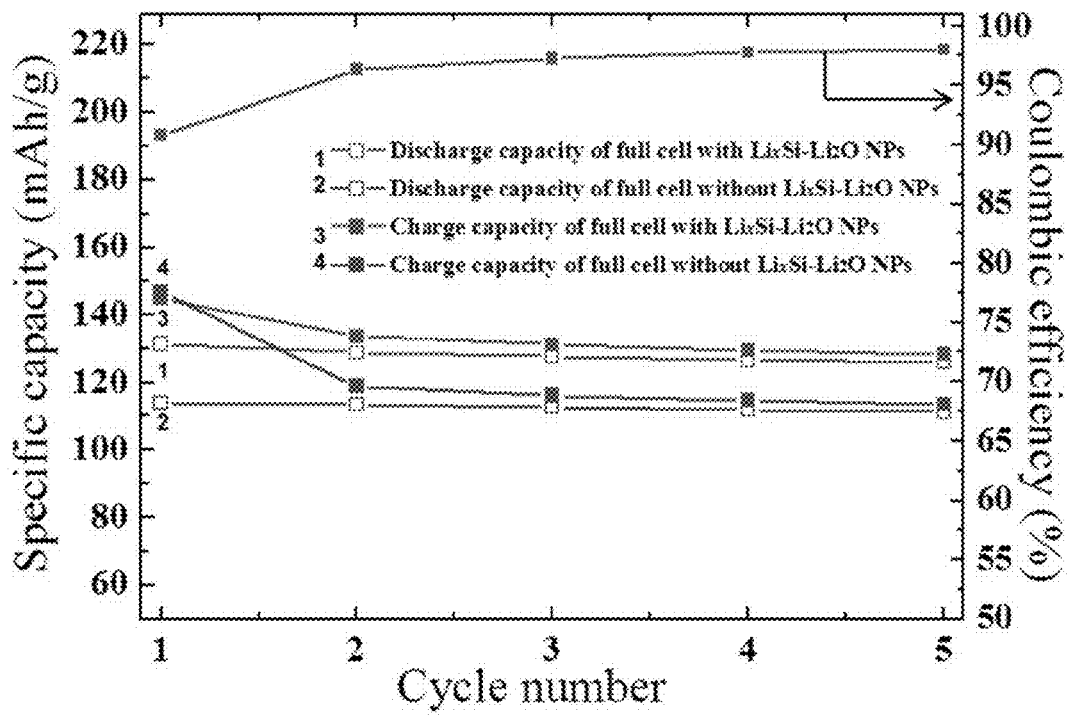

$Li_xSi$—$Li_2O$ NPs can also be used to compensate the irreversible capacity loss of existing graphite anodes as shown in the first cycle voltage profiles (FIG. 3E). Graphite anodes composed of mesocarbon microbeads (MCMB) graphite and PVDF binder (90:10 by weight) were measured in a voltage window from 0.005 to 2 V as a control. In FIG. 3E, the MCMB graphite voltage profile reveals a sloping region between 0.7 and 0.2 V, corresponding to SEI formation during first cycle lithiation. As a result, the first lithiation capacity of MCMB graphite is higher than the theoretical capacity of graphite (372 mAh/g), whereas the $1^{st}$ cycle Coulombic efficiency is just 75%. Prelithiation of the MCMB graphite by $Li_xSi$—$Li_2O$ NPs (mass ratio 81:9) yields a $1^{st}$ cycle Coulombic efficiency of 99%. The electrochemical potential of the electrode is close to 0.2 V, indicating partial prelithiation of MCMB graphite. The incorporation of $Li_xSi$—$Li_2O$ NPs decreases the typical lithiation capacity, due to the pre-formation of SEI during the prelithiation process. As shown in the table in FIG. 3E, the $1^{st}$ cycle Coulombic efficiency of MCMB anodes can be adjusted by tuning the amount of $Li_xSi$—$Li_2O$ additive. The $1^{st}$ cycle Coulombic efficiency ranges from 96% to 104% by varying the mass ratio of MCMB to $Li_xSi$—$Li_2O$ NPs from 83:7 to 80:10. The MCMB/$Li_xSi$—$Li_2O$ composites (mass ratio of 83:7 and 80:10) exhibited stable cycling performance at C/20 for the first three cycles and C/5 for the following cycles (1C=372 mA $g^{-1}$ C) as displayed in FIG. 3F. The specific capacity was based on the mass of MCMB graphite and Si in the $Li_xSi$—$Li_2O$ additives. The capacities of MCMB/$Li_xSi$—$Li_2O$ composites are slightly higher than that of the control graphite cell, contributed by the capacity stored in the $Li_xSi$—$Li_2O$ NPs. The incorporation of $Li_xSi$—$Li_2O$ NPs into the MCMB graphite electrode does not damage the structure of the electrode during cycling. As a result, the cycling performance of MCMB graphite is not affected. Furthermore, $Li_xSi$—$Li_2O$ additives also improve the $2^{nd}$ cycle Coulombic efficiency of MCMB and Coulombic efficiency of the subsequent cycles is comparable to cells without additives (FIG. 9B). Prelithiation of graphite flakes by $Li_xSi$—$Li_2O$ NPs (mass ratio 83:7) shows consistent results, increasing $1^{st}$ cycle Coulombic efficiency from 87% to 99% (FIG. 10A). Graphite/LiFePO$_4$ full cells are used to investigate the effect of $Li_xSi$—$Li_2O$ particles on full cell performance. One full cell is composed of graphite flake anode prelithiated with $Li_xSi$—$Li_2O$ particles (graphite flakes:$Li_xSi$—$Li_2O$:PVDF=83:7:10), whereas another one is composed of an anode with regular graphite flakes (graphite flakes:PVDF=90:10). The cells are measured in the voltage window from 2.5 V to 3.8 V at C/10 (FIG. 12A). The rate and cell capacity are both presented based on the mass of LiFePO$_4$ in the cathode. The voltage profile reveals a plateau between 2.6 and 3.2 V, corresponding to the SEI formation in the anode during charging. After incorporating $Li_xSi$—$Li_2O$ particles into the anode, the open circuit voltage before cycling is about 2.3 V, significantly higher than 0.8 V for regular full cell. As shown by the voltage profile, the incorporation of $Li_xSi$—$Li_2O$ NPs compensates the irreversible Li consumption resulting from SEI formation. Accordingly, the $1^{st}$ cycle Coulombic efficiency increases from 77.6% to 90.8%. In the following cycles, the cell with $Li_xSi$—$Li_2O$ NPs consistently shows a higher capacity than the regular cell (FIG. 12B).

Stability of $Li_xSi$—$Li_2O$ NPs.

Figure 4B:
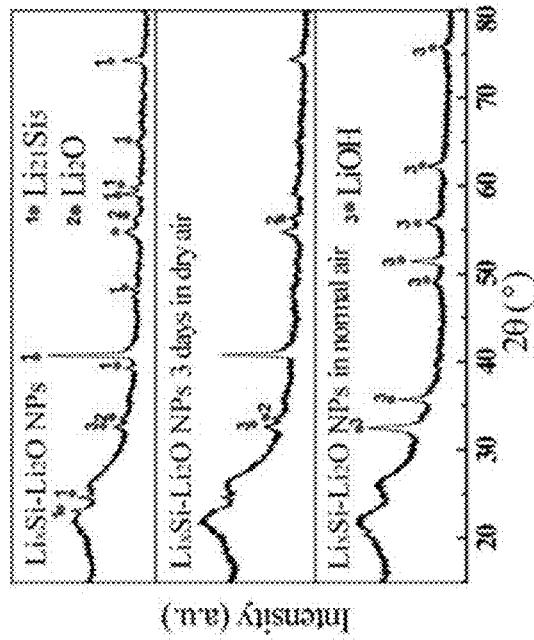
FIGS. 4A-4D show stability of $Li_xSi$—$Li_2O$ NPs.
Figure 4D:
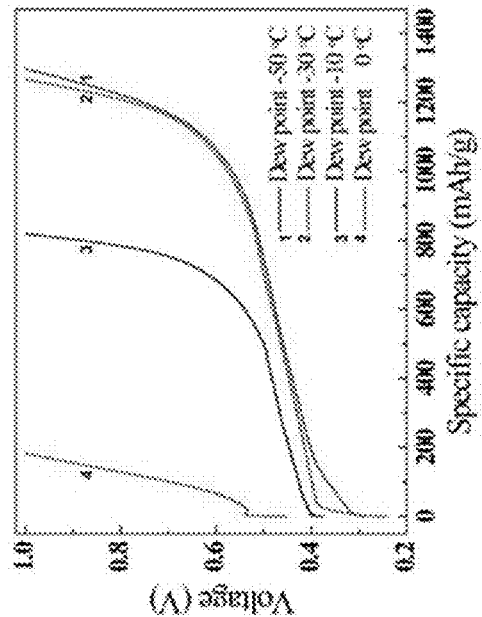
Figure 4A:
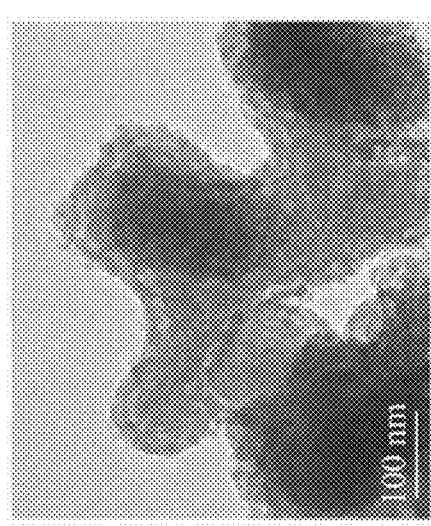
Figure 4C:
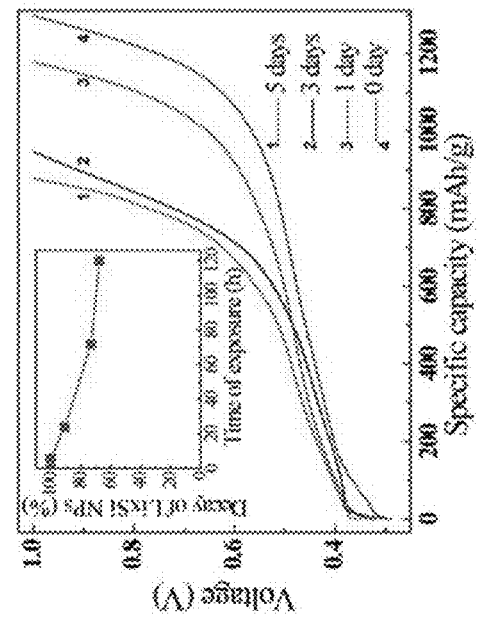
Figure 13A:
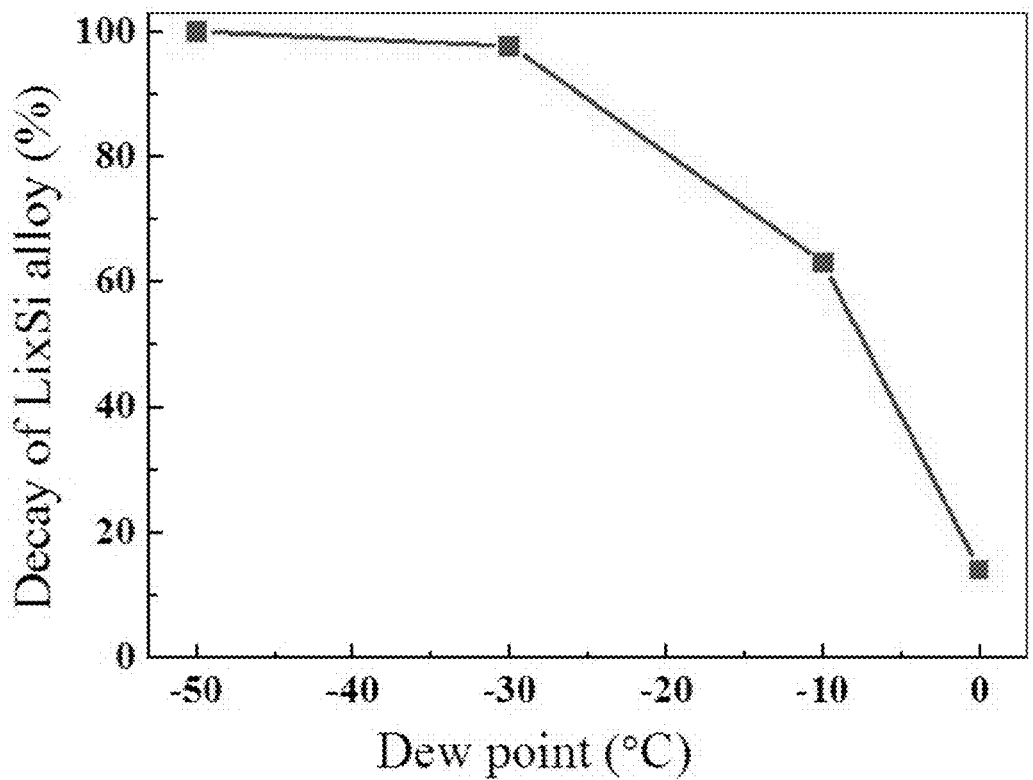
FIGS. 13A-13B show (FIG. 13A) the trend of capacity decay with air humidity.
Figure 13B:
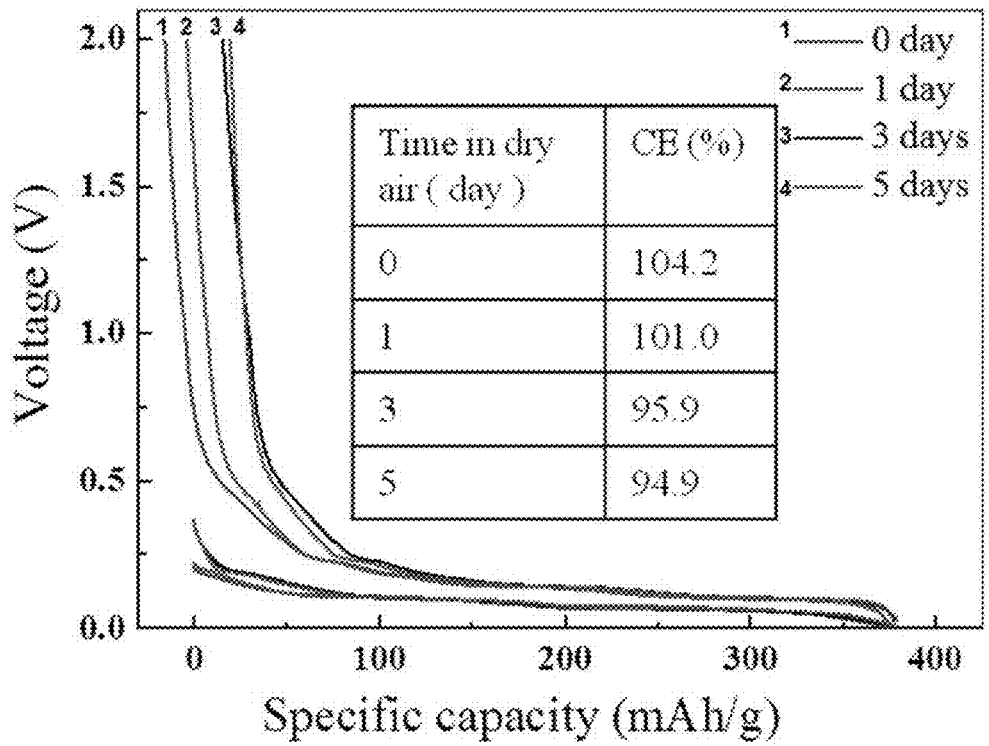
Figure 14:
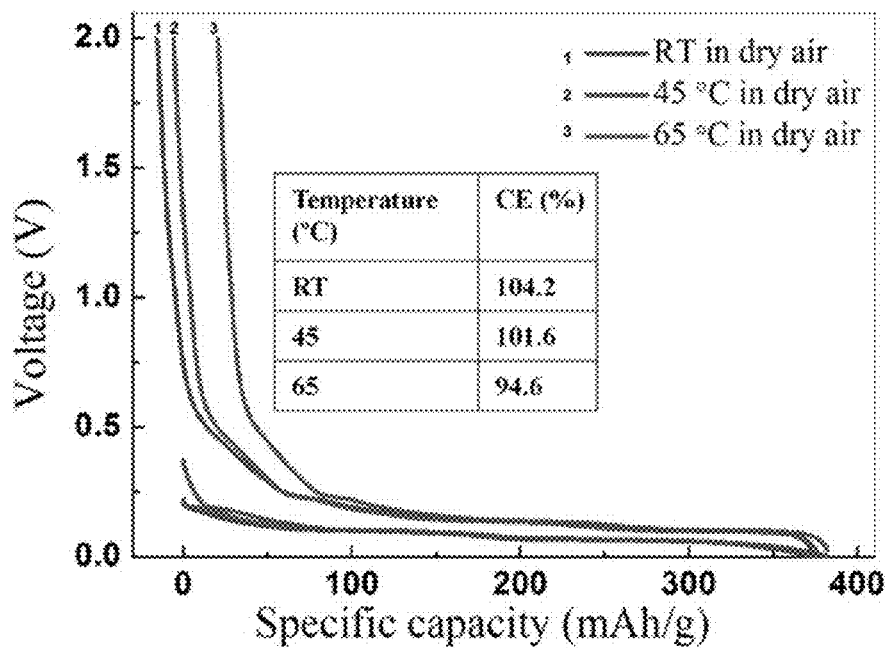
FIG. 14 shows first cycle voltage profiles of MCMB/$Li_xSi$—$Li_2O$ NPs composites (80:10 by weight) heated at 45° C. and 65° C. for 1 h.

FIG. 4A is a TEM image showing that the $Li_xSi$—$Li_2O$ core-shell nanostructure remains after 3 days of exposure to dry air (dew point=−50° C.), although a thicker passivation layer of ~20 nm is observed, as compared to the original 10 nm-thick layer. X-ray diffraction (FIG. 4B) analysis confirms that the sample exposed to dry air for 3 days is still composed of crystalline $Li_{21}Si_5$ and $Li_2O$. There is no substantial change in the XRD pattern as compared with the sample without exposure to dry air. The capacities of the $Li_xSi$—$Li_2O$ NPs exposed to dry air for different numbers of days were studied by delithiating the $Li_xSi$—$Li_2O$ NPs to 1 V directly (FIG. 4C). After exposure to dry air for one day, there is 1175 mAh/g capacity, a 9% decay from time zero. After 5 days of exposure, the $Li_xSi$—$Li_2O$ NPs still exhibit a capacity of 880 mAh/g (line 1 in FIG. 4C), showing high capacity retention of 70%. The capacity of the $Li_xSi$—$Li_2O$ NPs decays slowly with exposure time. The $Li_xSi$—$Li_2O$ NPs stored in dry air for various durations were added into MCMB graphite to optimize the $1^{st}$ cycle Coulombic efficiency (MCMB:$Li_xSi$—$Li_2O$ NPs=8:1 by weight). The corresponding cells were tested in the voltage window of 0.005-2 V. The first cycle voltage profiles of the MCMB/$Li_xSi$—$Li_2O$ composites (FIG. 13B) indicate that $Li_xSi$—$Li_2O$ NPs stored in dry air for 5 days are still active enough to prelithiate MCMB graphite, yielding a 20% improvement in the $1^{st}$ cycle Coulombic efficiency. More attractively, $Li_xSi$—$Li_2O$ NPs exhibit excellent dry air stability even at elevated temperatures. MCMB/$Li_xSi$—$Li_2O$ composites baked at 45° C. for 1 h in dry air exhibit a $1^{st}$ cycle Coulombic efficiency of 101.6%. $Li_xSi$—$Li_2O$ NPs after baking at 65° C. can still effectively prelithiate MCMB graphite to counteract the first cycle capacity loss as shown in FIG. 14. To test humidity stability, the $Li_xSi$—$Li_2O$ nanoparticles were stored in an air box with different dew points for 6 h. The capacity of the samples in air with different humidity was studied by discharging the samples to 1 V directly (FIG. 4D). The electrochemical performance demonstrates that 6 h of exposure to air with dew point of −30° C. does not affect the capacity. Even in air with a dew point of −10° C., the $Li_xSi$—$Li_2O$ nanoparticles still exhibit a capacity of 819 mAh/g. However, the $Li_xSi$—$Li_2O$ NPs were completely converted to LiOH under high humidity, as confirmed by the XRD pattern in FIG. 4B.

Additional Characterizations.

Electrochemical characterization (FIG. 3B) shows that the amount of Li preloaded into the Si NPs is 1310 mAh/g for Si. Li was partially consumed to form a $Li_2O$ passivation layer to protect $Li_xSi$ from further oxidation. During the slurry process, DOL decomposes on the surface of the nanoparticles to form a thin layer due to the strong reducing power of $Li_xSi$, further consuming a fraction of the Li. However, the remaining capacity of the $Li_xSi$—$Li_2O$ NPs is still sufficient as a prelithiation reagent, higher than most Li-rich cathode materials. Compared with the conventional approach of extra loading of cathode materials, prelithiation using $Li_xSi$—$Li_2O$ NPs more effectively increases the specific energy and energy density of batteries. $Li_xSi$—$Li_2O$ core-shell NPs can be mixed with various anode materials in the slurry process to achieve improved $1^{st}$ cycle Coulombic efficiency. Nanoscale $Li_xSi$ particles provide uniform and localized Li distribution to realize fast prelithiation of anode materials. Cycling performance of anode materials is negligibly affected by the addition of prelithiation reagents. The low material loading and particle dimensions are less likely to disturb the structure of the electrode. In addition, void spaces will be formed through delithiation of the $Li_xSi$ additive which accommodates the volume expansion during the next lithiation process.

As shown in FIG. 4C, the capacity retention is 91% after exposure to dry air for 1 day indicating that the $Li_xSi$—$Li_2O$ NPs are sufficiently stable to undergo battery fabrication process in a dry room. $Li_xSi$—$Li_2O$ NPs exposed to dry air for 5 days are still active enough to prelithiate MCMB graphite, which yields a 20% improvement in the $1^{st}$ cycle Coulombic efficiency (line 4 in FIG. 13B), indicating the potential for long-term storage. The dry air stability can be attributed to the unique core-shell nanostructure. The dense $Li_2O$ passivation layer has a remarkable effect in preventing $Li_xSi$ NPs from thermally oxidizing in dry air.

In summary, an one-step thermal alloying process to synthesize $Li_xSi$—$Li_2O$ core-shell NPs has been demonstrated. These nanoparticles exhibit high capacity under dry air conditions with the protection of the $Li_2O$ passivation shell, indicating that $Li_xSi$—$Li_2O$ NPs are compatible with industrial battery fabrication processes in a dry room. Both commercial Si nanoparticles and graphite are prelithiated with $Li_xSi$—$Li_2O$ NPs, which improves the $1^{st}$ cycle Coulombic efficiency and suppresses the undesired consumption of Li from cathode materials during SEI formation. The approach is generally applicable to various anode materials involving complex nanostructures. In addition, $Li_xSi$ alloy also serves as an anode material to pair with all high capacity lithium-free cathodes for next generation high-energy-density lithium-ion batteries.

$Li_xSi$/$Li_2O$ Composites

Figure 15:
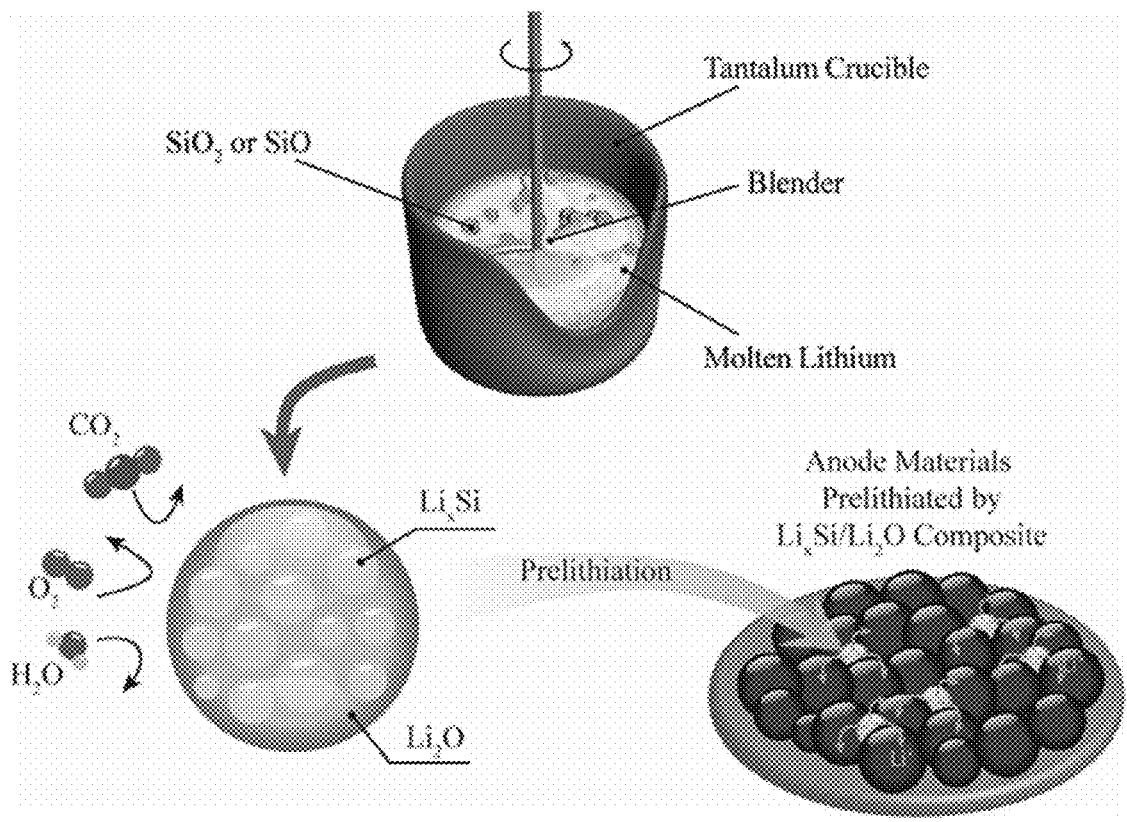
FIG. 15 shows schematic diagrams of an one-pot thermal alloying process to synthesize $Li_xSi/Li_2O$ composites. Low-cost SiO or $SiO_2$ are employed as the starting materials. $Li_xSi/Li_2O$ composites exhibit unparalleled stability both in dry and humid air atmosphere, which are readily mixed with various anode materials during slurry process to serve as an excellent prelithiation reagent.

Disclosed here is an one-pot thermal alloying process to synthesize $Li_xSi$/$Li_2O$ composites, using low-cost SiO or SiO$_2$ as starting materials as shown in FIG. 15. The extraction capacities of $Li_xSi$/$Li_2O$ composites derived from SiO and SiO$_2$ were 2120.7 mAh/g and 1543.2 mAh/g based on the mass of SiO and SiO$_2$, respectively. Active $Li_xSi$ nanodomains embedded in a robust $Li_2O$ matrix allows the unparalleled stability in both dry and humid air. Besides negligible capacity decay in dry air, $Li_xSi$/$Li_2O$ composites exhibited a high capacity retention of 1240.3 mAh/g after 6 h exposure to ambient air (>35% RH). Due to the sufficiently low potential, $Li_xSi/Li_2O$ composites can be mixed with various anode materials such as SiO, Sn and graphite during slurry processing to increase the $1^{st}$ cycle CE. Aside from being employed as the prelithiation additive, $Li_xSi/Li_2O$ composites also afford remarkable battery performance as the anode material. With stable cycling performance and consistently high CEs (e.g., 99.81% at $7^{th}$ cycle and stable at 99.87% for later cycles), this material can replace Li metal anode in $Li-O_2$ and Li—S batteries.

Synthesis and Characterizations of $Li_xSi/Li_2O$ Composites.

Figures 16D, 16E:
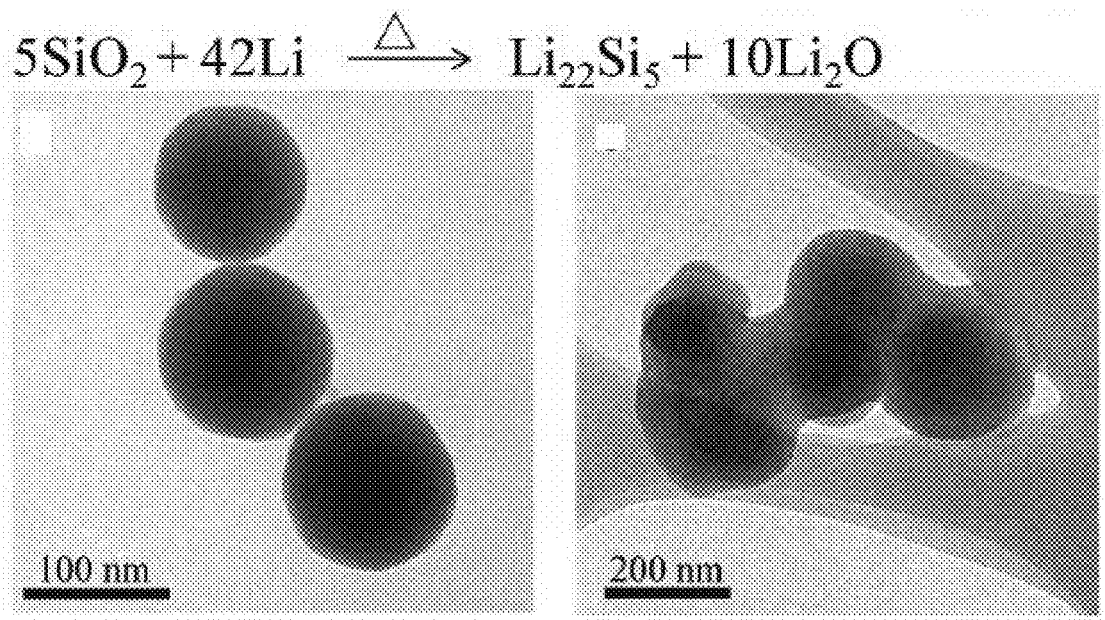
Figure 16F:
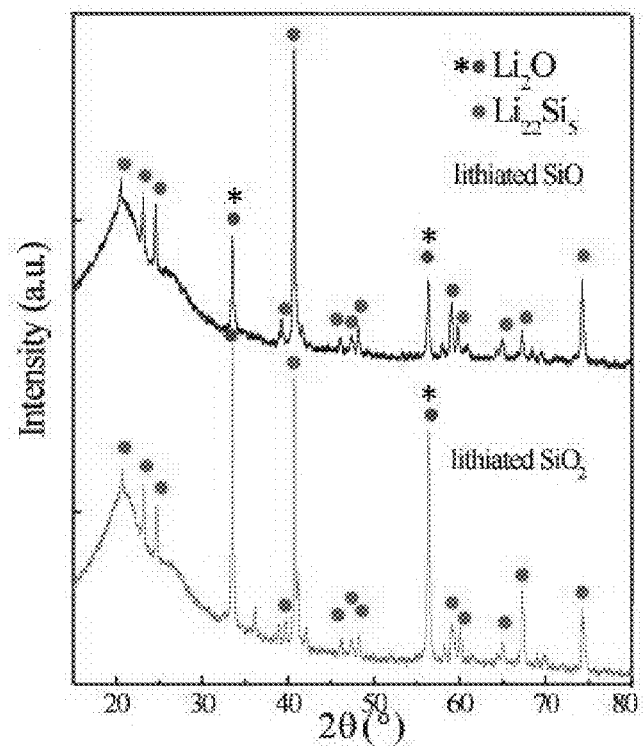
Figure 21A:
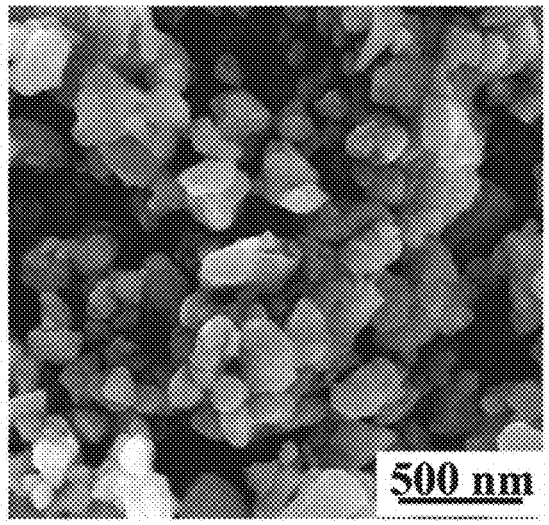
FIGS. 21A-21C show SEM images of (FIG. 21A) ball-milled SiO NPs, (FIG. 21B) sol-gel synthesized $SiO_2$ NPs, and (FIG. 21C) thermal lithiated SiO NPs.
Figure 21B:
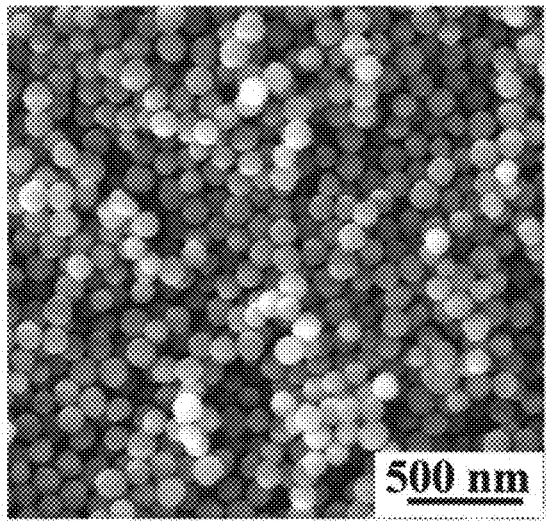
Figure 21C:
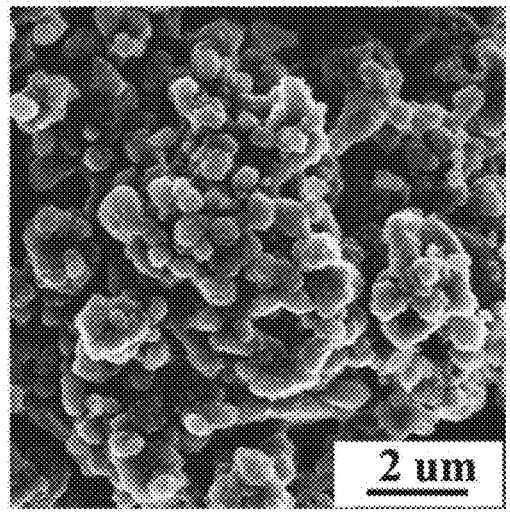
Figure 22:
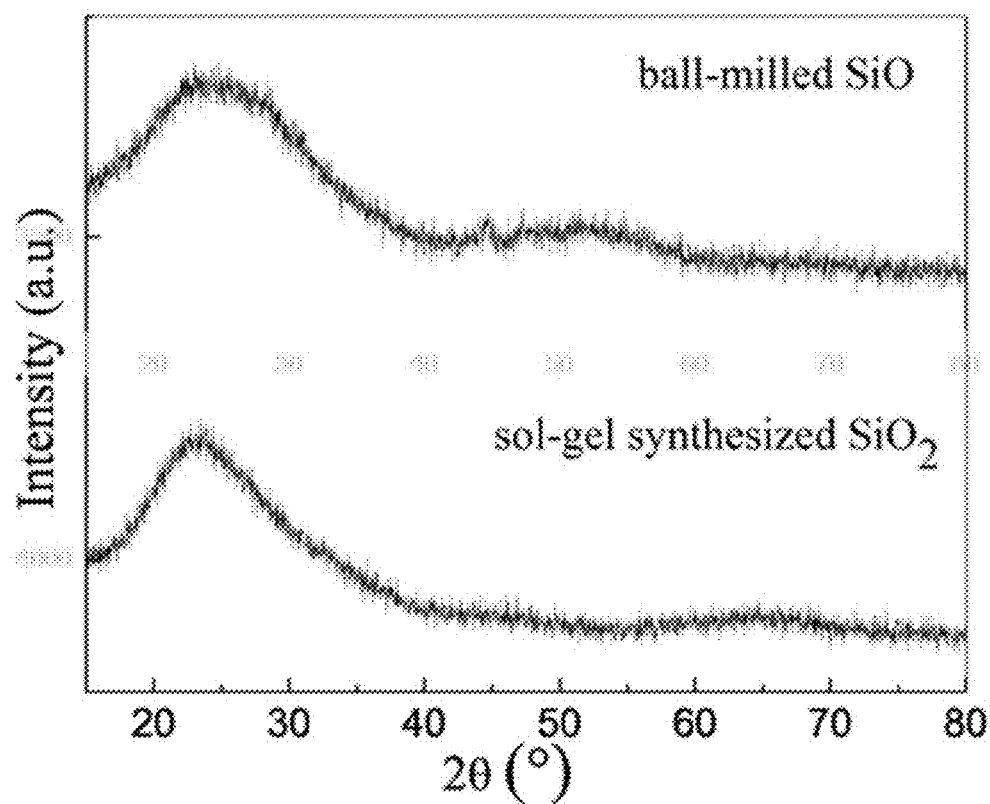
FIG. 22 shows XRD patterns of ball-milled SiO NPs (upper) and sol-gel synthesized $SiO_2$ NPs (lower).

Both SiO and $SiO_2$ can be used as the starting materials to form $Li_xSi/Li_2O$ composites. Large SiO particles (~325 mesh) were first ground to obtain a fine powder via planetary ball-milling operated at a grinding speed of 400 rpm for 6 h. Subsequently, the SiO powder was made to react with molten Li with the color transition from dark red to black immediately upon contact. To guarantee uniform lithiation, the mixture of SiO NPs and Li metal (500 mg:509 mg, the mass ratio is determined by the chemical reaction in FIGS. 16A-16F.) was heated at 250° C. under mechanical stirring inside a tantalum crucible at 200 rpm for at least 1 day in a glove box (Ar-atmosphere, $O_2$ level <1.2 ppm and $H_2O$ level <0.1 ppm). Similar to ball-milled SiO NPs, sol-gel synthesized $SiO_2$ NPs reacted with molten Li to form $Li_xSi/Li_2O$ composites at the same condition. Transmission electron microscopy (TEM) and scanning electron microscopy (SEM) were utilized to characterize the morphology of the SiO and $SiO_2$ NPs before and after thermal lithiation. After ball-milling for 6 h, the size of most SiO NPs was in the range of 50-250 nm, as shown in FIG. 16A and FIG. 21A. The size of derived $Li_xSi/Li_2O$ composites was larger than that of original SiO NPs due to the volume expansion and some degree of particle aggregation during the alloying process. FIG. 16D and FIG. 21B show $SiO_2$ NPs with a narrow size distribution around 90 nm. After thermal lithiation, the morphology of NPs remained while the size changed to 200 nm due to volume expansion as indicated in FIG. 16E. To investigate the spatial distribution of various elements, electron energy loss spectroscopy (EELS) mapping was performed on a $Li_xSi/Li_2O$ particle under the scanning transmission electron microscopy (STEM) mode. To obtain Si and O maps, long exposure time per step can be performed. However, Li signal cannot be detected under such condition because of the heavy beam damage through consecutive scans. Therefore, Li element mapping was obtained first at short exposure time followed by Si and O mapping at the same place with longer exposure time per step. Compared with the STEM image, the corresponding EELS elemental mapping reveals that Li, Si and O elements were uniformly distributed, indicating the formation of a homogeneous $Li_xSi/Li_2O$ composite. Furthermore, X-ray diffraction (XRD) confirms the complete transformation of amorphous SiO and $SiO_2$ (FIG. 22) to crystalline $Li_{22}Si_5$ and $Li_2O$ during the thermal alloying process (FIG. 16F). The broad background of the XRD patterns primarily comes from the Kapton tape covering the sample surface to eliminate or reduce side reactions with moisture and oxygen in the air. The intensity ratio of $Li_{22}Si_5$ to $Li_2O$ in lithiated SiO is higher than that in lithiated $SiO_2$, since the lithiation of SiO can produce more active phase determined by the chemical reaction in FIGS. 16A-16F.

Electrochemical Performance.

Figure 17A:
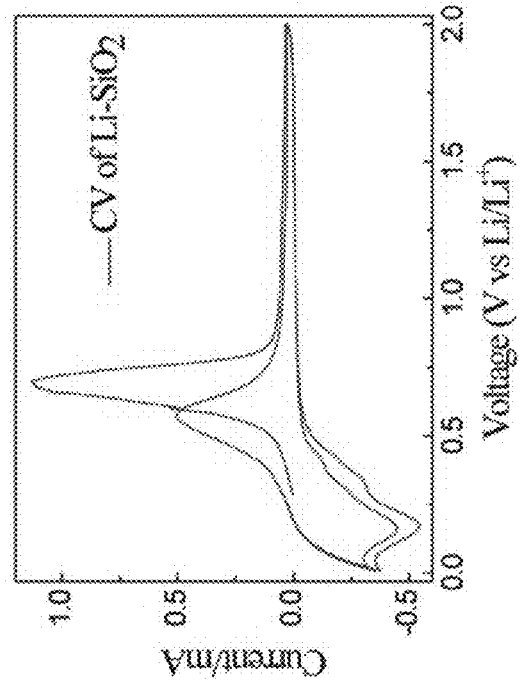
Figure 17B:
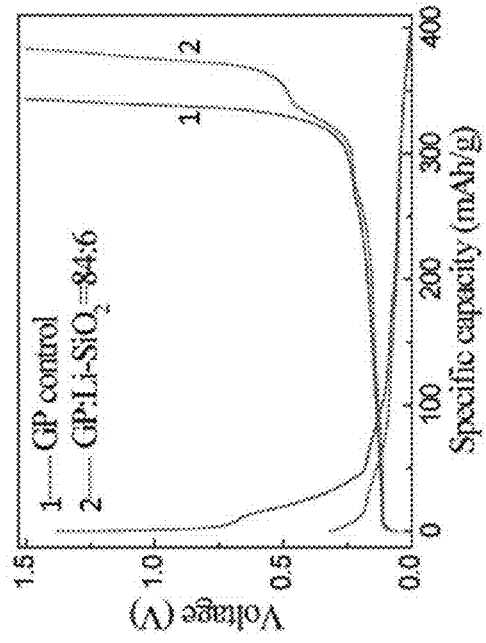
Figure 17B:
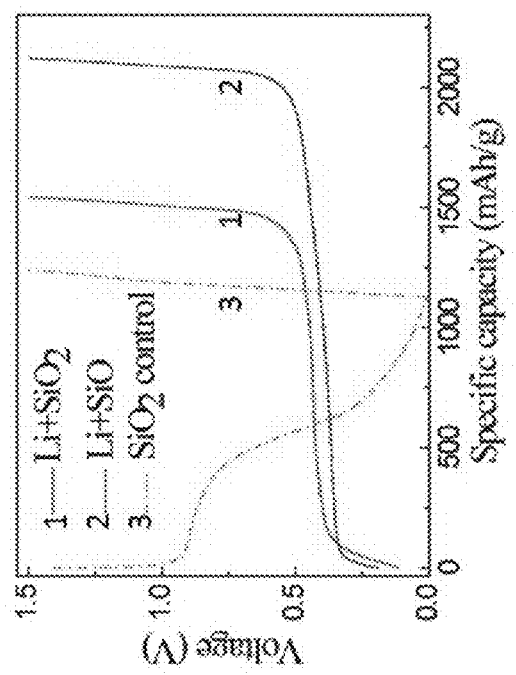
Figure 23:
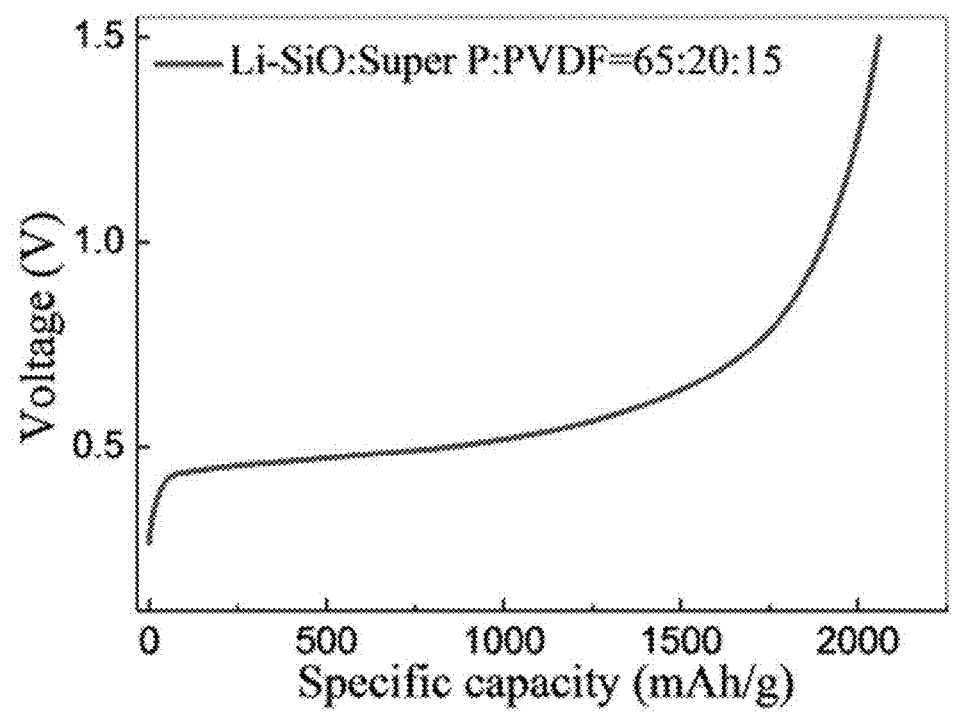
FIG. 23 shows first cycle delithiation capacity of the lithiated SiO electrode prepared via the slurry coating process (Li—SiO NPs:Super P:PVDF=65:20:15 by weight).
Figure 24:
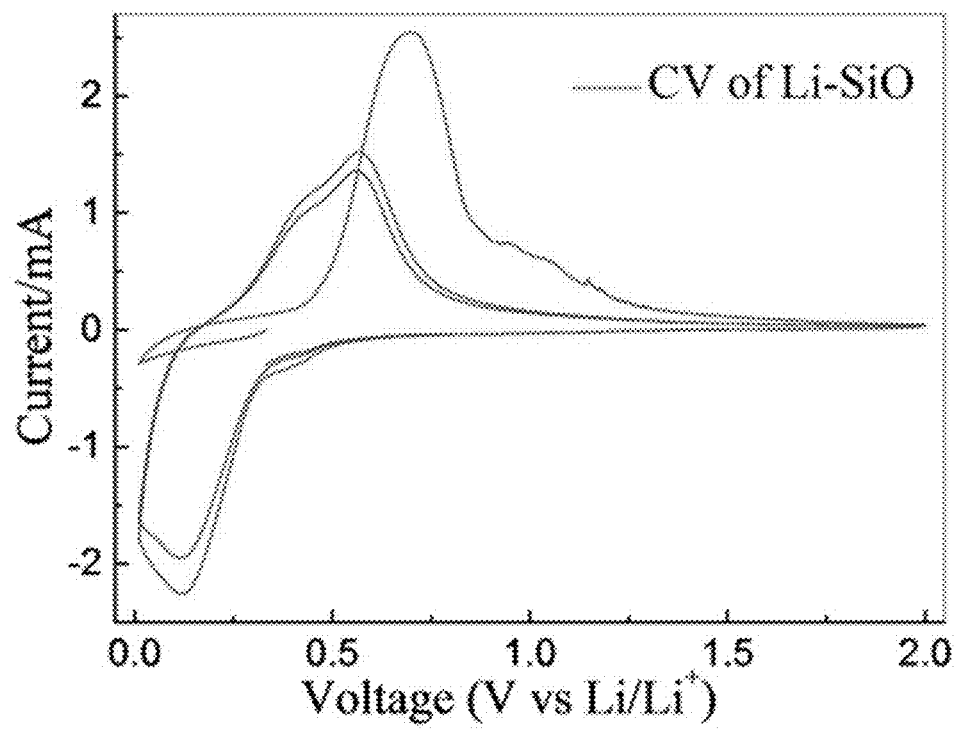
FIG. 24 shows cyclic voltammetry measurement of lithiated SiO NPs at a scan rate of 0.1 mV s$^{-1}$ over the potential window from 0.01 to 2 V versus Li/Li$^+$.

To measure the real capacity of the synthesized $Li_xSi/Li_2O$ composites and eliminate or reduce capacity loss during the slurry coating process, lithiated SiO and $SiO_2$ were dispersed in cyclohexane and then drop casted on copper foil. Half cells were fabricated by using Li metal as both the counter and the reference electrode. The capacities of lithiated SiO and $SiO_2$ were studied by charging the cells to 1.5V at a rate of C/50 (1 C=2.67 A/g for SiO and 1 C=1.96 A/g for $SiO_2$. FIG. 17A). The extraction capacities of lithiated SiO and $SiO_2$ were 2120.7 mAh/g and 1543.2 mAh/g, respectively based on the mass of SiO and $SiO_2$. If calculated based on the mass of Si, the capacities were 3332.5 mAh/g and 3306.8 mAh/g respectively, which are close to the theoretical specific capacity of Si. The open circuit voltage (OCV) of $Li_xSi/Li_2O$ composites was around 0.1 V, confirming that the majority of SiO and $SiO_2$ have been successfully lithiated. To make anodes, $Li_xSi/Li_2O$ composites were mixed with super P and polyvinyldifluoride (PVDF) (65:20:15 by weight) in tetrahydrofuran to form a slurry, which was then drop casted on copper foil. Due to the high reactivity of $Li_xSi$, slurry solvents with higher polarity should be avoided. The lithiated SiO electrode prepared via the slurry coating process demonstrated an extraction capacity of 2059.2 mAh/g, indicating a 97% capacity retention compared to that without the slurry process (FIG. 23). The galvanostatic discharge/charge profile of $SiO_2$ NPs ($SiO_2$: Super P:PVDF=65:20:15 by weight, line 3 in FIG. 17A) showed negligible delithiation capacity after the first lithiation cycle, indicating that the sol-gel synthesized $SiO_2$ NPs are electrochemically inactive as an anode material. However, due to the thermal lithiation process, the inactive $SiO_2$ NPs can be successfully converted into high capacity anode. The flat plateau at 0.4V in the delithiation profile (FIG. 17A) and the strong oxidation peak at 0.7 V in the cyclic voltammetry profile of lithiated $SiO_2$ (FIG. 17B) and SiO (FIG. 24) further confirmed the formation of highly crystalline $Li_xSi$, consistent with the XRD result.

Figure 17C:
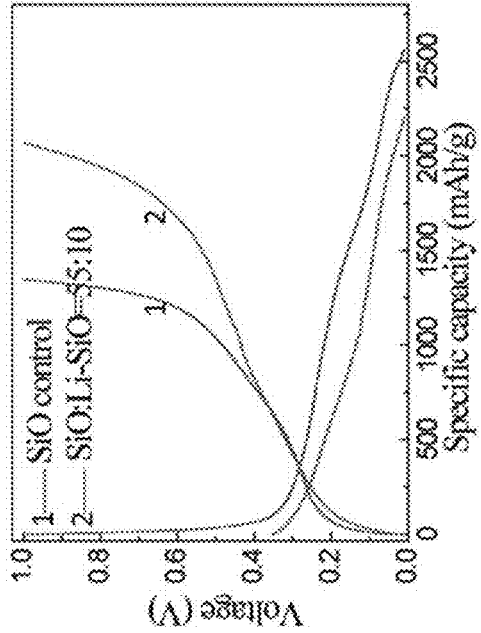
Figure 25:
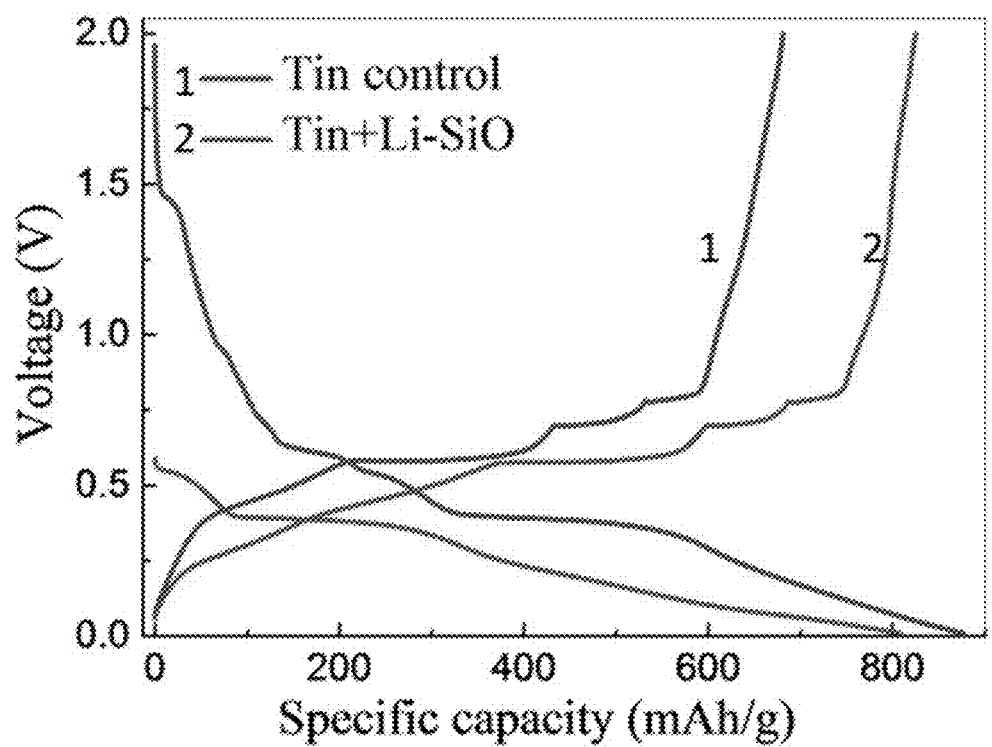
FIG. 25 shows first cycle voltage profiles of tin/lithiated SiO composite (60:5 by weight, line 2) and tin control cell (line 1). The capacity is based on the mass of the active materials, including tin NPs and SiO in lithiated SiO NPs.
Figure 26:
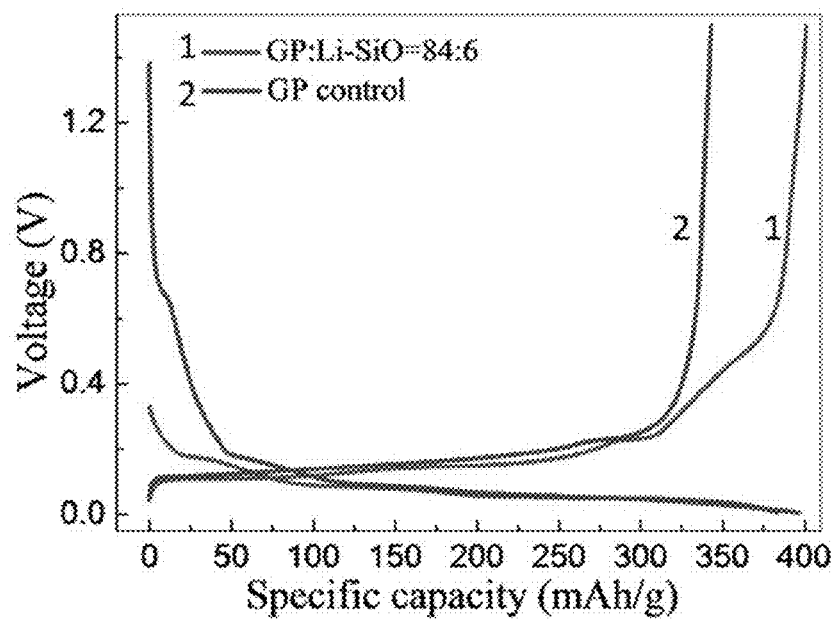
FIG. 26 shows first cycle voltage profiles of graphite/lithiated SiO composite (84:6 by weight, line 1) and graphite control cell (line 2). The capacity is based on the mass of the active materials, including graphite and SiO in lithiated SiO NPs.

Due to the sufficiently low potential, $Li_xSi/Li_2O$ composites are readily mixed with various anode materials such as SiO, Sn and graphite during slurry processing and serve as excellent prelithiation reagents. Lithiated SiO NPs were mixed with SiO, super P, and PVDF in a weight ratio of 10:55:20:15 in a slurry, which was then drop casted on copper foil. During the cell assembly, lithiated SiO NPs were spontaneously activated upon the addition of the electrolyte, which provide additional Li ions to the anode for the partial lithiation of the SiO NPs and the formation of the SEI layer. After the cell assembly, it took 6 h for the anode to reach equilibrium. Both the SiO cell with lithiated SiO additive and the bare SiO control cell were first lithiated to 0.01 V and then delithiated to 1 V at C/50 (FIG. 17C. 1 C=2.67 A/g for SiO, the mass of the active materials includes SiO in the lithiated SiO additive). The $1^{st}$ cycle CE of the SiO control cell was 52.6%, since a large portion of Li was desired for the reaction with SiO to form electrochemically inactive components. The OCV of SiO with lithiated SiO additive is 0.35 V, much lower than that of the control cell. That means lithiated SiO additive compensates the Li consumption for SEI formation and silica conversion, so the curve directly reaches the anode lithiation voltage region. Therefore, the $1^{st}$ cycle CE increased considerably to 93.8%. Similarly, tin NPs were also successfully prelithiated with lithiated SiO NPs, thereby improving the $1^{st}$ cycle CE form 77.7% to 101.9% (tin:lithiated SiO=60:5 by weight, shown in FIG. 25). As the final products of lithiated SiO and $SiO_2$ are the same, lithiated $SiO_2$ also serves as a prelithiation reagent. Similarly, lithiated $SiO_2$ were mixed with graphite and PVDF in a weight ratio of 6:84:10 to compensate the irreversible capacity loss of graphite. Without incorporation of lithiated $SiO_2$, the voltage profile of graphite control cell in FIG. 17D revealed a plateau around 0.7 V, corresponding to the formation of SEI during the lithiation process. After prelithiation, the OCV of graphite with lithiated $SiO_2$ additive decreased to 0.31 V, and the $1^{st}$ cycle CE increases from 87.4% to 99.7%. At the same weight ratio, the $1^{st}$ cycle CE of graphite with lithiated SiO additive is 104.5%, due to the relatively higher capacity of lithiated SiO (FIG. 26).

Figures 17E, 17F:
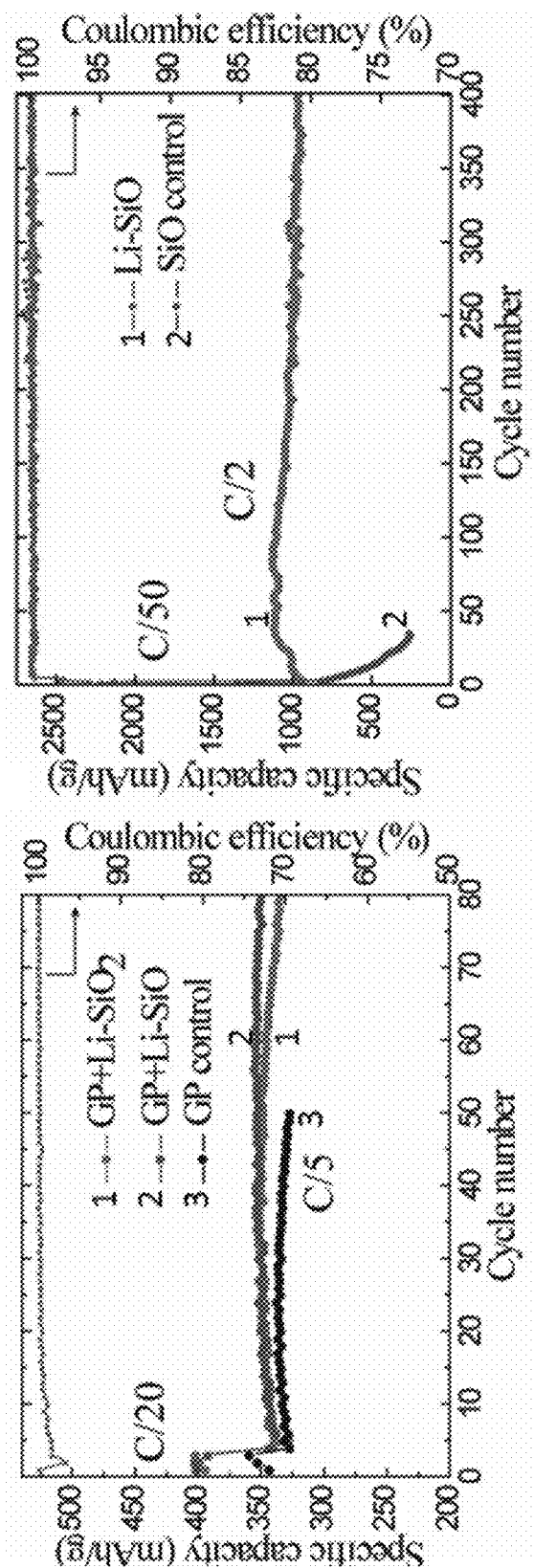

$Li_xSi/Li_2O$ composites afford remarkable battery performance both as anode additives and as anode materials. Aside from improved $1^{st}$ CE, graphite prelithiated with lithiated SiO and lithiated $SiO_2$ follow the trend of the graphite control cell and exhibit stable cycling performance at C/20 for the first 3 cycles and C/5 for the following cycles (1C=372 mAh/g, FIG. 17E). Cells with prelithiation reagents consistently show slightly higher capacity than graphite control cell, contributed by the capacity of lithiated SiO and lithiated $SiO_2$. Due to the nanoscale dimension and the small amount, prelithiation reagents tend to be embedded in the interstices of graphite microparticles. $Li_xSi/Li_2O$ composites maintain the remarkable cyclability of commercial graphite. The commercial graphite with $Li_xSi/Li_2O$ prelithiation reagents suppresses the undesired consumption of Li from cathode materials, which in turn increases the energy density of the full cell. $Li_xSi/Li_2O$ composites not only can improve current lithium ion technology, but are also useful for the next generation lithium ion battery. The cycling stability of $Li_xSi/Li_2O$ composites was tested at C/50 for the first 2 cycles and C/2 for the following cycles as shown in FIG. 17F. The cell capacities initially decreased due to rate change, and then increased to maintain a stable cycling performance at a high capacity of 960.6 mAh/g (The capacity is based on the mass of SiO. 1 C=2.67 A/g for SiO). If the capacity is based on the mass of Si, the retention capacity after 400 cycles was 1509.5 mAh/g, a value more than three times of the theoretical capacity of graphite. Using $Li_xSi/Li_2O$ composites as anode materials, the CE increased to 99.81% after just 6 cycles. Such result stands contrast to previous reports in which it usually took several hundred cycles for Si anode to reach this value. Moreover, in normal Si anodes, SEI rupture and reformation results in decreased CE, especially in later cycles, while the average CE from the 200 to 400 cycles of $Li_xSi/Li_2O$ composites was as high as 99.85% as indicated in the top curve in FIG. 17F. There are several characteristics of the $Li_xSi/Li_2O$ composites that lead to superior battery performance. First, the $Li_xSi$ nano domains are already in their expanded state and sufficient space has been created during the electrode fabrication. Due to the small domain size and void space, $Li_xSi$ will not pulverize or squeeze each other during cycling and the $Li_2O$ inactive phase could serve as mechanical buffer to further alleviate the stress and volume change during lithiation/delithiation of the Si phase. In addition, unlike conventional Si anode that exposes reactive $Li_xSi$ phase to the electrolyte, the vast majority of $Li_xSi$ phase of the $Li_xSi/Li_2O$ composites is enclosed in the stable $Li_2O$ matrix. Therefore, the $Li_2O$ inactive phase not only improves dimensional stability but also serves as an artificial SEI to reduce side reactions between active $Li_xSi$ domains and electrolytes, contributing to the high initial and following CEs. With high Li amount, stable cyclability and high CE, $Li_xSi/Li_2O$ composites can be paired with lithium-free cathode exhibiting high capacity, such as S, in order to achieve high energy density in lithium ion battery.

Stability of $Li_xSi/Li_2O$ Composites.

Figure 18A:
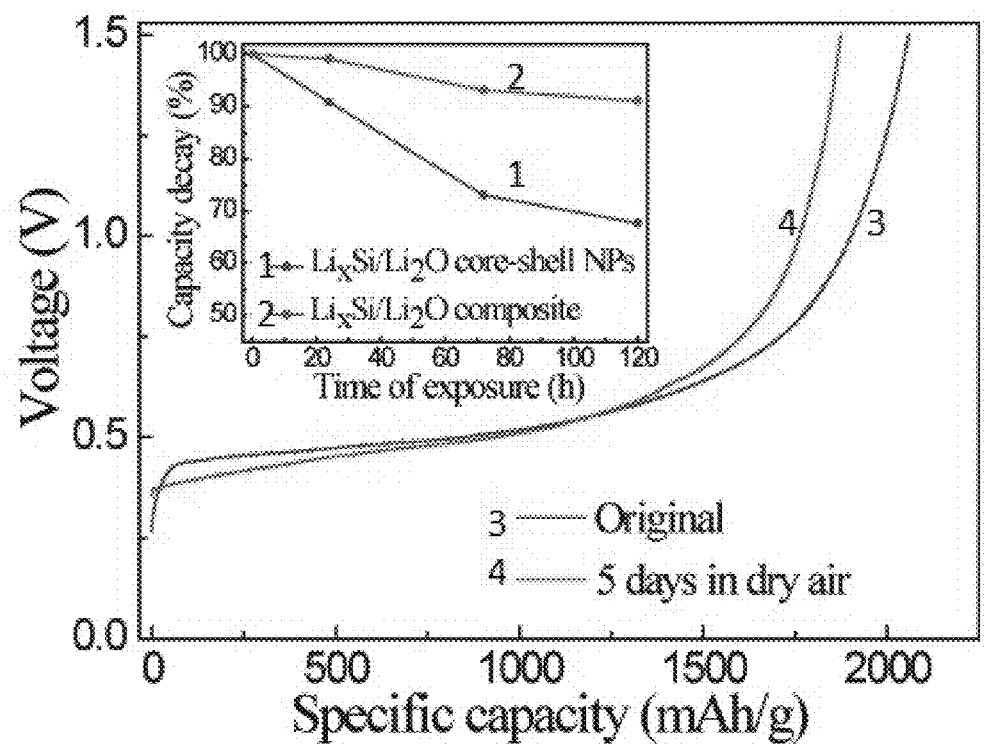
FIGS. 18A-18D show stability of $Li_xSi/Li_2O$ composites.
Figure 18B:
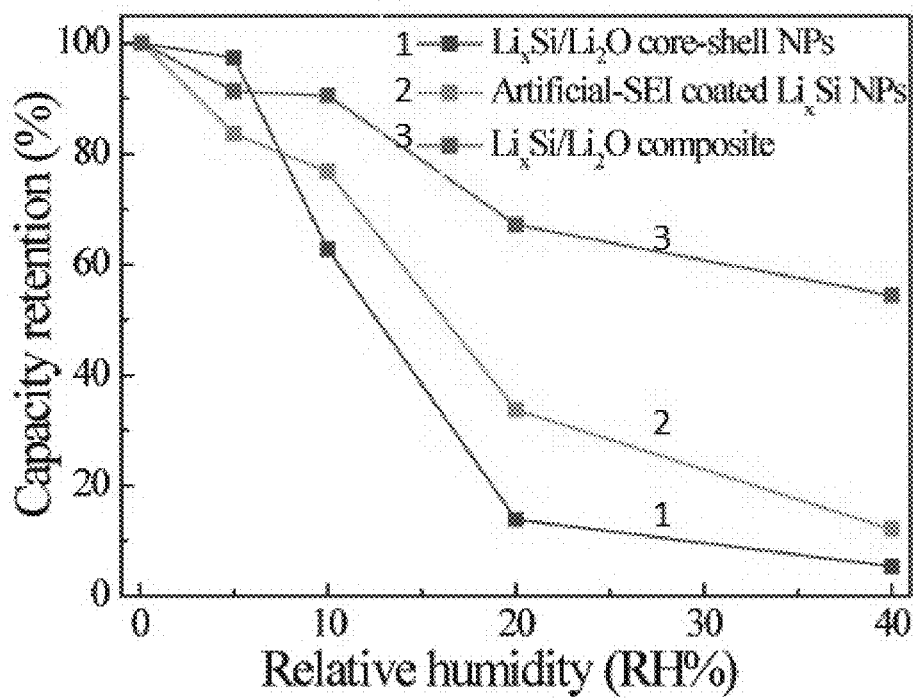
Figure 18C:
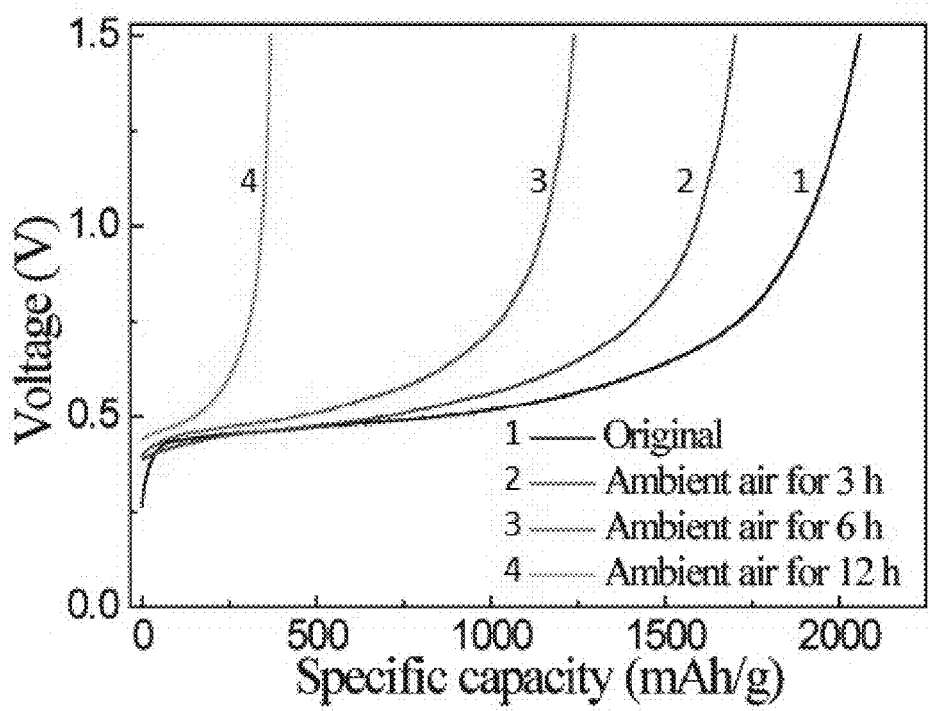
Figure 18D:
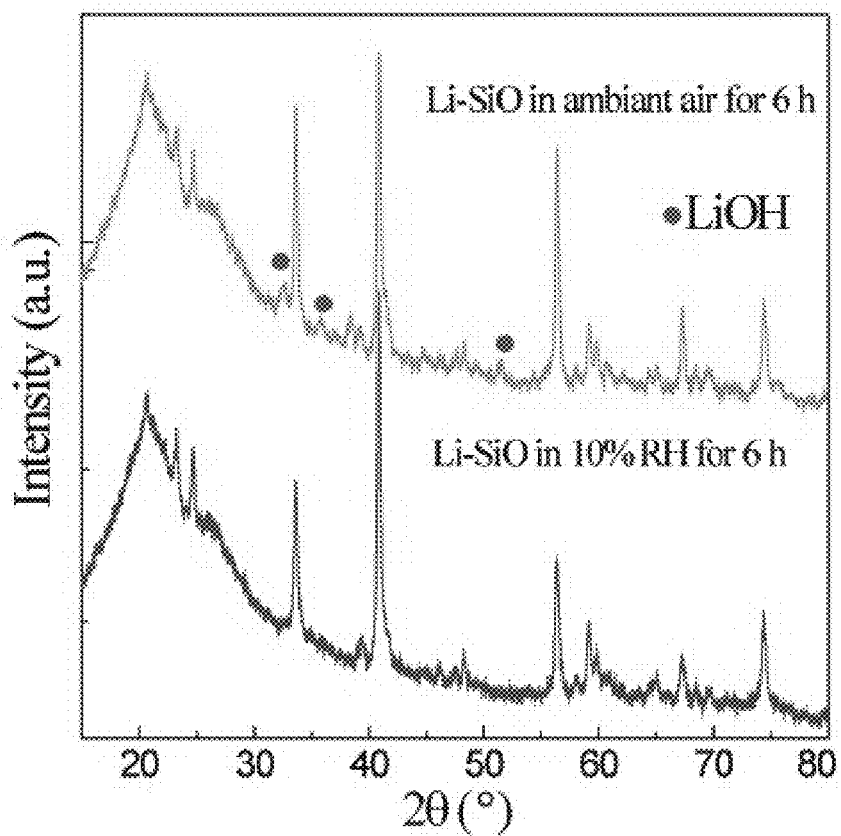
Figure 27:
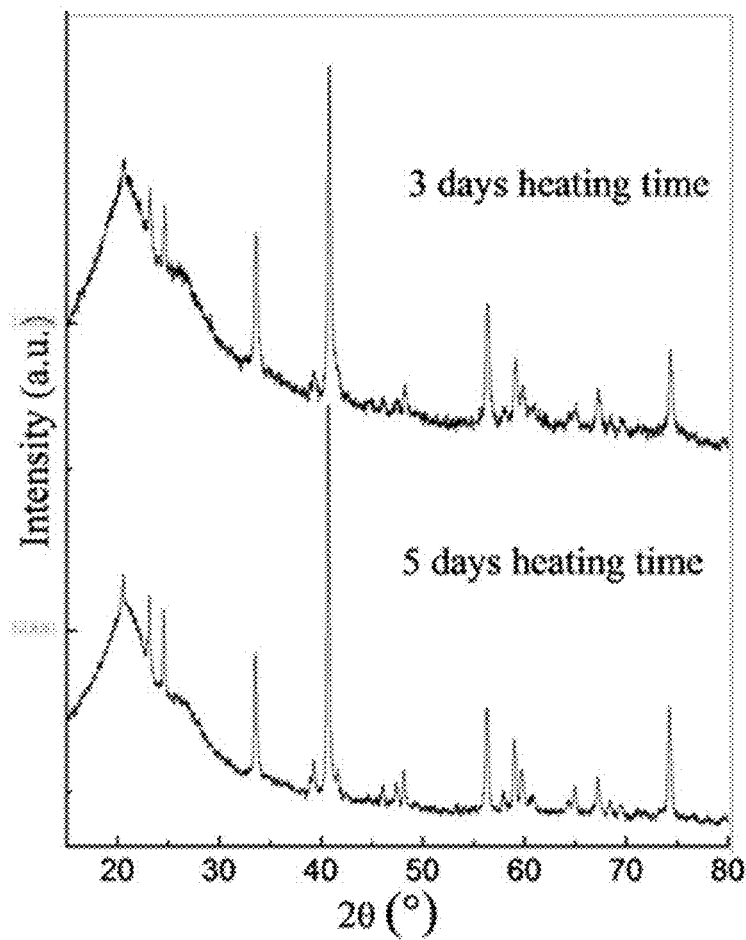
FIG. 27 shows XRD patterns of thermal lithiated SiO NPs with heating time of 3 days (upper) and 5 days (lower).
Figure 28:
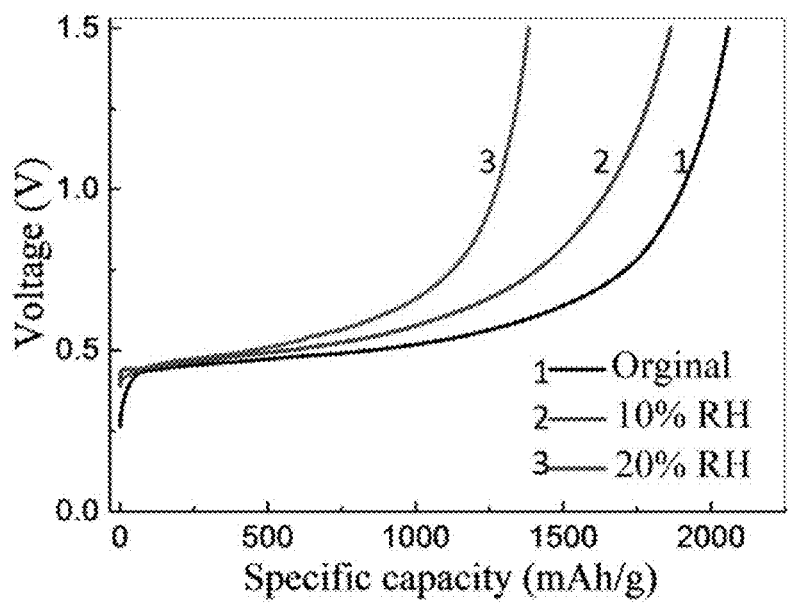
FIG. 28 shows first cycle delithiation capacities of lithiated SiO NPs exposed to air for 6 h at different humidity levels.
Figure 29A:
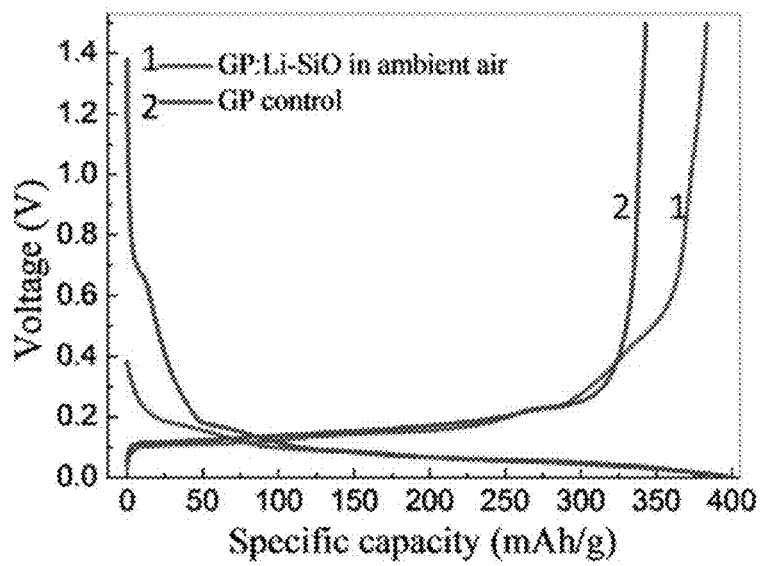
FIGS. 29A-29B show (FIG. 29A) first cycle voltage profile of graphite added with lithiated SiO NPs, exposed to ambient air for 3 h (84:6 by weight).
Figure 29B:
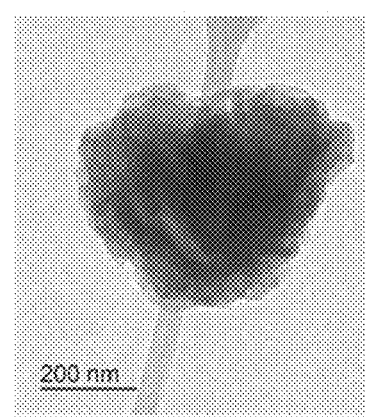
Figure 30:
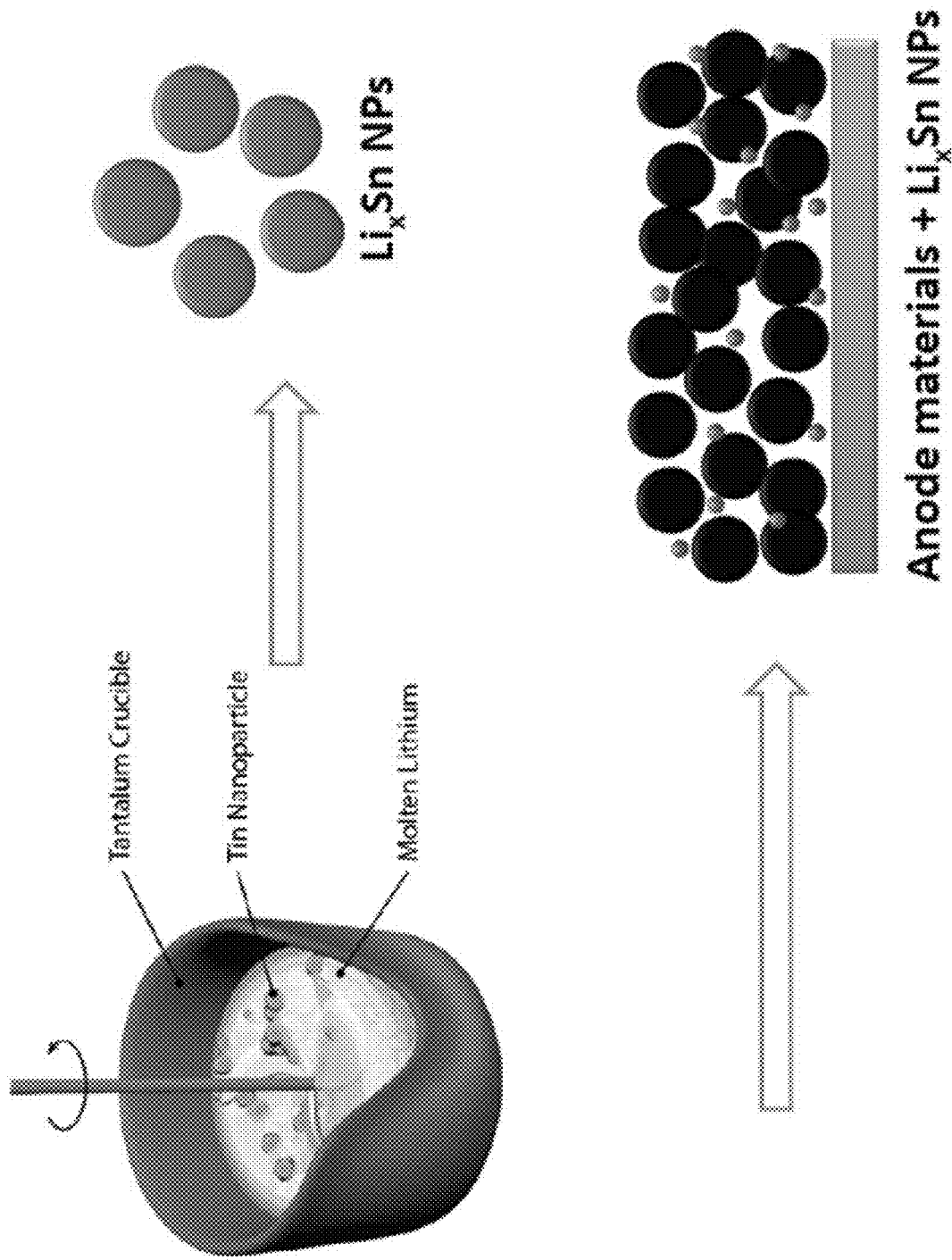
FIG. 30 shows schematic diagrams of Sn NPs reacting with melted Li to form $Li_xSn$ NPs.
Figure 31D:
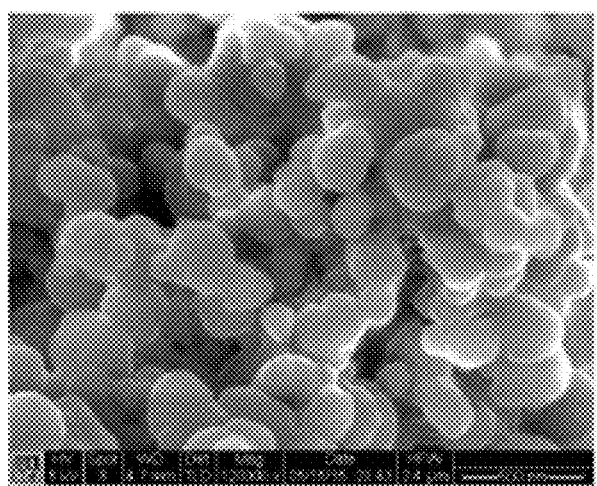
Figure 31E:
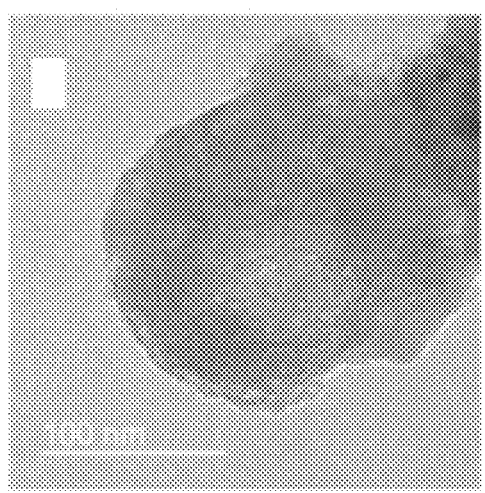
Figure 32A:
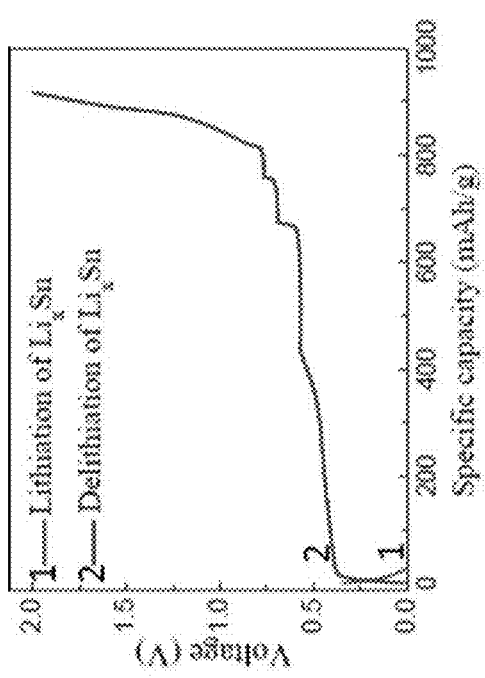
FIGS. 32A-32D show (FIG. 32A) Galvanostatic lithiation/delithiation profile of lithiated tin NPs in $1^{st}$ cycle.
Figure 32B:
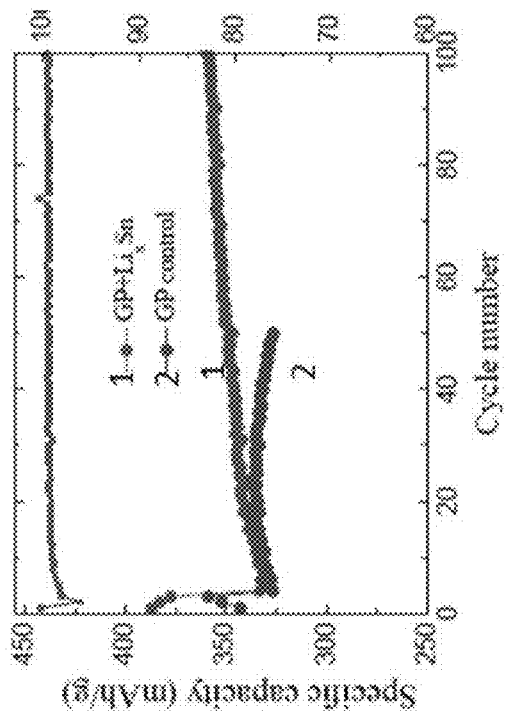
Figure 32C:
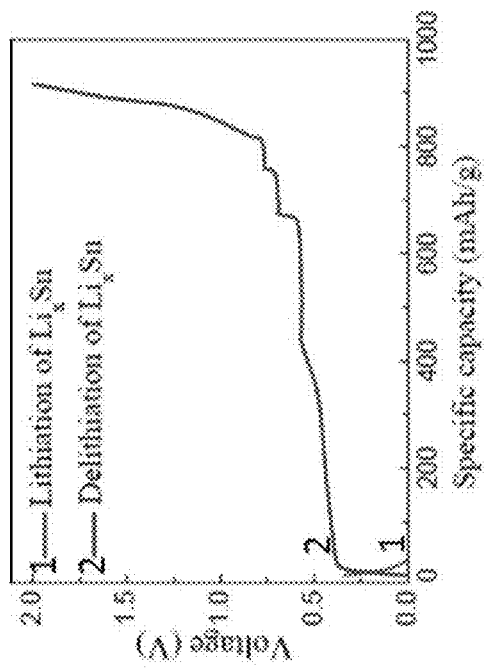
Figure 32D:
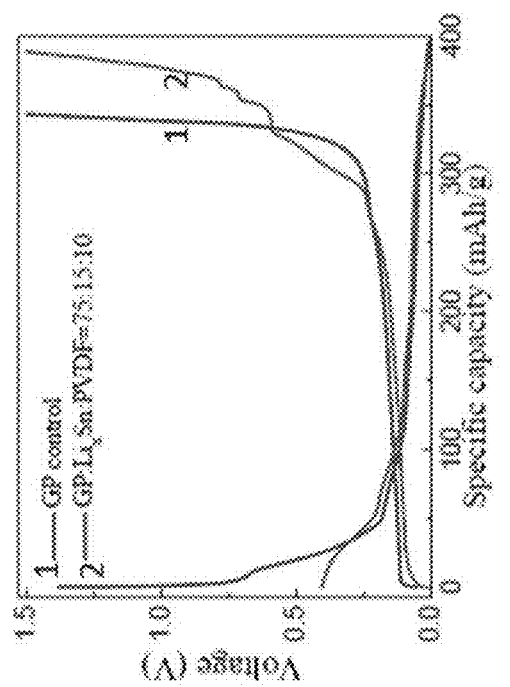
Figure 33A:
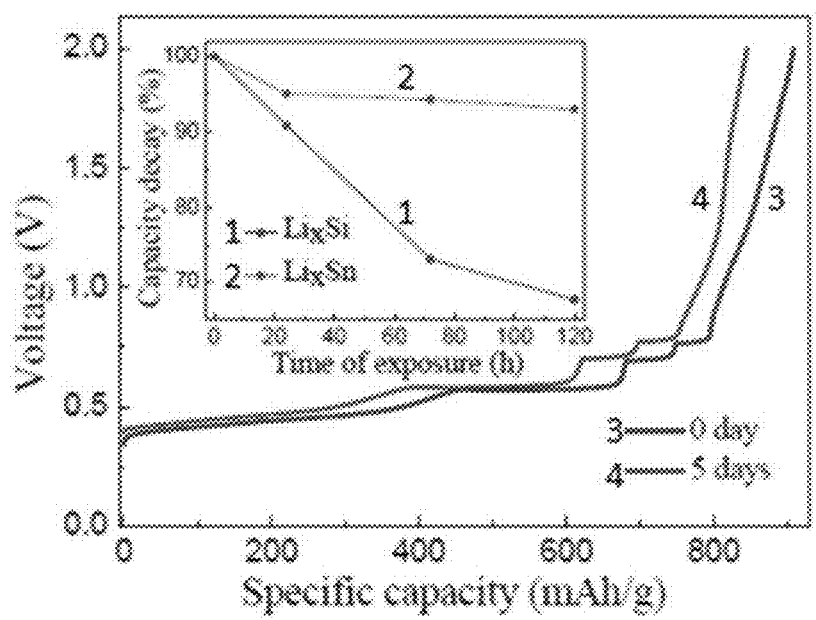
FIGS. 33A-33D show stability of lithiated tin NPs.
Figure 33B:
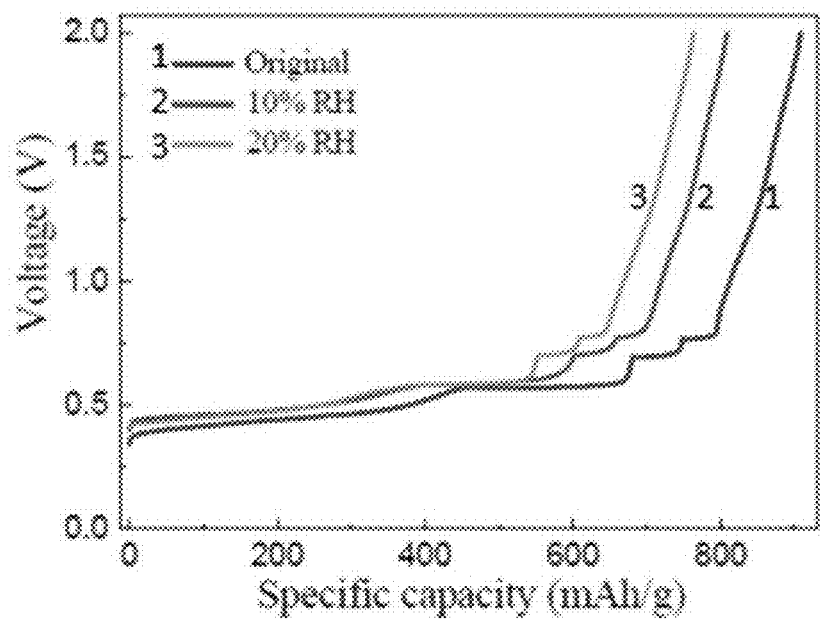
Figure 33C:
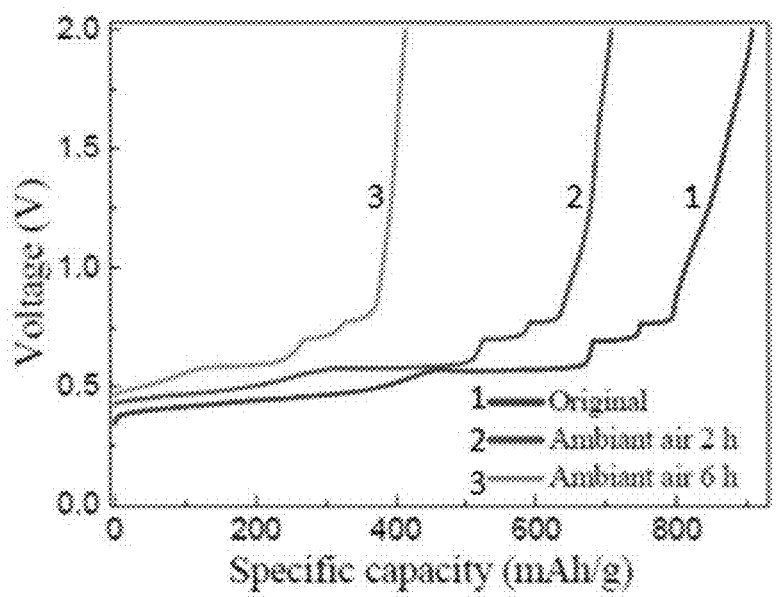
Figure 33D:
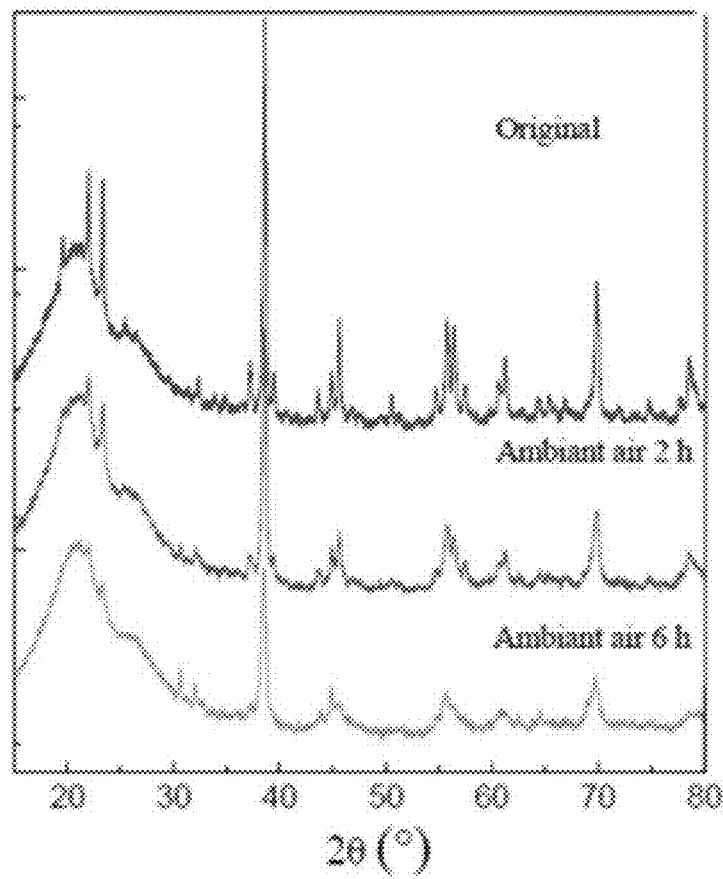

The improved stability allows for safe handling and reduces the requirement on industrial battery fabrication environment, which in turn can decrease battery manufacturing cost. The average dimension of $Li_xSi$ domain increased along with the increasing alloying time, as confirmed by the XRD patterns in FIG. 27. The domain size is increased from 23 nm to 30 nm by extending the heating time from 3 to 5 days. Usually, the stability in air increases when the crystalline size increases. Therefore, the sample for stability test was prepared by mechanically stirring of a mixture of SiO and Li at 250° C. for 5 days. To test the dry air stability, lithiated SiO was stored in dry air (dew point=−50° C.) with varying durations. The retention capacity is determined by charging the cell to 1.5 V at C/20 directly (lithiated SiO:Super P:PVDF=65:20:15). As shown in FIG. 18A, $Li_xSi/Li_2O$ composites exhibited remarkable dry air stability with negligible (9%) capacity decay after 5 days of exposure and the trend of capacity decay is much slower compared with $Li_xSi/Li_2O$ core-shell NPs (inset in FIG. 18A). FIG. 18B shows the capacity retention of $Li_xSi/Li_2O$ composites, $Li_xSi/Li_2O$ core-shell NPs and fluorinated molecular modified $Li_xSi$ NPs in the air with different humidity levels for 6 h, from which the superior stability of the $Li_xSi/Li_2O$ composites is demonstrated. In previous reports, little capacity was extracted when the humidity level was higher than 20% RH. $Li_xSi/Li_2O$ composites still exhibited a high extraction capacity of 1382.9 mAh/g, after exposure to humid air with 20% RH (FIG. 28). To further test whether $Li_xSi/Li_2O$ composites are stable enough for the whole battery fabrication process, the remaining capacities of $Li_xSi/Li_2O$ composites in ambient air with different durations were studied. The humidity range of the test room is from 35% RH to 40% RH. After 3 h, there was merely 15% capacity decay. As shown in FIG. 29A, lithiated SiO exposed to ambient air for 3 h is still reactive enough to prelithiate graphite material (graphite:lithiated SiO: PVDF=84:6:10 by weight), achieving a perfect $1^{st}$ cycle CE of 100.1%. The TEM image (FIG. 29B) indicates the morphology and surface finish remained intact after 6 h exposure to the ambient air. Although the XRD spectrum revealed small peaks belonging to LiOH, the intensity of $Li_xSi$ peaks confirmed $Li_xSi$ to have remained as the majority composition after 6 h exposure. Consistently, line 3 in FIG. 18C shows $Li_xSi/Li_2O$ composites with an extraction capacity of 1240.3 mAh/g, suggesting that $Li_xSi/Li_2O$ composites are compatible with industrial battery fabrication environment.

DFT Simulation and Reasons for Improved Stability.

Figure 20:
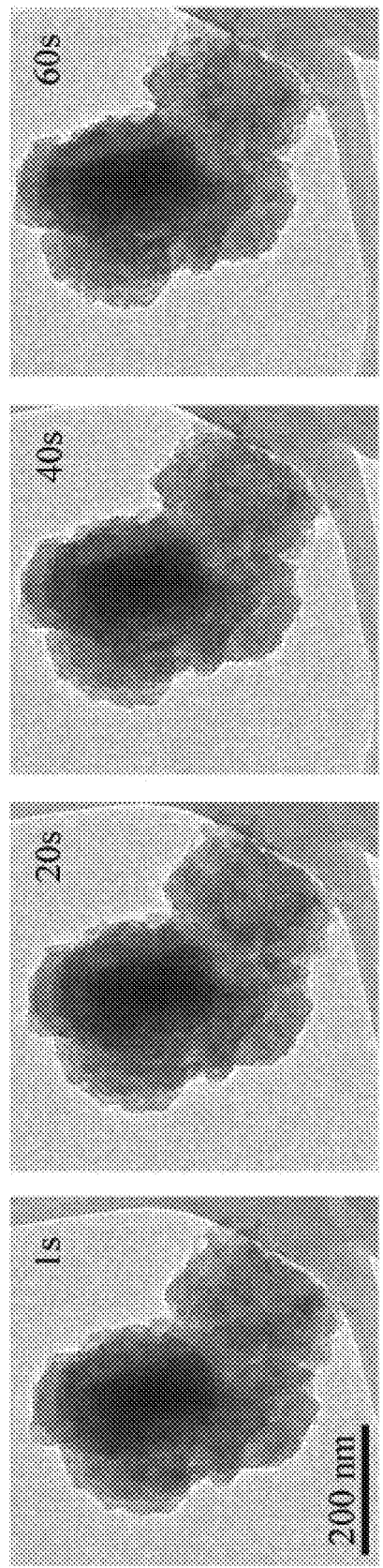
FIG. 20 shows different behaviors of $Li_xSi/Li_2O$ composites and $Li_xSi/Li_2O$ core-shell NPs under TEM electron beam with varying duration.
Figure 20:
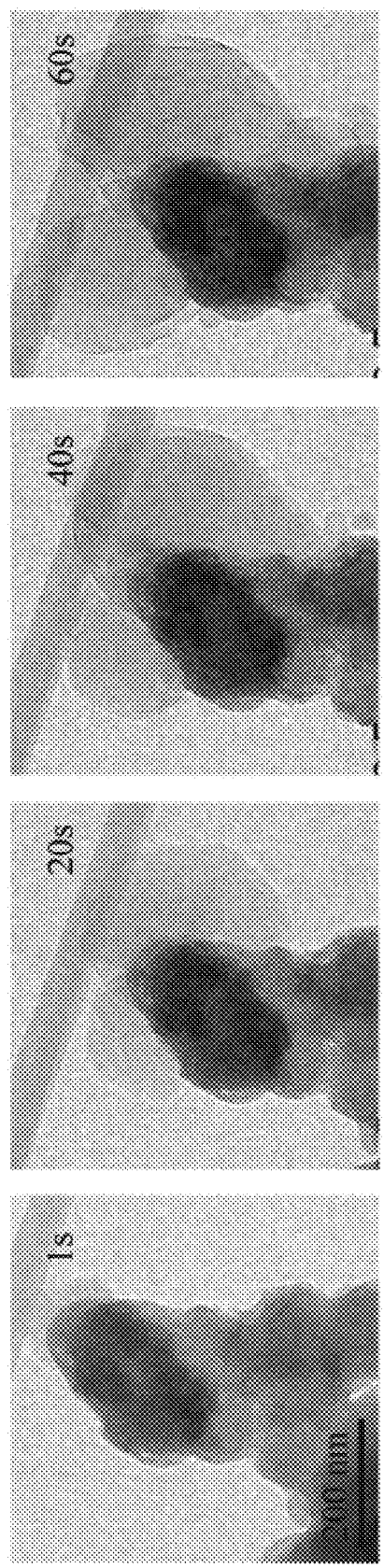

To understand the reason for the unparalleled stability of $Li_xSi/Li_2O$ composites in the air, DFT simulation was performed to study the interaction between O in $Li_2O$ and Li in $Li_{22}Si_5$. For simplicity, cleavage along (001) plane of $Li_{22}Si_5$ is performed, and the binding energy is calculated between O at different positions in $Li_2O$ with Li at the center of (001) plane of $Li_{22}Si_5$, as shown in FIG. 19A. The binding energy between O atoms at (½ ½ 0), (100), (010) position of $Li_2O$ and surface Li is −2.2079 eV, −2.1945 eV and −2.1987 respectively, much larger than the binding energy between Li and the nearest Si in (001) plane of $Li_{22}Si_5$ with a value of −0.7293 eV. Compared with $Li_2O/Li_xSi$ core-shell structure, uniform $Li_xSi/Li_2O$ composites exhibit larger contact surface between $Li_2O$ and $Li_xSi$ (FIG. 19B). Therefore, $Li_xSi/Li_2O$ composites provide stronger binding between O in $Li_2O$ and Li in $Li_{22}Si_5$, which effectively lowers the total Gibbs energy of $Li_xSi/Li_2O$ composites. The different behaviors of the $Li_xSi/Li_2O$ composites and the $Li_xSi/Li_2O$ core-shell NPs under TEM electron beam directly corroborate the simulation result (FIG. 20). Once the $Li_xSi/Li_2O$ core-shell NPs were exposed to the electron beam in the TEM, Li metal started to grow outside and the whole structure collapsed after 1 min. On the contrary, $Li_xSi/Li_2O$ composites were stable under electron beam at the same condition. The particle shrinked slightly after 1 min exposure time, suggesting stronger binding to Li, that is consistent with the DFT simulation. There is also an additional factor contributing to the inferior stability of the core-shell NPs. Namely, absent complete encapsulation, any pinhole will provide pathway for inner $Li_xSi$ to react with $O_2$ and water vapor in air, which leads to loss of capacity as shown in FIG. 19B. In $Li_xSi/Li_2O$ composites, $Li_xSi$ nanodomains are uniformly embedded in a robust $Li_2O$ matrix, such that each $Li_xSi$ nanodomain has localized $Li_2O$ protection. Even if some $Li_xSi$ nanodomains are sacrificed due to the presence of pinholes on the surface, the inner $Li_2O$ still serves as a localized protection layer to prevent inner $Li_xSi$ nanodomains from further oxidation.

In summary, $Li_xSi/Li_2O$ composites were synthesized via an one-pot thermal alloying process using SiO and $SiO_2$ as the starting material. The product revealed a unique structure with substantially homogeneously dispersed active $Li_xSi$ nanodomains embedded in a robust $Li_2O$ matrix, which endowed the composite an unparalleled stability. Besides negligible capacity decay in dry air, $Li_xSi/Li_2O$ composites exhibited a high capacity of 1240.3 mAh/g after 6 h exposure to ambient air (>35% RH). The improved stability reduces the requirement on industrial battery fabrication environment, which in turn can reduce manufacturing cost. As a prelithiation reagent, the $Li_xSi/Li_2O$ composites were demonstrated to be effective to compensate the $1^{st}$ cycle irreversible capacity loss for both intercalation and alloying anodes and can be generally applied to advanced nanostructured materials with large $1^{st}$ cycle irreversible capacity loss. Moreover, the composites are also capable of functioning as an anode material, which exhibits stable cycling performance and consistently high CEs (99.81% at $7^{th}$ cycle and stable at 99.87% for 400 cycles). Such Li rich anode material can replace the dendrite-forming lithium metal anodes in next generation high-energy-density batteries, such as $Li-O_2$ and Li—S batteries. In addition, the synthetic approach disclosed here offers an economical route to large-scale manufacturing.

WORKING EXAMPLES

Example 1.1—Synthesis of $Li_xSi-Li_2O$ NPs

Si NPs (~50 nm, MTI, Inc.) were dried under vacuum for 24 h to remove trapped water. 140 mg of Si NPs were mixed with 154 mg of Li metal foil (99.9%, Alfa Aesar). The $Li_xSi$ NPs were synthesized by mixing the Si NPs and lithium foil at 200° C. under mechanical stirring for 6 hours in a glove box (Ar-atmosphere, $H_2O$ level <0.1 ppm and $O_2$ level <3 ppm).

Example 1.2—Material Characterization

SEM and TEM images were taken using a FEI XL30 Sirion SEM and a FEI Tecnai G2 F20 X-TWIN, respectively. A FEI Titan 80-300 environmental transmission electron microscope was employed for EELS mapping collection at an acceleration voltage of 300 kV. The energy resolution of the EELS spectrometer is about 0.9 eV as measured by the full width at half-maximum of the zero-loss peak. EELS mapping data was acquired using a C2 aperture size of 50 mm and a camera length of 48 mm. To minimize sample drift during the STEM EELS mapping, the mapping drift was corrected every 30 pixels. The energy window of the EELS was 40-145 eV for Li (Li K edge, 54.7 eV) and Si (Si L2, 3 edge 99.2 eV) peaks and 510-615 eV for 0 (O K edge, 532 eV) peak. X-ray diffraction patterns were obtained on a PANalyticalX'Pert, Ni-filtered Cu Kα radiation. $Li_xSi$ NPs are sensitive to ambient moisture so the samples were sealed with Kapton tape (DuPont) in the glove box before XRD characterization.

Example 1.3—Electrochemical Measurements

Si NPs (~50 nm, MTI, Inc.), MCMB graphite (MTI, Inc), carbon black (Super P, TIMCAL, Switzerland), and polyvinylidene fluoride binder (PVDF, Kynar HSV 900) were dried under vacuum for 24 h to remove trapped water. To prepare the working electrodes, various materials were dispersed uniformly in 1,3-dioxolane (DOL) to form a slurry. (Anode materials and mass ratio are based on specific cells.) The slurry was then cast onto a thin copper foil and dried under vacuum. Coin-type cells (2032) were assembled in an Ar-filled glove box using a Li metal foil as counter/reference electrode. The electrolyte is 1.0 M $LiPF_6$ in 1:1 w/w ethylene carbonate/diethyl carbonate (EMD Chemicals), 1 vol % vinylene carbonate and 10 vol % fluoroethylene carbonate (Novolyte Technologies). Cyclic voltammetry measurements were carried out on a BioLogic VMP3 system. Galvanostatic cycling was carried out using an MTI 8 Channel battery tester. The total mass loading of the Si based anode was 0.7-1.0 mg $cm^{-2}$ and a typical total mass loading of the graphite based anode was 2.0-2.5 mg $cm^{-2}$.

Example 2.1—Synthesis of $Li_xSi/Li_2O$ Composites

To obtain SiO NPs, the large SiO particles (~325 mesh, Sigma Aldrich) were ball-milled at a grinding speed of 400 rpm for 6 h. To synthesize 90 nm $SiO_2$ NPs, ammonia hydroxide solution (1 ml $NH_4OH$ (Fisher Scientific), 5 ml $H_2O$ and 15 ml ethanol (Fisher Scientific)) was poured into tetraethyl orthosilicate solution (1 ml TEOS (99.999% trace metal basis, Sigma Aldrich) and 15 ml ethanol) while stirring. The reaction was left at 55° C. under stirring at 500 rpm for 2 hr. The reaction was quenched by adding ethanol into the mixture, and the NPs were cleaned and collected by centrifuging at 5000 rpm for 3 times. Both SiO and $SiO_2$ NPs were dried under vacuum for 48 h and then heated to 120° C. in the argon glove box for 24 h to remove trapped $O_2$ and $H_2O$. SiO or $SiO_2$ NPs were heated to 250° C., followed by the addition of Li metal foil (99.9%, Alfa Aesar). The ratios of SiO to Li and $SiO_2$ to Li were determined by the chemical equation in FIGS. 16A-16F. The mixture was heated at 250° C. under mechanical stir at 200 rpm for at least 1 day in an Ar glove box ($H_2O$ level <0.1 ppm and $O_2$ level <1.2 ppm).

Example 2.2—DFT Simulation

First-principles calculations were performed within the density-functional theory (DFT) framework, as implemented in the Materials Studio version 5.5. The electron exchange and correlation interaction is described by the generalized gradient approximation (GGA) method. The following valence electron configurations are used: Si $(3s^23p^3)$, O $(2s^22p^4)$ and Li $(2s^1)$. After checking for convergence, 450 eV was chosen as the cut-off energy of the plane-wave basis for the Kohn-Sham states. All atomic positions and lattice vectors were fully optimized using a conjugate gradient algorithm to obtain the unstrained configuration. Atomic relaxation was performed until the change of total energy was less than $10^{-5}$ eV and all the forces on each atom were smaller than 0.01 eV/Å.

Example 2.3—Characterizations

Powder X-ray diffraction patterns were obtained on a PANalytical X'Pert diffractometer with Ni-filtered Cu Kα radiation. SEM and TEM images were taken using a FEI XL30 Sirion SEM and FEI Tecnai $G^2$ F20 X-Twin microscope (at a acceleration voltage of 200 kV), respectively. TEM videos were also taken on Tecnai microscope with a magnification of 13500 and a spot size of 5. Compositional analysis of the lithiated nanoparticles was obtained by electron energy loss spectroscopy (EELS) mapping collection using an FEI Titan 80-300 environmental transmission electron microscope (TEM) at the acceleration voltage of 300 kV. The energy resolution of the EELS spectrometer was 0.8 eV as measured by the full width at half-magnitude of the zero-loss peak. EELS mapping data were acquired using a C2 aperture size of 50 mm and a camera length of 60 mm. To obtain the range of Li, Si, and O at the same particle, the dual detector was employed with a different acquisition time of 0.2 and 2 seconds for low and high-loss range, respectively. The energy window of the EELS was 40-145 eV for Li (Li K edge, 54.7 eV) and Si (Si L2,3 edge 99.2 eV) peaks and 510-615 eV for 0 (O K edge, 532 eV) peak. Mapping images were collected after extracting the peaks of Li—K, Si-L, and O—K edges at 54.7, 99.2, and 532 eV, respectively.

Example 2.4—Electrochemical Measurements

Cyclic voltammetry measurements were performed on a BioLogic VMP3 system. Galvanostatic cycling was performed using a 96-channel battery tester (Arbin Instrument). Anode materials including SiO, graphite and Sn NPs (Sigma Aldrich), carbon black (Super P, TIMCAL, Switzerland), and polyvinylidenefluoride binder (PVDF, Kynar HSV 900) were dried under vacuum for 24 h to remove trapped water. To prepare the working electrodes, anode materials were dispersed uniformly in tetrahydrofuran (THF, Sigma Aldrich) to form a slurry, which was then casted onto a copper foil and dried under vacuum. Anode materials and mass ratio are tailored for specific cells. Typically, the mass loading of $Li_xSi/Li_2O$ composites based cells was 0.8-1.5 mg/cm$^2$ and the mass loading of graphite based cells was 2.0-3.0 mg/cm$^2$. The working electrodes were assembled in 2032-type coin cells (MTI Corporation) with Li metal both as the reference and counter electrodes. The electrolyte was 1.0 M $LiPF_6$ in 1:1 w/w ethylene carbonate/diethyl carbonate (BASF).

Example 3.1—Additional Synthesis Examples

Starting material (e.g., graphite, Sn, $SnO_2$, $SnF_2$, $SnF_4$, Ge, $GeO_2$, $FeSi_2$, $NiSi_2$, $CoSi_2$, and SiO—$SnF_4$ composite) is dried under vacuum for 48 h and then heated at 120° C. (set point temperature of hot plate) in the glove box for 12 h to remove trapped water. Starting materials are heated at 200° C. in a tantalum crucible with cap, and then Li metal foil (99.9%, Alfa Aesar) is added inside. The ratio of starting materials to Li metal is based on the specific reaction equation. After lithium starts melting, the hot plate temperature is increased by 20° C. and then hold at the temperature. Li alloy were synthesized by heating the starting materials and lithium foil at 200° C. on hot plate under mechanical stirring at 200 rpm for 3 days in a glove box (Ar-atmosphere, $H_2O$ level <0.1 ppm and $O_2$ level <1.2 ppm). It is recommended to maintain the $H_2O$ level<1 ppm or $O_2$ level<6 ppm. For small amounts of starting materials, 6 h is sufficient. For gram-synthesis, the heating time can increase to several days to ensure the complete reaction. For starting materials with low melting point, such as Tin, synthesis temperature should be below the melting point of starting materials. For starting materials with high melting point, the final products are the same crystalline phase, when the temperature is in the range of 200° C. to 400° C. The materials synthesized with longer time and higher temperature will have larger crystalline size.

Figure 35A:
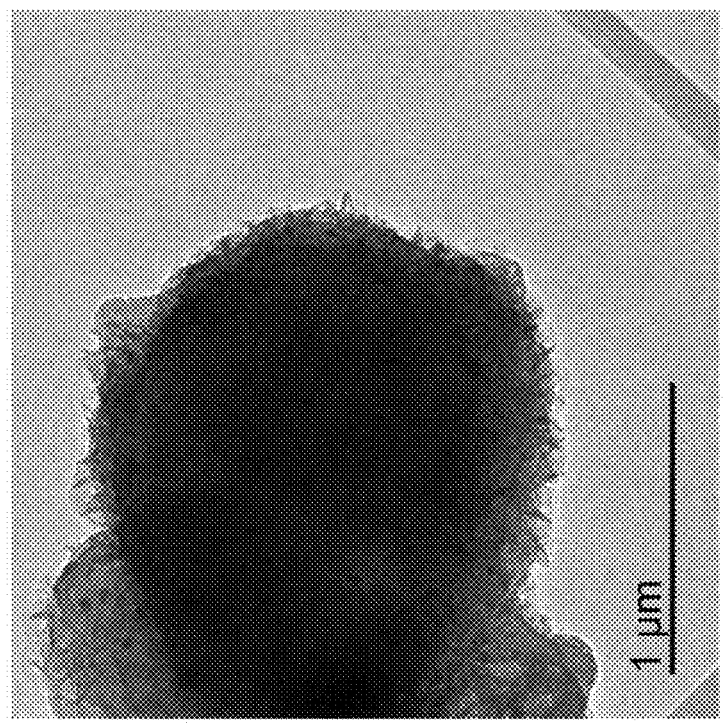
FIGS. 35A-35B show (FIG. 35A) TEM image and (FIG. 35B) XRD pattern of lithiated SiO—$SnF_4$ composite.
Figure 35B:
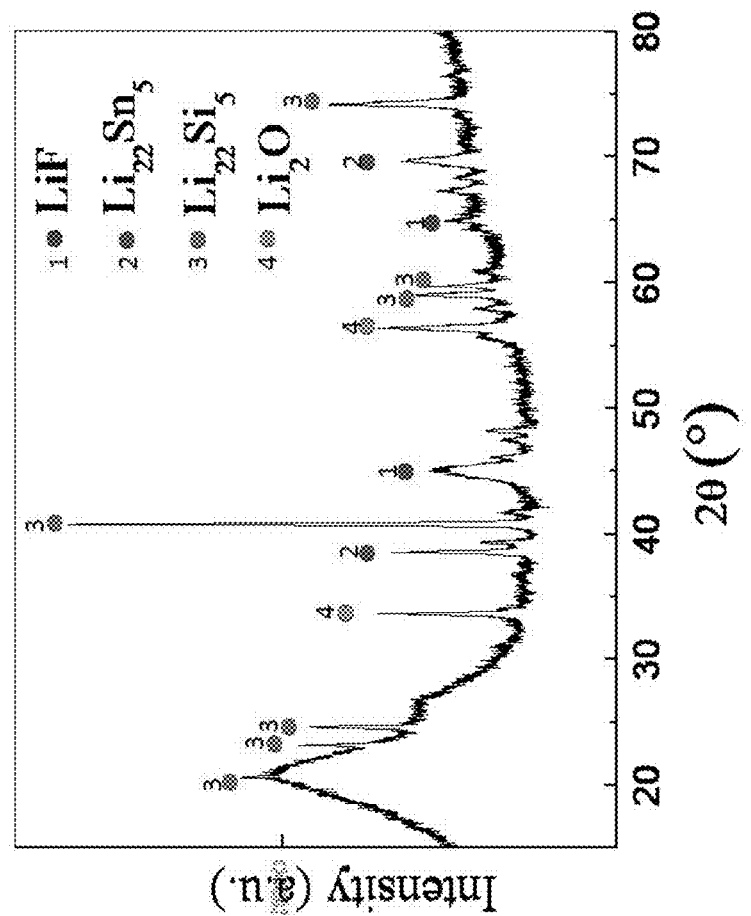
Figure 36B:
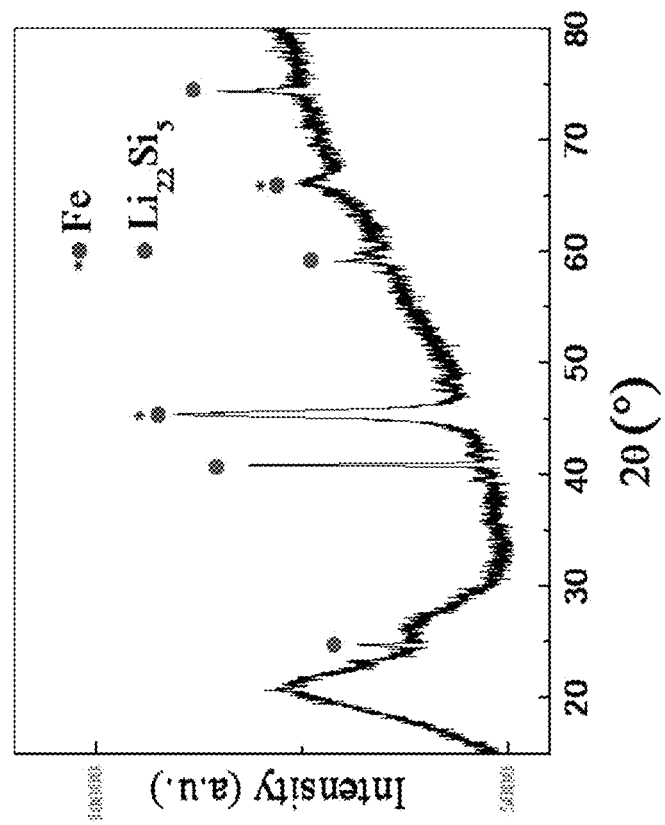
FIGS. 36A-36B show (FIG. 36A) XRD pattern and (FIG. 36B) charge capacity of lithiated $FeSi_2$.
Figure 36A:
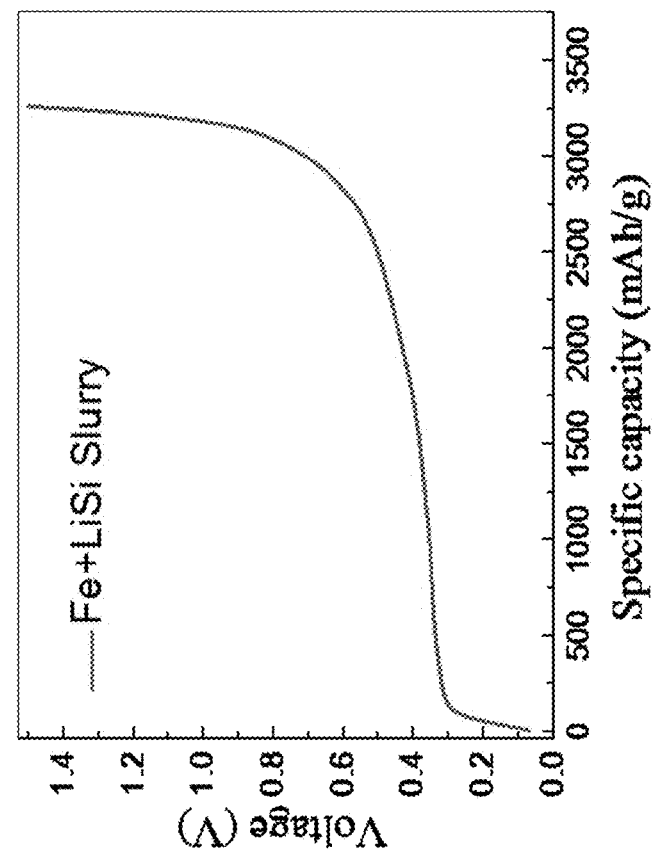

Example 3.2—Characterizations of Lithiated Sn, $SnP_2$, $FeSi_2$, and SiO—$SnF_4$ Composite The characterization of lithiated Sn is shown in FIGS. 30, 31A-31F, 32A-32D, 33A-33D. The characterization of lithiated $SnO_2$ is shown in FIGS. 34A-34C. The characterization of lithiated SiO—$SnF_4$ composite is shown in FIGS. 35A-35B. The characterization of lithiated $FeSi_2$ is shown in FIGS. 36A-36B.

As used herein, the singular terms "a," "an," and "the" include plural referents unless the context clearly dictates otherwise. Thus, for example, reference to a molecule can include multiple molecules unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A method for making an anode of a rechargeable battery, comprising mixing a prelithiation reagent composition and an anode material selected from the group consisting of carbon, graphite, Si, Ge, SiO, $SiO_2$, $TiO_2$, $SnO_2$ and P, wherein the prelithiation reagent composition comprises nanoparticles or microparticles comprising (a) a matrix of at least one of $Li_2O$ or LiF and (b) a plurality of $Li_xM$ domains embedded in the matrix, wherein M is a Group 14 element, and x is an atomic ratio of Li to M, wherein x is 5:1 or less, wherein the prelithiation reagent composition prelithiates the anode material and improves a first cycle Coulombic efficiency of the anode by at least 2%, and wherein the first cycle Coulombic efficiency of the anode is at least 90%.

2. A method for making an anode of a rechargeable battery, comprising mixing a prelithiation reagent composition and an anode material selected from the group consisting of carbon, graphite, Si, Ge, SiO, $SiO_2$, $TiO_2$, $SnO_2$ and P, wherein the prelithiation reagent composition comprises nanoparticles or microparticles comprising (a) a protective coating of at least one of $Li_2O$ or LiF and (b) a $Li_xM$ core encapsulated by the protective coating, wherein M is a Group 14 element, and x is an atomic ratio of Li to M, wherein x is 5:1 or less, wherein the prelithiation reagent composition prelithiates the anode material and improves a first cycle Coulombic efficiency of the anode by at least 2%, and wherein the first cycle Coulombic efficiency of the anode is at least 90%.

3. The method of claim 1 or 2, wherein the composition comprises at least one of $Li_xC$, $Li_xSi$, $Li_xGe$, or $Li_xSn$.

4. The method of claim 1 or 2, comprising mixing the prelithiation reagent composition and the anode material in at least one solvent to form a slurry, wherein the solvent has a dielectric constant of 20 or less.

5. The method of claim 1 or 2, further comprising reacting nanoparticles or microparticles of the Group 14 element or compound thereof with Li to obtain the prelithiation reagent composition comprising $Li_xM$.

6. The method of claim 1 or 2, further comprising reacting Li with nanoparticles or microparticles of at least one of graphite, Si, SiO, $SiO_2$, Ge, $GeO_2$, or metal silicide to obtain the prelithiation reagent composition comprising .

7. The method of claim 1 or 2, wherein x is 1:6 or greater.

* * * * *